US009923657B2

(12) United States Patent
Forenza et al.

(10) Patent No.: US 9,923,657 B2
(45) Date of Patent: Mar. 20, 2018

(54) SYSTEMS AND METHODS FOR EXPLOITING INTER-CELL MULTIPLEXING GAIN IN WIRELESS CELLULAR SYSTEMS VIA DISTRIBUTED INPUT DISTRIBUTED OUTPUT TECHNOLOGY

(71) Applicant: REARDEN, LLC, San Francisco, CA (US)

(72) Inventors: Antonio Forenza, Palo Alto, CA (US); Stephen G. Perlman, Palo Alto, CA (US)

(73) Assignee: REARDEN, LLC, San Francisco, CA (US)

( * ) Notice: Subject to any disclaimer, the term of this patent is extended or adjusted under 35 U.S.C. 154(b) by 426 days.

(21) Appl. No.: 13/797,971

(22) Filed: Mar. 12, 2013

(65) Prior Publication Data

US 2014/0269642 A1 Sep. 18, 2014

(51) Int. Cl.

*H04W 84/04* (2009.01)
*H04J 11/00* (2006.01)
*H04B 7/024* (2017.01)
*H04B 7/0452* (2017.01)
*H04L 25/03* (2006.01)
*H04L 25/497* (2006.01)
*H04L 1/06* (2006.01)

(52) U.S. Cl.

CPC ............ *H04J 11/003* (2013.01); *H04B 7/024* (2013.01); *H04B 7/0452* (2013.01); *H04L 25/03343* (2013.01); *H04L 25/4975* (2013.01); *H04L 1/06* (2013.01); *H04L 2025/03426* (2013.01)

(58) Field of Classification Search

CPC ... H04B 7/0452; H04B 7/024; H04W 84/042; H04L 5/0007; H04L 27/2636; H04L 27/2646; H04L 27/2666; H04L 24/2698; H04L 5/0035; H04L 5/0055; H04L 5/0057; H04L 12/2869; H04L 12/5695; H04L 47/00; H04L 47/70; H04L 47/78

See application file for complete search history.

(56) References Cited

U.S. PATENT DOCUMENTS

| | | | |
|---|---|---|---|
| 2,127,656 | A | 8/1938 | Terry |
| 3,085,877 | A | 4/1963 | Reid |
| 3,335,716 | A | 8/1967 | Alt et al. |

(Continued)

FOREIGN PATENT DOCUMENTS

| | | | |
|---|---|---|---|
| CA | 1307842 | C | 9/1992 |
| CA | 1309769 | C | 11/1992 |

(Continued)

OTHER PUBLICATIONS

3GPP: "3rd Generation Partnership Project; Technical Specification Group Radio Access Network; Coordinated multi-point operation for LTE physical layer aspects (Release 11)," (Dec. 20, 2011), 69 pages.

(Continued)

*Primary Examiner* — Jung-Jen Liu

(74) *Attorney, Agent, or Firm* — Nicholson De Vos Webster & Elliott LLP

(57) ABSTRACT

A multiple antenna system (MAS) with multiuser (MU) transmissions ("MU-MAS") exploiting inter-cell multiplexing gain via spatial processing to increase capacity in wireless communications networks.

134 Claims, 16 Drawing Sheets

(56) References Cited

U.S. PATENT DOCUMENTS 3,699,856 A 10/1972 Ronald et al.
3,805,238 A 4/1974 Rothfjell
3,887,906 A 6/1975 Minnaja
3,887,925 A 6/1975 Ranghelli et al.
4,003,016 A 1/1977 Remley
4,075,097 A 2/1978 Paul
4,076,097 A 2/1978 Clarke
4,209,780 A 6/1980 Cannon et al.
4,253,193 A 2/1981 Kennard et al.
4,331,225 A 5/1982 Bolger
4,360,797 A 11/1982 Fenimore et al.
4,389,670 A 6/1983 Davidson et al.
4,417,791 A 11/1983 Erland et al.
4,564,935 A 1/1986 Kaplan
4,688,246 A 8/1987 Eilers et al.
4,771,289 A 9/1988 Masak
4,855,061 A 8/1989 Martin
4,943,811 A 7/1990 Alden et al.
4,955,562 A 9/1990 Martin et al.
5,045,862 A 9/1991 Alden et al.
5,076,687 A 12/1991 Adelson
5,088,091 A 2/1992 Schroeder et al.
5,095,500 A 3/1992 Tayloe et al.
5,097,485 A 3/1992 O'Connor et al.
5,227,985 A 7/1993 Dementhon
5,235,416 A 8/1993 Stanhope
5,304,809 A 4/1994 Wickersheim
5,305,124 A 4/1994 Chern et al.
5,315,309 A 5/1994 Rudow et al.
5,321,414 A 6/1994 Alden et al.
5,377,183 A 12/1994 Dent
5,400,037 A 3/1995 East
5,420,622 A 5/1995 Faroudja
5,424,533 A 6/1995 Schmutz
5,440,428 A 8/1995 Hegg et al.
5,467,104 A 11/1995 Furness, III et al.
5,472,467 A 12/1995 Pfeffer
5,479,026 A 12/1995 Schumtz et al.
5,480,341 A 1/1996 Plakos
5,483,667 A 1/1996 Faruque
5,503,350 A 4/1996 Foote
5,519,826 A 5/1996 Harper et al.
5,563,614 A 10/1996 Alden et al.
5,569,317 A 10/1996 Sarada et al.
5,573,090 A 11/1996 Ross
5,575,719 A 11/1996 Gobush et al.
5,596,339 A 1/1997 Furness, III et al.
5,600,326 A 2/1997 Yu et al.
5,644,207 A 7/1997 Lew et al.
5,653,751 A 8/1997 Samiy et al.
5,659,327 A 8/1997 Furness, III et al.
5,689,577 A 11/1997 Arata
5,699,798 A 12/1997 Hochman et al.
5,701,132 A 12/1997 Kollin et al.
5,712,649 A 1/1998 Tosaki
5,742,229 A 4/1998 Smith
5,742,253 A 4/1998 Conroy et al.
5,756,026 A 5/1998 Sanchez et al.
5,757,005 A 5/1998 Callas et al.
5,809,422 A 9/1998 Raleigh et al.
5,821,989 A 10/1998 Lazzaro et al.
5,838,671 A 11/1998 Ishikawa et al.
5,852,672 A 12/1998 Lu
5,864,384 A 1/1999 McClure et al.
5,872,814 A 2/1999 McMeekin
5,878,283 A 3/1999 House et al.
5,883,606 A 3/1999 Smoot
5,903,397 A 5/1999 Melville et al.
5,910,834 A 6/1999 McClure et al.
5,930,379 A 7/1999 Rehg et al.
5,940,166 A 8/1999 Miller
5,950,124 A 9/1999 Trompower et al.
5,966,129 A 10/1999 Matsukuma et al.
5,969,822 A 10/1999 Fright et al.
5,982,139 A 11/1999 Parise
5,983,104 A 11/1999 Wickman et al.
6,005,856 A 12/1999 Jensen et al.
6,020,892 A 2/2000 Dillon
6,041,365 A 3/2000 Kleinerman
6,043,799 A 3/2000 Tidwell
6,052,582 A 4/2000 Blasing et al.
6,061,021 A 5/2000 Zibell
6,061,023 A 5/2000 Daniel et al.
6,067,290 A 5/2000 Paulraj et al.
6,072,496 A 6/2000 Guenter et al.
6,097,353 A 8/2000 Melville et al.
6,114,834 A 9/2000 Parise
6,141,104 A 10/2000 Schulz et al.
6,148,280 A 11/2000 Kramer
6,151,118 A 11/2000 Norita et al.
6,154,321 A 11/2000 Melville et al.
6,205,195 B1 3/2001 Lanza
6,229,503 B1 5/2001 Mays, Jr. et al.
6,241,622 B1 6/2001 Gobush et al.
6,243,198 B1 6/2001 Sedlmayr
6,252,912 B1 6/2001 Salinger
6,271,900 B1 8/2001 Li
6,308,080 B1 10/2001 Burt et al.
6,364,253 B1 4/2002 Cavanagh
6,400,761 B1 6/2002 Smee et al.
6,411,612 B1 6/2002 Halford et al.
6,421,600 B1 7/2002 Ross
6,442,151 B1 8/2002 H'Mimy et al.
6,445,910 B1 9/2002 Oestreich
6,454,414 B1 9/2002 Ting
6,459,900 B1 10/2002 Scheinert
6,473,467 B1 10/2002 Wallace et al.
6,473,717 B1 10/2002 Claussen et al.
6,484,030 B1 11/2002 Antoine et al.
6,487,516 B1 11/2002 Amorai-Moriya
6,509,970 B1 1/2003 Seki et al.
6,513,921 B1 2/2003 Houle
6,533,674 B1 3/2003 Gobush
6,554,706 B2 4/2003 Kim et al.
6,592,465 B2 7/2003 Lutz et al.
6,633,294 B1 10/2003 Rosenthal et al.
6,643,386 B1 11/2003 Foster
6,685,326 B2 2/2004 Debevec et al.
6,710,797 B1 3/2004 McNelley et al.
6,718,180 B1 4/2004 Lundh et al.
6,737,652 B2 5/2004 Lanza et al.
6,758,759 B2 7/2004 Gobush et al.
6,760,388 B2 7/2004 Ketchum et al.
6,763,225 B1 7/2004 Farmine et al.
6,771,706 B2 8/2004 Ling et al.
6,785,341 B2 8/2004 Walton et al.
6,791,508 B2 9/2004 Berry et al.
6,792,259 B1 9/2004 Parise
6,801,580 B2 10/2004 Kadous
6,804,311 B1 10/2004 Dabak et al.
6,834,043 B1 12/2004 Vook et al.
6,836,673 B1 12/2004 Trott
6,850,872 B1 2/2005 Marschner et al.
6,862,271 B2 3/2005 Medvedev et al.
6,888,809 B1 5/2005 Foschini et al.
6,919,847 B2 7/2005 Caplan et al.
6,919,857 B2 7/2005 Shamblin et al.
6,920,192 B1 7/2005 Laroia et al.
6,943,949 B2 9/2005 Sedlmayr
6,978,150 B2 12/2005 Hamabe
6,982,653 B2 1/2006 Voeller et al.
7,006,043 B1 2/2006 Nalbandian
7,009,652 B1 3/2006 Tanida et al.
7,013,144 B2 3/2006 Yamashita et al.
7,044,613 B2 5/2006 Debevec
7,068,277 B2 6/2006 Menache
7,068,704 B1 6/2006 Orr
7,068,991 B2 6/2006 Parise
7,072,413 B2 7/2006 Walton et al.
7,072,693 B2 7/2006 Farlow et al.
7,075,254 B2 7/2006 Chitta et al.
7,075,438 B2 7/2006 Kent et al.
7,081,997 B2 7/2006 Sedlmayr
7,086,954 B2 8/2006 Gobush et al.

(56) References Cited

U.S. PATENT DOCUMENTS 7,089,319 B2 8/2006 Lysenko et al.
7,116,723 B2 10/2006 Kim et al.
7,120,440 B2 10/2006 Cho et al.
7,127,081 B1 10/2006 Erdem
7,139,527 B2 11/2006 Tamaki et al.
7,142,154 B2 11/2006 Quilter et al.
7,152,984 B1 12/2006 Hayes
7,154,671 B2 12/2006 Sedlmayr
7,154,936 B2 12/2006 Bjerke et al.
7,154,960 B2 12/2006 Liu et al.
7,167,684 B2 1/2007 Kadous et al.
7,184,047 B1 2/2007 Crampton
7,193,991 B2 3/2007 Melpignano et al.
7,197,082 B2 3/2007 Alexiou et al.
7,197,084 B2 3/2007 Ketchum et al.
7,218,320 B2 5/2007 Gordon et al.
7,242,724 B2 7/2007 Alexiou et al.
7,248,879 B1 7/2007 Walton et al.
7,257,237 B1 8/2007 Luck et al.
7,272,294 B2 9/2007 Zhou et al.
7,310,680 B1 12/2007 Graham
7,324,110 B2 1/2008 Edwards et al.
7,327,362 B2 2/2008 Grau
7,333,113 B2 2/2008 Gordon
7,333,540 B2 2/2008 Yee
7,356,164 B2 4/2008 Aliaga et al.
7,358,972 B2 4/2008 Echegaray et al.
7,369,681 B2 5/2008 Foth et al.
7,369,876 B2 5/2008 Lee et al.
7,373,133 B2 5/2008 Mickle et al.
7,412,212 B2 8/2008 Hottinen
7,418,053 B2 8/2008 Perlman et al.
7,426,422 B2 9/2008 Carman et al.
7,436,403 B2 10/2008 Debevec
7,437,177 B2 10/2008 Ozluturk et al.
7,486,931 B2 2/2009 Cho et al.
7,502,420 B2 3/2009 Ketchum
7,548,272 B2 6/2009 Perlman et al.
7,548,752 B2 6/2009 Sampath et al.
7,554,549 B2 6/2009 Sagar et al.
7,558,575 B2 7/2009 Losh et al.
7,587,520 B1 9/2009 Kent et al.
7,599,420 B2 10/2009 Forenza et al.
7,630,337 B2 12/2009 Zheng et al.
7,633,944 B1 12/2009 Chang et al.
7,633,994 B2 12/2009 Forenza et al.
7,636,381 B2 12/2009 Forenza et al.
7,671,321 B2 3/2010 Perlman et al.
7,688,789 B2 3/2010 Pan et al.
7,720,259 B2 5/2010 Gordon et al.
7,729,433 B2 6/2010 Jalloul et al.
7,729,443 B2 6/2010 Fukuoka et al.
7,751,368 B2 7/2010 Li et al.
7,751,843 B2 7/2010 Butala
7,756,222 B2 7/2010 Chen et al.
7,767,950 B2 8/2010 Perlman et al.
7,792,423 B2 9/2010 Raskar et al.
7,923,677 B2 4/2011 Slinger
7,986,742 B2 7/2011 Ketchum et al.
8,013,285 B2 9/2011 Perlman et al.
8,041,362 B2 10/2011 Li et al.
8,054,312 B2 11/2011 Gordon
8,081,944 B2 12/2011 Li
8,126,510 B1 2/2012 Samson et al.
8,144,153 B1 3/2012 Sullivan et al.
8,243,353 B1 8/2012 Gutin et al.
8,288,704 B2 10/2012 Perlman et al.
8,428,177 B2 4/2013 Tsai et al.
8,451,764 B2 5/2013 Chao et al.
8,482,462 B2 7/2013 Komijani et al.
8,638,880 B2* 1/2014 Baldemair ........... H04J 11/0033 375/260
8,654,815 B1 2/2014 Forenza et al.
8,675,768 B2 3/2014 Xu et al.
8,705,484 B2 4/2014 Caire et al.
8,731,480 B2 5/2014 Kim et al.
8,797,970 B2 8/2014 Xing et al.
8,849,339 B2 9/2014 Anto et al.
8,902,862 B2 12/2014 Yu et al.
8,971,380 B2 3/2015 Forenza et al.
9,177,387 B2 11/2015 Marks
9,252,858 B2 2/2016 Abbasfar et al.
9,331,882 B2 5/2016 Fehri et al.
9,698,881 B2 7/2017 Nammi et al.
2001/0031647 A1 10/2001 Scherzer et al.
2002/0027985 A1 3/2002 Rashid-Farrokhi
2002/0051433 A1 5/2002 Affes et al.
2002/0060649 A1 5/2002 Perlman
2002/0114526 A1 8/2002 Dennis
2002/0130867 A1 9/2002 Yang et al.
2002/0132933 A1 9/2002 Dingemans et al.
2002/0138581 A1 9/2002 MacIntosh et al.
2002/0142723 A1 10/2002 Foschini et al.
2002/0168017 A1 11/2002 Berthet et al.
2002/0181444 A1 12/2002 Acampora
2002/0193146 A1 12/2002 Wallace et al.
2003/0003863 A1 1/2003 Thielecke et al.
2003/0012315 A1 1/2003 Fan
2003/0027655 A1 2/2003 Lutz et al.
2003/0036359 A1 2/2003 Dent et al.
2003/0043929 A1 3/2003 Sampath
2003/0048753 A1 3/2003 Jalali
2003/0095186 A1 5/2003 Aman et al.
2003/0114165 A1 6/2003 Mills
2003/0125026 A1 7/2003 Tsunehara et al.
2003/0125040 A1 7/2003 Walton et al.
2003/0138206 A1 7/2003 Sheng et al.
2003/0139196 A1 7/2003 Medvedev et al.
2003/0147362 A1 8/2003 Dick et al.
2003/0148738 A1 8/2003 Das et al.
2003/0149726 A1 8/2003 Spear
2003/0156056 A1 8/2003 Perry
2003/0161282 A1 8/2003 Medvedev et al.
2003/0193599 A1 10/2003 Campbell et al.
2003/0200227 A1 10/2003 Ressler
2003/0211843 A1 11/2003 Song et al.
2003/0214431 A1 11/2003 Hager et al.
2003/0220112 A1 11/2003 Bugeja
2003/0222820 A1 12/2003 Karr et al.
2003/0223391 A1 12/2003 Malaender et al.
2003/0235146 A1 12/2003 Wu et al.
2004/0002835 A1 1/2004 Nelson
2004/0008650 A1 1/2004 Le et al.
2004/0017313 A1 1/2004 Menache
2004/0042556 A1 3/2004 Medvedev et al.
2004/0043784 A1 3/2004 Czaja et al.
2004/0045031 A1 3/2004 Gautier
2004/0072091 A1 4/2004 Mochizuki et al.
2004/0082356 A1 4/2004 Walton et al.
2004/0097197 A1 5/2004 Juncker et al.
2004/0104935 A1 6/2004 Williamson et al.
2004/0119716 A1 6/2004 Park et al.
2004/0136349 A1 7/2004 Walton et al.
2004/0152480 A1 8/2004 Willars et al.
2004/0153512 A1 8/2004 Friend
2004/0155962 A1 8/2004 Marks
2004/0170430 A1 9/2004 Gorokhov
2004/0176097 A1 9/2004 Wilson et al.
2004/0179627 A1 9/2004 Ketchum et al.
2004/0185909 A1 9/2004 Alexiou et al.
2004/0190636 A1 9/2004 Oprea
2004/0203987 A1 10/2004 Butala
2004/0205173 A1 10/2004 Hall
2004/0209579 A1* 10/2004 Vaidyanathan ...... H04B 7/0615 455/101
2004/0252632 A1 12/2004 Bourdoux et al.
2005/0003865 A1 1/2005 Lastinger et al.
2005/0020237 A1 1/2005 Alexiou et al.
2005/0030625 A1 2/2005 Cattin-Liebl
2005/0031047 A1 2/2005 Maltsev et al.
2005/0040085 A1 2/2005 Carman et al.
2005/0041750 A1 2/2005 Lau
2005/0041751 A1 2/2005 Nir et al.
2005/0043031 A1 2/2005 Cho et al.

(56) References Cited

U.S. PATENT DOCUMENTS

2005/0047515 A1 3/2005 Walton et al.
2005/0058217 A1 3/2005 Sandhu et al.
2005/0075110 A1 4/2005 Posti et al.
2005/0096058 A1 5/2005 Warner et al.
2005/0101259 A1 5/2005 Tong et al.
2005/0104543 A1 5/2005 Kazanov et al.
2005/0105772 A1 5/2005 Voronka et al.
2005/0111406 A1 5/2005 Pasanen et al.
2005/0111599 A1 5/2005 Walton et al.
2005/0114073 A1 5/2005 Gobush
2005/0119868 A1 6/2005 Scheidemann et al.
2005/0143183 A1 6/2005 Shirai et al.
2005/0157683 A1 7/2005 Ylitalo et al.
2005/0161118 A1 7/2005 Carman et al.
2005/0168578 A1 8/2005 Gobush
2005/0169396 A1 8/2005 Baier et al.
2005/0174771 A1 8/2005 Conner
2005/0174977 A1 8/2005 Pedlar et al.
2005/0215336 A1 9/2005 Ueda et al.
2005/0215337 A1 9/2005 Shirai et al.
2005/0230597 A1 10/2005 Hsieh et al.
2005/0232135 A1 10/2005 Mukai et al.
2005/0239406 A1* 10/2005 Shattil .................... H01Q 3/26 455/63.1
2005/0259627 A1 11/2005 Song et al.
2005/0271009 A1 12/2005 Shirakabe et al.
2005/0287962 A1 12/2005 Mehta et al.
2006/0023803 A1 2/2006 Perlman et al.
2006/0046658 A1 3/2006 Cruz et al.
2006/0050804 A1 3/2006 Leclair
2006/0055706 A1 3/2006 Perlman et al.
2006/0061680 A1 3/2006 Madhavan et al.
2006/0077258 A1 4/2006 Allen et al.
2006/0098568 A1 5/2006 Oh et al.
2006/0098754 A1 5/2006 Kim et al.
2006/0127836 A1 6/2006 Wen
2006/0146755 A1 7/2006 Pan et al.
2006/0165120 A1 7/2006 Karabinis
2006/0184209 A1 8/2006 John et al.
2006/0192785 A1 8/2006 Marschner et al.
2006/0198461 A1 9/2006 Hayase
2006/0199620 A1 9/2006 Greene et al.
2006/0203096 A1 9/2006 Lasalle et al.
2006/0203708 A1 9/2006 Sampath et al.
2006/0209979 A1 9/2006 Sandell et al.
2006/0266564 A1 11/2006 Perlman
2006/0270359 A1 11/2006 Karmi et al.
2006/0281421 A1 12/2006 Pan et al.
2006/0287743 A1 12/2006 Sampath et al.
2007/0004337 A1 1/2007 Biswas et al.
2007/0024946 A1 2/2007 Panasyuk et al.
2007/0025464 A1 2/2007 Perlman
2007/0054633 A1 3/2007 Piirainen
2007/0058590 A1* 3/2007 Wang .................. H04B 7/0632 370/334
2007/0058839 A1 3/2007 Echegaray et al.
2007/0060410 A1 3/2007 Gobush
2007/0064823 A1 3/2007 Hwang et al.
2007/0082674 A1 4/2007 Pedersen et al.
2007/0091085 A1 4/2007 Wang et al.
2007/0091178 A1 4/2007 Cotter et al.
2007/0093273 A1 4/2007 Cai
2007/0099665 A1 5/2007 Kim et al.
2007/0132653 A1 6/2007 Weller et al.
2007/0135125 A1 6/2007 Kim et al.
2007/0183362 A1 8/2007 Mondal et al.
2007/0200930 A1 8/2007 Gordon
2007/0206504 A1 9/2007 Koo et al.
2007/0206832 A1 9/2007 Gordon et al.
2007/0211747 A1 9/2007 Kim
2007/0242782 A1 10/2007 Han et al.
2007/0249380 A1 10/2007 Stewart et al.
2007/0253508 A1 11/2007 Zhou et al.
2007/0254602 A1 11/2007 Li et al.
2007/0258531 A1 11/2007 Chen et al.
2007/0263736 A1 11/2007 Yuda et al.
2007/0273951 A1 11/2007 Ribi
2007/0279494 A1 12/2007 Aman et al.
2007/0280116 A1 12/2007 Wang et al.
2007/0285559 A1 12/2007 Perlman et al.
2008/0013644 A1 1/2008 Hugl et al.
2008/0051150 A1 2/2008 Tsutsui
2008/0080631 A1 4/2008 Forenza et al.
2008/0080635 A1 4/2008 Hugl et al.
2008/0089396 A1 4/2008 Zhang et al.
2008/0100622 A1 5/2008 Gordon
2008/0102881 A1 5/2008 Han et al.
2008/0107135 A1 5/2008 Ibrahim
2008/0117961 A1 5/2008 Han et al.
2008/0118004 A1 5/2008 Forenza et al.
2008/0125051 A1 5/2008 Kim et al.
2008/0130790 A1 6/2008 Forenza et al.
2008/0132281 A1 6/2008 Kim et al.
2008/0181285 A1 7/2008 Hwang et al.
2008/0192697 A1 8/2008 Shaheen
2008/0205538 A1 8/2008 Han et al.
2008/0214185 A1 9/2008 Cho et al.
2008/0227422 A1 9/2008 Hwang et al.
2008/0232394 A1 9/2008 Kozek et al.
2008/0233902 A1 9/2008 Pan et al.
2008/0239938 A1 10/2008 Jalloul et al.
2008/0260054 A1 10/2008 Myung et al.
2008/0268833 A1 10/2008 Huang et al.
2008/0292011 A1 11/2008 Yang
2008/0317014 A1 12/2008 Veselinovic et al.
2009/0016463 A1 1/2009 Roh
2009/0028451 A1 1/2009 Slinger et al.
2009/0034636 A1 2/2009 Kotecha et al.
2009/0041151 A1 2/2009 Khan et al.
2009/0046678 A1 2/2009 Lee et al.
2009/0046800 A1 2/2009 Xu et al.
2009/0060013 A1 3/2009 Ashikhmin et al.
2009/0067198 A1 3/2009 Graham et al.
2009/0067402 A1 3/2009 Forenza et al.
2009/0075686 A1 3/2009 Gomadam et al.
2009/0086648 A1 4/2009 Xu et al.
2009/0086855 A1 4/2009 Jin et al.
2009/0090868 A1 4/2009 Payne et al.
2009/0135944 A1 5/2009 Dyer et al.
2009/0151987 A1 6/2009 Yang et al.
2009/0168914 A1 7/2009 Chance et al.
2009/0195355 A1 8/2009 Mitchell
2009/0202016 A1 8/2009 Seong et al.
2009/0207822 A1 8/2009 Kim et al.
2009/0209206 A1 8/2009 Zou et al.
2009/0227249 A1 9/2009 Ylitalo
2009/0227292 A1 9/2009 Laroia et al.
2009/0262695 A1 10/2009 Chen et al.
2009/0268675 A1 10/2009 Choi
2009/0274196 A1 11/2009 Black et al.
2009/0283466 A1 11/2009 Martin et al.
2009/0285156 A1 11/2009 Huang et al.
2009/0296650 A1 12/2009 Venturino et al.
2009/0316014 A1 12/2009 Lim et al.
2009/0316807 A1 12/2009 Kim et al.
2009/0318183 A1 12/2009 Hugl et al.
2010/0002934 A1 1/2010 Sullivan et al.
2010/0008331 A1 1/2010 Li et al.
2010/0034151 A1 2/2010 Alexiou et al.
2010/0068999 A1 3/2010 Bangs et al.
2010/0098030 A1 4/2010 Wang et al.
2010/0099428 A1 4/2010 Bhushan et al.
2010/0119001 A1 5/2010 Walton et al.
2010/0150013 A1 6/2010 Hara et al.
2010/0157861 A1 6/2010 Na et al.
2010/0164802 A1 7/2010 Li et al.
2010/0172309 A1 7/2010 Forenza et al.
2010/0178934 A1 7/2010 Moeglein et al.
2010/0189191 A1 7/2010 Taoka et al.
2010/0195527 A1 8/2010 Gorokhov et al.
2010/0220679 A1 9/2010 Abraham et al.
2010/0224725 A1 9/2010 Perlman et al.
2010/0227562 A1 9/2010 Shim et al.
2010/0234071 A1 9/2010 Shabtay et al.

(56) References Cited

U.S. PATENT DOCUMENTS

2010/0238984 A1 9/2010 Sayana et al.
2010/0260060 A1 10/2010 Abraham et al.
2010/0260103 A1 10/2010 Guey et al.
2010/0260115 A1 10/2010 Frederiksen et al.
2010/0265842 A1 10/2010 Khandekar et al.
2010/0279625 A1 11/2010 Ko et al.
2010/0290369 A1 11/2010 Hui et al.
2010/0290382 A1 11/2010 Hui et al.
2010/0315966 A1 12/2010 Weigand
2010/0316154 A1 12/2010 Park et al.
2010/0316163 A1 12/2010 Forenza et al.
2011/0002371 A1 1/2011 Forenza et al.
2011/0002410 A1 1/2011 Forenza et al.
2011/0002411 A1 1/2011 Forenza et al.
2011/0003606 A1 1/2011 Forenza et al.
2011/0003607 A1 1/2011 Forenza et al.
2011/0003608 A1 1/2011 Forenza et al.
2011/0007856 A1 1/2011 Jang et al.
2011/0019715 A1 1/2011 Brisebois
2011/0038436 A1 2/2011 Kim et al.
2011/0044193 A1 2/2011 Forenza et al.
2011/0051832 A1 3/2011 Mergen et al.
2011/0069638 A1 3/2011 Ishizu et al.
2011/0086611 A1 4/2011 Klein et al.
2011/0090840 A1 4/2011 Lee et al.
2011/0090885 A1 4/2011 Safavi
2011/0104174 A1 5/2011 Strakhova et al.
2011/0111781 A1 5/2011 Chen et al.
2011/0135308 A1 6/2011 Tarlazzi et al.
2011/0142020 A1 6/2011 Kang et al.
2011/0142104 A1 6/2011 Coldrey et al.
2011/0164597 A1 7/2011 Amini et al.
2011/0164697 A1* 7/2011 Liao ...................... H04B 7/024 375/260
2011/0195670 A1 8/2011 Dakshinamurthy et al.
2011/0199946 A1 8/2011 Breit et al.
2011/0205963 A1 8/2011 Tang et al.
2011/0207416 A1 8/2011 Doi
2011/0211485 A1 9/2011 Xu et al.
2011/0216662 A1* 9/2011 Nie ...................... H04W 24/00 370/252
2011/0228895 A1 9/2011 Ridley et al.
2011/0261769 A1 10/2011 Ji et al.
2011/0305195 A1 12/2011 Forck et al.
2011/0306381 A1 12/2011 Jia et al.
2011/0310987 A1 12/2011 Lee et al.
2011/0310994 A1 12/2011 Ko et al.
2011/0315855 A1 12/2011 Perlman et al.
2012/0002743 A1 1/2012 Cavalcante et al.
2012/0014415 A1 1/2012 Su et al.
2012/0014477 A1 1/2012 Ko et al.
2012/0046039 A1* 2/2012 Hagerman .............. H04B 7/10 455/450
2012/0051257 A1 3/2012 Kim et al.
2012/0076028 A1 3/2012 Ko et al.
2012/0076042 A1 3/2012 Chun et al.
2012/0076236 A1 3/2012 Ko et al.
2012/0082038 A1 4/2012 Xu et al.
2012/0087261 A1 4/2012 Yoo et al.
2012/0087430 A1 4/2012 Forenza et al.
2012/0093078 A1 4/2012 Perlman et al.
2012/0108278 A1 5/2012 Kim et al.
2012/0114021 A1 5/2012 Chung et al.
2012/0151305 A1 6/2012 Zhang et al.
2012/0188988 A1 7/2012 Chung et al.
2012/0218968 A1 8/2012 Kim et al.
2012/0224528 A1 9/2012 Tapia et al.
2012/0230691 A1 9/2012 Hui et al.
2012/0236741 A1 9/2012 Xu et al.
2012/0236840 A1 9/2012 Kim et al.
2012/0252470 A1 10/2012 Wong et al.
2012/0258657 A1 10/2012 Scheinert
2012/0281555 A1 11/2012 Gao et al.
2012/0281622 A1 11/2012 Saban et al.
2012/0288022 A1 11/2012 Guey et al.
2012/0300717 A1 11/2012 Cepeda Lopez et al.
2012/0314570 A1 12/2012 Forenza et al.
2012/0314649 A1 12/2012 Forenza et al.
2013/0010840 A1 1/2013 Maddah-Ali et al.
2013/0033998 A1* 2/2013 Seo ...................... H04W 24/00 370/252
2013/0038766 A1 2/2013 Perlman et al.
2013/0039168 A1 2/2013 Forenza et al.
2013/0039332 A1* 2/2013 Nazar ................. H04B 7/0452 370/330
2013/0039349 A1 2/2013 Ebrahimi et al.
2013/0039387 A1* 2/2013 Qu ...................... H04L 5/0051 375/141
2013/0077514 A1 3/2013 Dinan
2013/0077569 A1* 3/2013 Nam .................. H04W 52/288 370/328
2013/0083681 A1 4/2013 Ebrahimi et al.
2013/0089009 A1 4/2013 Li et al.
2013/0094548 A1 4/2013 Park
2013/0114437 A1 5/2013 Yoo et al.
2013/0115986 A1 5/2013 Mueck et al.
2013/0128821 A1* 5/2013 Hooli ................... H04L 5/0051 370/329
2013/0170360 A1 7/2013 Xu et al.
2013/0188567 A1 7/2013 Wang et al.
2013/0195047 A1 8/2013 Koivisto et al.
2013/0195086 A1 8/2013 Xu et al.
2013/0195467 A1* 8/2013 Schmid ............... H04B 1/0096 398/115
2013/0208604 A1 8/2013 Lee et al.
2013/0242890 A1* 9/2013 He ..................... H04W 52/243 370/329
2013/0242956 A1 9/2013 Hall
2013/0315211 A1* 11/2013 Balan .................. H04B 7/0697 370/336
2014/0038619 A1* 2/2014 Moulsley .............. H04B 7/024 455/446
2014/0064206 A1 3/2014 Bao et al.
2014/0086296 A1* 3/2014 Badic ............... H04L 25/03891 375/229
2014/0087680 A1 3/2014 Luukkala et al.
2014/0112216 A1 4/2014 Seo et al.
2014/0146756 A1 5/2014 Sahin et al.
2014/0185700 A1 7/2014 Dong et al.
2014/0198744 A1 7/2014 Wang et al.
2014/0206280 A1* 7/2014 Nilsson ............... H04B 5/0018 455/25
2014/0219202 A1 8/2014 Kim et al.
2014/0219267 A1 8/2014 Eyuboglu et al.
2014/0241209 A1 8/2014 Pollakowski et al.
2014/0241218 A1 8/2014 Moshfeghi
2014/0241240 A1 8/2014 Kloper et al.
2014/0245095 A1 8/2014 Nammi et al.
2014/0295758 A1 10/2014 Pedersen
2014/0301345 A1 10/2014 Kim et al.
2014/0341143 A1 11/2014 Yang et al.
2014/0348077 A1* 11/2014 Chen .................... H04W 72/12 370/329
2014/0348090 A1 11/2014 Nguyen et al.
2014/0348131 A1 11/2014 Duan et al.
2015/0003311 A1 1/2015 Feuersaenger et al.
2015/0011197 A1 1/2015 Tarraf et al.
2015/0016317 A1 1/2015 Park et al.
2015/0098410 A1 4/2015 Jöngren et al.
2015/0296533 A1 10/2015 Park et al.
2015/0304855 A1 10/2015 Perlman et al.
2015/0305010 A1 10/2015 Guan et al.
2016/0013855 A1 1/2016 Campos et al.
2016/0094318 A1 3/2016 Shattil et al.
2016/0157146 A1 6/2016 Karabinis
2016/0248559 A1 8/2016 Guo et al.
2016/0353290 A1 12/2016 Nammi et al.

FOREIGN PATENT DOCUMENTS

CA 2011298 C 5/1999
CA 2006481 C 9/1999
CN 1256803 A 6/2000

(56) References Cited

FOREIGN PATENT DOCUMENTS

| | | | |
|---|---|---|---|
| CN | 1516370 | A | 7/2004 |
| CN | 1538636 | A | 10/2004 |
| CN | 1703113 | A | 11/2005 |
| CN | 1734972 | A | 2/2006 |
| CN | 1820424 | A | 8/2006 |
| CN | 101238648 | A | 8/2008 |
| CN | 101405965 | A | 4/2009 |
| CN | 101536320 | A | 9/2009 |
| CN | 101542938 | A | 9/2009 |
| CN | 101981826 | A | 2/2011 |
| CN | 102007707 | A | 4/2011 |
| CN | 102185641 | A | 9/2011 |
| EP | 1359683 | A1 | 11/2003 |
| EP | 1392029 | A1 | 2/2004 |
| EP | 1597842 | A1 | 11/2005 |
| EP | 1775937 | A2 | 4/2007 |
| EP | 2244390 | A2 | 10/2010 |
| JP | H05231858 | A | 9/1993 |
| JP | H05333398 | A | 12/1993 |
| JP | 2000503393 | A | 3/2000 |
| JP | 2001217759 | A | 8/2001 |
| JP | 2002152995 | A | 5/2002 |
| JP | 2002281551 | A | 9/2002 |
| JP | 2002374224 | A | 12/2002 |
| JP | 2003018054 | A | 1/2003 |
| JP | 2003179948 | A | 6/2003 |
| JP | 2003284128 | A | 10/2003 |
| JP | 2004502376 | A | 1/2004 |
| JP | 2004104206 | A | 4/2004 |
| JP | 2004229425 | A | 8/2004 |
| JP | 2004242380 | A | 8/2004 |
| JP | 2005039822 | A | 2/2005 |
| JP | 2005073313 | A | 3/2005 |
| JP | 2006081162 | A | 3/2006 |
| JP | 2006245871 | A | 9/2006 |
| JP | 2007060106 | A | 3/2007 |
| JP | 2007116686 | A | 5/2007 |
| JP | 2009213052 | A | 9/2009 |
| JP | 2009273167 | A | 11/2009 |
| JP | 2009540692 | A | 11/2009 |
| JP | 2010016674 | A | 1/2010 |
| JP | 2010021999 | A | 1/2010 |
| JP | 2010068496 | A | 3/2010 |
| JP | 2010193189 | A | 9/2010 |
| JP | 2011035912 | A | 2/2011 |
| JP | 2011517393 | A | 6/2011 |
| JP | 2013502117 | A | 1/2013 |
| KR | 20120003781 | A | 1/2012 |
| RU | 2143775 | C1 | 12/1999 |
| RU | 2010110620 | A | 9/2011 |
| TW | 201031243 | A | 8/2010 |
| TW | 201212570 | A | 3/2012 |
| TW | 201220741 | A | 5/2012 |
| WO | WO-9923767 | A1 | 5/1999 |
| WO | WO-0201732 | A2 | 1/2002 |
| WO | WO-0208785 | A1 | 1/2002 |
| WO | WO-02054626 | A1 | 7/2002 |
| WO | WO-02093784 | A1 | 11/2002 |
| WO | WO-02099995 | A2 | 12/2002 |
| WO | WO-03003604 | A1 | 1/2003 |
| WO | WO-03071569 | A2 | 8/2003 |
| WO | WO-03084092 | A2 | 10/2003 |
| WO | WO-03094460 | A2 | 11/2003 |
| WO | WO-03107582 | A2 | 12/2003 |
| WO | WO-2004017586 | A1 | 2/2004 |
| WO | WO-2004045884 | A1 | 6/2004 |
| WO | 2005046081 | A1 | 5/2005 |
| WO | WO-2005064871 | A1 | 7/2005 |
| WO | WO-2006049417 | A1 | 5/2006 |
| WO | WO-2006078019 | A1 | 7/2006 |
| WO | WO-2006110737 | A2 | 10/2006 |
| WO | WO-2006113872 | A1 | 10/2006 |
| WO | WO-2007024913 | A1 | 3/2007 |
| WO | WO-2007027825 | A2 | 3/2007 |
| WO | WO-2007114654 | A1 | 10/2007 |
| WO | WO-2009099752 | A1 | 8/2009 |
| WO | WO-2009125962 | A2 | 10/2009 |
| WO | WO-2010017482 | A1 | 2/2010 |
| WO | WO-2010067419 | A1 | 6/2010 |
| WO | WO-2011018121 | A1 | 2/2011 |
| WO | WO-2011099802 | A2 | 8/2011 |
| WO | WO-2011100492 | A1 | 8/2011 |
| WO | WO-2012001086 | A1 | 1/2012 |
| WO | WO-2012044969 | A1 | 4/2012 |
| WO | WO-2012058600 | A2 | 5/2012 |
| WO | WO-2012061325 | A1 | 5/2012 |
| WO | WO-2012127246 | A1 | 9/2012 |
| WO | WO-2012130071 | A1 | 10/2012 |
| WO | WO-2013040089 | A2 | 3/2013 |
| WO | WO-2013166464 | A1 | 11/2013 |

OTHER PUBLICATIONS

3GPP, "LTE", 4 pages, printed on Aug. 14, 2014, http://www.3gpp.org/LTE.

3GPP Technical Specification Group, "Spatial channel model, SCM-134 text V6.0", Spatial Channel Model AHG (Combined ad-hoc from 3GPP and 3GPP2), Apr. 2003, pp. 1-45.

3GPP TR 25.876 V7.0.0 (Mar. 2007)., "Technical Report 3rd Generation Partnership Project; Technical Specification Group Radio Access Network; Multiple Input Multiple Output in UTRA; (Release 7)3GPP TR 25.876 v7.0.0 (Mar. 2007)," pp. 2-76.

3GPP TR 25.912, "Feasibility Study for Evolved UTRA and UTRAN", V9.0.0 (Oct. 2009), pp. 1-66.

3GPP TR 25.913, "Requirements for Evolved UTRA (E-UTRA) and Evolved UTRAN (E-UTRAN)", V8.0.0 (Jan. 2009), pp. 1-20.

3GPP, TS 36.201, "Evolved Universal Terrestrial Radio Access (E-UTRA); LTE Physical Layer—General Description (Release 11)," pp. 1-14, Oct. 2012.

3GPP, TS 36.211, "Evolved Universal Terrestrial Radio Access (E-UTRA); Physical Channels and Modulation (Release 11)," pp. 1-107, Oct. 2012, submitted as Part 1 and Part 2.

3GPP TS 36.211 V8.7.0 (May 2009), "Technical Specification 3rd Generation Partnership Project; Technical Specification Group Radio Access Network; Evolved Universal Terrestrial Radio Access (E-UTRA); Physical Channels and Modulation (Release 8) 3GPP TS 36.211 V8.7.0 (May 2009)," pp. 1-83.

3GPP, TS 36.212, "Evolved Universal Terrestrial Radio Access (E-UTRA); Multiplexing and channel coding (Release 11)," pp. 1-80, Oct. 2012, submitted as Part 1 and Part 2.

3GPP TS 36.212 V9.1.0 Release 9, LTE; Evolved Universal Terrestrial Radio Access (E-UTRA); Multiplexing and channel coding, ETSI TS 136 212 (Apr. 2010), Technical Specification, Apr. 2010, pp. 1-63.

3GPP, TS 36.212.V8.7.0 (May 2009)., "Technical Specification 3rd Generation Partnership Project; Technical Specification Group Radio Access Network; Evolved Universal Terrestrial Radio Access (E-UTRA);Multiplexing and channel Coding (Release 8)3GPP, TS 36.212.V8.7.0 (May 2009)," 60 pages.

3GPP, TS 36.213, "Evolved Universal Terrestrial Radio Access (E-UTRA); Physical layer procedures (Release 11)," pp. 1-145, Oct. 2012.

3GPP, TS 36.808, "Evolved Universal Terrestrial Radio Access (E-UTRA); Carrier Aggregation (Release 10)", v10.0.0, Jun. 2012.

3GPP, "UMTS", Universal Mobile Telecommunications System, pp. 1-2, printed on Nov. 17, 2014, Retrieved from the Internet: URL: www.3gpp.orgarticleumts.

A bill, 112th congress, 1st session, Jul. 12, 2011 [online]. Retrieved from the Internet:< URL: http:republicans.energycommerce.house.govMediafileHearingsTelecom071511DiscussionDraft.pdf>.

A. Paulraj, "Is OFDMA, MIMO and OS the right stuff for mobile broad-band?" 63 pages, http://www.ieeevtc.org/vtc2005fall/presentations/paulraj.pdf, Sep. 2005.

A. Pitarokoilis, S. K. Mohammed, and E. G. Larsson, Effect of Oscillator Phase Noise on Uplink Performance of Large MU-MIMO Systems, in Proc. of the 50th Annual Allerton Conference on Communication, Control, and Computing, 2012.

(56) References Cited

OTHER PUBLICATIONS

A. Vance, "Steve Perlman's wireless fix", Businessweek, Jul. 2011, 10 pages [online], Retrieved from the Internet: URL:http://www.businessweek.com/magazine/the-edison-of-silicon-valley-07272011.html.
Abandonment from U.S. Appl. No. 13/475,598 dated Feb. 8, 2016, 1 page.
Abbasi N., "Capacity estimation of HF-MIMO systems," International Conference on Ionospheric Systems and Techniques, 2009, 5 pages.
Adrian K., et al., "Quantum Tagging: Authenticating Location via Quantum Information and Relativistic Signalling Constraints," 2010, Phys. Rev. A84, 012326 (2011), DOI: 10.1103/PhysRevA.84.012326, arXiv: 1008.2147, 9 pages.
Advisory Action for U.S. Appl. No. 10/758,475 dated Oct. 1, 2008, 3 pages.
Advisory Action for U.S. Appl. No. 12/802,989, dated May 4, 2017, 3 pages.
Aggarwal R., et al., "On the Design of Large Scale Wireless Systems," IEEE Journal of Selected Areas Communications, 2012, vol. 31 (2), pp. 1-50.
Airgo—Wireless Without Limits—Homepage, http:www.airgonetworks.com, printed Apr. 9, 2004, 1 page.
Aktas D., et al., "Scaling Results on the Sum Capacity of Cellular Networks with MIMO Links", IEEE Trans. Inform. Theory, 2006, vol. 52, pp. 3264-3274.
Akyildiz I.F., et al., "The Evolution to 4G Cellular Systems: LTE-Advanced," Physical Communication, Elsevier, 2010, vol. 3 (2010), pp. 217-244.
Alamouti S.M., et al., "A simple transmit diversity technique for wireless communications," IEEE Journal on Selected Areas in Communications, 1998, vol. 16(8), pp. 1451-1458.
Alrabadi O.N., et al., "Beamforming via Large and Dense Antenna Arrays above a Clutter," Institute of Electrical and Electronics Engineers Journal on Selected Areas in Communications, 2013, vol. 31 (2), pp. 314-325.
Andersen J. B., et al., "The MIMO Cube—a Compact MIMO Antenna," IEEE Proceedings of Wireless Personal Multimedia Communications International Symposium, vol. 1, Oct. 2002, pp. 112-114.
Andersen J.B., "Antenna Arrays in Mobile Communications: Gain, diversity, and Channel Capacity.1", IEEE Antennas and Propagation Magazine, vol. 42 (2), Apr. 2000, pp. 12-16.
Anderson A.L., et al., "Beamforming in large-scale MIMO Multiuser Links Under a Per-node Power Constraint," Proceedings in International Symposium on Wireless Communication Systems, 2012.
Andrews J.G., "Seven Ways That Hetnet are a Cellular Paradigm Shift," IEEE Communications Magazine, Mar. 2013, [online], Retrieved from the Internet:< URL: http://users.ece.utexas.edu/-jandrews/pubs/And HetNet CommMag2012 v3.pdf>, pp. 136-144.
Andrews M.R., et al., "Tripling the Capacity of Wireless Communications using Electromagnetic Polarization," Nature, 2001, vol. 409, pp. 316-318.
Anritsu, "LTE resource guide", 18 pages, 2009, www.us.anritsu.com.
Araujo D. C., et al., "Channel Estimation for Millimeter-Wave Very-Large MIMO Systems," EUSPICO 2014, in proceedings.
Arnau J., et al., "Dissection of Multibeam Satellite Communications With a Large-scale Antenna System Toolbox," European Wireless 2014 (EW2014), pp. 548-553.
ArrayComm, "Field-Proven Results," Improving wireless economics through MAS software, printed on Mar. 28, 2011, www.arraycomm.comserve.phppage=proof, 3 pages.
Artigue C., et al., "On the Precoder Design of Flat Fading MIMO Systems Equipped with MMSE Receivers: A Large System Approach", IEEE Trans. Inform. Theory, 2011, vol. 57 (7), pp. 4138-4155.
AT&T, "1946: First Mobile Telephone Call" 1 page, Jun. 17, 1946 [online]. Retrieved from the Internet< URL: http:www.corp.att.comattlabsreputationtimeline46mobile.html>.
Baker M., "L TE-Advanced Physical Layer," Alcatei-Lucent, Dec. 2009, 48 pages.
Barbieri A., et al., "Coordinated Downlink Multi-point Communications in Heterogeneous Cellular Networks", (Qualcomm), Information Theory and App. Workshop, Feb. 2012, pp. 7-16.
BelAir Networks, "Small cells", 4 pages, 2007 [online], Retrieved from the Internet:< URL:http:www.belairnetworks.comsitesdefaultfilesVVP SmallCells.pdf>.
Benedetto M.D., et al., "Analysis of the effect of the I/Q baseband Filter mismatch in an OFDM modem," Wireless personal communications, 2000, pp. 175-186.
Bengtsson E.L., "UE Antenna Properties and Their Influence on Massive MIMO System Performance," 2002, 5 pages.
Bengtsson M., "A Pragmatic Approach to Multi-User Spatial Multiplexing," IEEE, 2002, pp. 130-134.
Bernstein D.J., et al., "Post-quantum cryptography", 2009, 248 Pages.
Besson O., et al., "On parameter estimation of MIMO flat-fading channels with frequency offsets," IEEE Transactions on Transaction, Signal Processing, see also Acoustics, Speech, and Signal Processing, vol. 51 (3), 2003, pp. 602-613.
Bhagavatula R., et al., "Sizing up MIMO Arrays," IEEE Vehicular Technology Magazine, 2008, vol. 3 (4), pp. 31-38.
Bjornson E, et al., Designing Multi-User MIMO for Energy Efficiency: When is Massive MIMO the Answer?, IEEE Wireless Communications and Networking Conference (WCNC), Istanbul, Turkey, Apr. 2014.
Bjornson E, et al., Massive MIMO and Small Cells: Improving Energy Efficiency by Optimal Soft-Cell Coordination, ICT, 2013, Wireless Communications Symposium, pp. 5442-5447.
Blelloch G.E., "Introduction to Data Compression", Jan. 31, 2013, pp. 1-55.
Bloomberg Businessweek, "Steve Perlman's Wireless Fix", Aug. 14, 2014, 7 pages [online], Retrieved from the Internet< URL: http://www.businessweek.commagazinethe-edison-of-silicon-valley-07272011.html>.
Boche H., et al., "A General Duality Theory for Uplink and Downlink Beamforming", 2002, vol. 1, pp. 87-91.
Boche H., et al., "Analysis of Different Precoding decoding Strategies for Multiuser Beamforming", IEEE Vehicular Technology Conference, 2003, vol. 1, pp. 39-43.
Bourdoux A., et al., "Non-reciprocal Transceivers in OFDMSDMA Systems: Impact and Mitigation", IEEE, 2003, pp. 183-186.
Brassard G., et al., "A Quantum Bit Commitment Scheme Provably Unbreakable by both Parties", 1993, pp. 362-371.
Brodersen R. et al., "Degrees of Freedom in Multiple Antenna Channels: A Signal Space Approach," IEEE Transactions on Information Theory, 2005, vol. 51 (2), pp. 523-536.
Buhrman H., et al., "Position-Based Quantum Cryptography: Impossibility and Constructions". 2010, 27 pages.
Busboom A., "Arrays and Rekonstruktions—algortihmen fur bildgebende System emit codierter Apertur," Relevant Chapters 1-5, 1999, pp. 128, Translation Included: Busboom, A., "Arrays and reconstruction algorithms for coded aperture imaging systems", vol. 10, No. 572, Translated Chapters, Ch. 1-5, pp. 36.
Bydon, "Silicon Valley Inventor's Radical Rewrite of Wireless", The Wall Street Journal [online]. [retrieved on Jul. 28, 2011] Retrieved from the Internet: URL: http:blogs.wsj.comdigits20110728silicon-valley-inventors-radical-rewrite-of-wireless.
C. Guthy, W. Utschick, and M.L. Honig, Large System Analysis of Projection Based Algorithms for the MIMO Broadcast Channel, in Proc. of the IEEE Intl Symp. Inform. Theory, Austin, U.S.A., Jun. 2010.
Caire, "On Achivable Rates in a Multi-Antenna Broadcast Downlink," IEEE Trans. Info. Th, 2003, vol. 49, pp. 1691-1706.
Catreux S., et al., "Adaptive modulation and MIMO coding for broadband wireless data networks," IEEE Comm. Mag, 2002, vol. 2. pp. 108-115.

(56) References Cited

OTHER PUBLICATIONS

Cerato B., et al., Hardware implementation of low-complexity detector for large MIMO, in Proc. IEEE ISCAS'2009, pp. 593-596, Taipei, May 2009.
Cetiner B.A., et al., "Multifunctional Reconfigurable MEMS Integrated Antennas for Adaptive MIMO Systems", Adaptive Antennas and MIMO Systems for Wireless Systems, IEEE Communications Magazine, vol. 42 (12), Dec. 2004, pp. 62-70.
Cetiner et al., "A Reconfigurable Spiral Antenna for Adaptive MIMO Systems", EURASIP Journal on Wireless Communications and Networking 2005:3, 382-389, plus International Journal of Digital Multimedia Broadcasting, Special Issue on: Audio Coding, Indexing, and Effects for Broadcasting Applications, Call for Papers Hindawi Publishing Corporation, http://www.hindawi.com, pp. 1, and Special Issue on: Advances in 3DTV: Theory and Practice, Call for Papers Hindawi Publishing Corporation, http://www.hindawi.com, pp. 1.
Chae C B., et al., "Adaptive MIMO Transmission Techniques for Broadband Wireless Communication Systems", IEEE Communications Magazine, 2010, vol. 48 (5), pp. 112-118.
Chae C B., et al., "Coordinated Beamforming with Limited Feedback in the MIMO Broadcast Channel," Special Issue on Exploiting Limited Feedback in Tomorrow's Wireless Comm. Networks, IEEE Journal on Sel. Areas in Comm., 2008, vol. 26 (8), pp. 1505-1515.
Chandran N., et al., "Position-Based Cryptography", Department of Computer Science, UCLA, 2009, 50 pages.
Chandrasekaran S., et al., "Near-Optimal Large-MIMO Detection Using Randomized MCMC and Randomized Search Algorithms," Proceeding in Institute of Electrical and Electronics Engineers International Conference on Communications, 2011.
Chapter 26—Electromagnetic-Wave Propagation, 1973, pp. 1-32, Reference Data for Radio Engineers, 5th Edition, Howard W. Sams & Co., Inc.
Chen R., et al., "Transmit selection diversity for unitary precoded multiuser spatial multiplexing systems with linear receivers," IEEE Trans. on Signal Processing, 2005, pp. 1-30.
Chen R., et al., "Transmit Selection Diversity for Unitary Precoded Multiuser Spatial Multiplexing Systems with Linear Receivers," IEEE Trans. on Signal Processing, 2007, vol. 55 (3), pp. 1159-1171.
Chen R., "Multiuser Space-Time Block Coded MIMO System with Downlink," IEEE Communications Society, 2004, pp. 2689-2693.
Chockalingam A., "Low-Complexity Algorithms for Large-MIMO Detection," International Symposium on Communications, Control and Signal Processing , 2010.
Choi J., et al., "Downlink Training Techniques for FDD Massive MIMO Systems: Open-Loop and Closed-Loop Training with Memory," IEEE Journal of Selected Topics in Signal Processing on Signal Processing for Large-Scale MIMO Communications, 2013.
Choi J., et al., "Interpolation Based Transmit Beamforming for MIMO-OFDM with Limited Feedback," IEEE Transactions on Signal Processing, 2005, vol. 53 (11), pp. 4125-4135.
Choi J., et al., "Noncoherent Trellis Coded Quantization: A Practical Limited Feedback Technique for Massive MIMO Systems," Nov. 8, 2013, pp. 1-14.
Choi L.U., et al., "A transmit preprocessing technique for multiuser MIMO systems using a decomposition approach," IEEE Trans. Wireless Comm, 2004, vol. 3 (1), pp. 20-24.
Choi W., et al., "Opportunistic space division multiple access with beam selection," IEEE Trans. on Communications, 2006, pp. 1-23.
Christian C., et al., "Oblivious Transfer with a Memory-Bounded Receiver", IEEE, 1998, pp. 493-502.
Chu D., et al., "Polyphase codes with good periodic correlation properties (corresp.)," IEEE Trans. Inform. Theory, 1972, vol. 18 (4), pp. 531-532.
Chuah C N., et al., "Capacity Scaling in MIMO Wireless Systems under Correlated Fading", IEEE Trans. Inform. Theory, 2002, vol. 48 (3), pp. 637-650.
Cohn H., et al., "Group-theoretic Algorithms for Matrix Multiplication", IEEE Symposium on Foundations of Computer Science, 2005, pp. 379-388.
Communication pursuant to Article 94(3) EPC for European Application No. 06718208.9, May 10, 2017, 4 pages.
Communication pursuant to Article 94(3) EPC for European Application No. 08798313.6, dated May 2, 2017, 7 pages.
Communication pursuant to Article 94(3) EPC for European Application No. 10156950.7, dated May 9, 2017, 9 pages.
Communication pursuant to Article 94(3) EPC for European Application No. 10156954, dated Jan. 25, 2017, 5 pages.
Coopersmith D., et al., "Matrix Multiplication via Arithmetic Progression", J. Symb. Comp, 1990, vol. 9, pp. 251-280.
Costa, "Writing on Dirty Paper," IEEE Transactions on Information Theory, 1983, vol. IT-29 (3), pp. 439-441.
Couillet R., et al., "A Deterministic Equivalent for the Analysis of Correlated MIMO Multiple Access Channels," IEEE Trans. Inform. Theory, 2011, vol. 57 (6), pp. 3493-3514.
Coulson J., et al., "Maximum likelihood synchronization for OFDM using a pilot symbol: analysis," IEEE Journal on Selected Areas in Communications, 2001, vol. 19 (12), pp. 2495-2503.
Dahlman E., et al., "4G: LTE/LTE-Advanced for Mobile Broadband", Elsevier, 2011, Cover page, Title page, Copyright page, Table of Contents, 21 pages.
Dai et al., "Reduced-complexity performance-lossless (quasi-)maximum-likelihood detectors for S-QAM modulated MIMO systems," Electronics Letters, 2013, vol. 49(11), pp. 724-725.
Dai et al., "Reducing the Complexity of Quasi-ML Detectors for MIMO Systems Through Simplified Branch Metric and Accumulated Branch Metric Based Detection," Communications Letters, 2013, vol. 17(5), pp. 916-919.
Dai X., et al., "Carrier frequency offset estimation for OFDM/SDMA systems using consecutive pilots," IEEE Proceedings Communications, 2005, vol. 152, pp. 624-632.
Damgard I., et al., "Cryptography in the Bounded Quantum-Storage Model", IEEE, 2005, pp. 24-27.
Daniel J., "Introduction to public safety: RF Signal Distribution Using Fiber Optics," 2009, 13 pages, http://www.rfsolutions.com/fiber.pdf.
Datta et al., "Random-Restart Reactive Tabu Search Algorithm for Detection in Large-MIMO Systems," IEEE Communications Letters, 2010, vol. 14(12), pp. 1107-1109.
Datta T., et al., "A Novel MCMC Based Receiver for Large-Scale Uplink Multiuser MIMO Systems" Jan. 2012, 37 pages.
Debbah M., et al., "MIMO Channel Modelling and the Principle of Maximum Entropy," IEEE Transactions on Information Theory, 2005, vol. 51 (5), pp. 1667-1690.
Decision of Grant a Patent for Japanese Application No. 2016120928, dated Apr. 10, 2017, 6 pages.
Decision of Grant from foreign counterpart Japanese Patent Application No. 2015-510498, dated Jun. 14, 2017, 6 pages.
Decision of Grant from foreign counterpart Russian Patent Application No. 2014151216, dated Jan. 31, 2017, 18 pages.
Decision of Refusal from foreign counterpart Japanese Patent Application No. 2014530763, dated Dec. 19, 2016, 6 pages.
Decision of Refusal from foreign counterpart Korean Patent Application No. 2010-7006265, dated Apr. 23, 2015, 2 pages.
Decision of Rejection office action for Japan Patent Application No. 2008-513486 dated Jul. 19, 2011, 2 pages.
Degen C., et al., "Performance evaluation of MIMO systems using dual-polarized antennas," International Conference on Telecommunications, 2003, vol. 2, pp. 1520-1525.
Delfas N., "Mobile Data Wave: Who Dares to Invest, Wins," Morgan Stanley Research Global, Jun. 13, 2012, pp. 1-62.
Demirodoeven N., et al., "Hybrid Cars Now, Fuel Cell Cars Later", Aug. 13, 2004, vol. 305 Science, pp. 974-976, www.sciencemag.org.
Derrick W K et al., "Energy-Efficient Resource Allocation in OFDMA Systems with Large Numbers of Base Station Antennas", 2011, 30 pages.
Devasirvatham, "Radio Propagation Measurements At 850MHz. 1.7GHz and 4GHz Inside Two Dissimilar Office Buildings," Electronics Letter, 1990, vol. 26 (7), pp. 445-447.

(56) References Cited

OTHER PUBLICATIONS

Devasirvatham, "Time Delay Spread and Signal Level Measurements of 850 MHz Radio Waves in Building Environments," IEEE Transactions on Antennas and Propagation, 1986, vol. AP-34 (11), pp. 1300-1305.
Devasirvatham, "Time Delay Spread Measurements At 850 MHz and 1 7 GHz Inside A Metropolitan Office Building," Electronics Letters, 1989, vol. 25 (3), pp. 194-196.
Devillers B., et al. Mutual coupling effects in multiuser massive MIMO base stations, IEEE Antennas and Propagation Society International Symposium (APSURSI), Jul. 2012.
Dicke R.H., "Scatter-Hole Cameras for X-Rays and Gamma Rays," Astrophysical Journal, 1968, vol. 153, pp. L101-L106.
Dietrich C B., et al., "Spatial, polarization, and pattern diversity for wireless handheld terminals," Proc. IEEE Antennas and Prop. Symp, 2001, vol. 49, pp. 1271-1281.
Dighe et al., "Analysis of Transmit-Receive Diversity in Rayleigh Fading", IEEE Transactions on Communications, vol. 51 (4), Apr. 2003, pp. 694-703.
DigitalAir wireless, GeoDesy Laser Links 1.25Gbps Full Duplex. 2015, 4 pages. Retrieved from the Internet< URL: http:www.digitalairwireless.comoutdoor-wireless-networkspoint-to-point-wirelesslaser-fso-linksgeodesy-fso-laser-links.html>.
DigitalAir wireless, Outdoor Wireless, Sep. 29, 2015, 5 pages, printed on Sep. 29, 2015. Retrieved from the Internet< URL: http:www.digitalairwireless.comoutdoor-wireless-networks.html>.
Ding P., et al., "On the sum rate of channel subspace feedback for multi-antenna broadcast channels," IEEE Globecom, 2005 vol. 5, pp. 2699-2703.
Discussion Draft, A bill, 112th congress, 1st session, Jul. 12, 2011, House Republicans, Spectrum Innovation Act of 2011, 2011, 55 pages.
Dohler M., et al., "A Step Towards MIMO: Virtual Antenna Arrays," European Cooperation in the Field of Scientific and Technical Research, 2003, 9 pages.
Dong L., et al., "Multiple-input multiple-output wireless communication systems using antenna pattern diversity," Proceedings of IEEE Globe Telecommunications Conference, 2002, vol. 1, pp. 997-1001.
Dumont J., et al. "On the Capacity Achieving Transmit Covariance Matrices for MIMO Rician Channels: An Asymptotic Approach," IEEE Transactions on Information Theory, 2010, vol. 56 (3), pp. 1048-1069.
Duplicity J., et al., "MU-MIMO in LTE Systems," EURASIP Journal on Wireless Communications and Networking, 2011, 10 pages.
Dziembowski Stefan, et al., "On Generating the Initial Key in the Bounded-Storage Model", Springer, LNCS 3027, EUROCRYPT 2004, pp. 126-137.
E. Riegler, et al., "Asymptotic Statistics of the Mutual Information for Spatially Correlated Rician Fading MIMO Channels with Interference", IEEE Trans. Inform. Theory, 2010, vol. 56 (4), pp. 1542-1559.
Eklund C., et al., "IEEE Standard 802.16: A Technical Overview of the WirelessMAN Air Interface for Broadband Wireless Access," IEEE Communications Magazine, Jun. 2002, 12 pages, http://ieee802.org/16/docs/02/C80216-02_05.pdf.
Ekstrom H., et al., "Technical Solutions for the 3G Long-Term Evolution", IEEE Communications Magazine, 2006, pp. 38-45.
Erceg V., et al., "TGn Channel Models," IEEE 802.11-03940r4, May 2004, 45 pages.
Ericsson, The evolution of EDGE, Feb. 2007, pp. 1-18, Retrieved from the Internet: URL: http:www.ericsson.comresdocswhitepapersevolution_to_edge.pdf.
ETSI, Mobile Technologies GSM, Retrieved from the Internet: URL: http://www.etsi.org/WebSite/Technologies/gsm.asp.
ETSI Reconfigurable Radio Systems: Status and Future Directions on Software Defined Radio and Cognitive Radio Standards, IEEE Communications Magazine, IEEE Service Center, Sep. 2010, vol. 48 (9), pp. 78-86.
European Search Report for Application No. EP05254757 dated Sep. 13, 2005, 9 pages.
European Supplementary Search Report from European Patent Application No. 06718208.9 dated Jan. 22, 2015, 6 pages.
Examination Report from counterpart Australian Patent Application No. AU2014200745 dated Sep. 25, 2015, 3 pages.
Examination Report from foreign counterpart Australian Patent Application No. 2016219662, dated Sep. 9, 2016, 2 pages.
Examination Report from foreign counterpart New Zealand Patent Application No. 622137 dated Dec. 21, 2016, 3 pages.
Examination Report No. 1 from Foreign Counterpart Patent Application No. 2012308632 dated Oct. 11, 2016, 3 pages.
Examination Report No. 2 from Foreign Counterpart Patent Application No. 2012308632, dated Jun. 6, 2017, 5 pages.
Examiner's Report for Canadian Patent Application No. 2539333 dated Dec. 4, 2012, 15 pages.
Examiner's Report from counterpart Australian Patent Application No. 2013256044 dated May 9, 2016, 2 pages.
Examiner's Report from counterpart Canadian Patent Application No. 28656772 dated Jan. 7, 2016, 3 pages.
Examiner's Report from foreign counterpart Canadian Patent Application No. CN2695799 dated Apr. 1, 2015, 4 pages.
Extended European Search Report for Application No. 06750805.1 dated Dec. 1, 2016, 12 pages.
Extended European search report for Application No. 08798313.6, dated Nov. 14, 2012, 10 pages.
Extended European Search Report from EP Application No. 10156950.7, dated Jun. 11, 2012, 10 pages.
Extended European Search Report from EP Application No. 10184659.0, dated Nov. 29, 2012, 8 pages.
Extended European Search Report from EP Application No. 13843203.4, dated Feb. 15, 2016, 8 pages.
Extended European Search Report from EP Application No. 13856705.2, dated Mar. 2, 2016, 10 pages.
Extended European Search Report from European Patent Application No. 14779084.4, dated Sep 29, 2016, 8 pages.
Extended Search Report from counterpart European Patent Application No. EP13784690.3 dated Nov. 23, 2015, 4 pages.
Extended Search Report Office Action from counterpart European Patent Application No. EP13790935.4 dated Dec. 1, 2015, 9 pages.
F. Dupuy, et al., On the Capacity Achieving Covariance Matrix for Frequency Selective MIMO Channels Using the Asymptotic Approach, IEE Trans. Inform. Theory, 2010, pp. 2156-2157.
F. Dupuy, et al., On the Capacity Achieving Covariance Matrix for Frequency Selective MIMO Channels Using the Asymptotic Approach, IEEE Trans. Inform. Theory, 2011, vol. 57 (9), pp. 5737-5753.
F. Rusek, et at, "Scaling up MIMO: Opportunities and Challenges with Very Large Arrays", IEEE Signal Proces. Mag., 2012, vol. 30 (1), pp. 1-30.
Fakhereddin M.J., et al., "Combined effect of polarization diversity and mutual coupling on MIMO capacity," Proc. IEEE Antennas and Prop. Symp, 2003, vol. 2, pp. 495-498.
FCC, Broadband action agenda, National Broadband Plan, 2010, pp. 1-8, Retrieved from the Internet< URL: http://www.broadband.gov/plan/national-broadband-plan-action-agenda.pdf>.
FCC, Open commission meeting, Sep. 23, 2010, Retrieved from the Internet:< URL: http:reboot.fcc.govopen-meetings2010september>.
Federal Communications Commission, "Authorization of Spread Spectrum Systems under Parts 15 and 90 of the FCC Rules and Regulations", Jun. 1985, 18 pages.
Fella A., "Adaptive WiMAX Antennas: The promise of higher ROI," http:www.wimax.comcommentaryspotlightspotlight8-08-2005searchterm=Adlane Fella, printed May 9, 2008, Aug. 8, 2005, 3 pages.
Feng S., et al., "Self-organizing networks (SON) in 3GPP LTE", Nom or Research, May 2008, pp. 1-15.
Fenimore E.E., "Coded Aperture Imaging: Predicted Performance of Uniformly Redundant Arrays," Applied Optics, 1978, vol. 17 (22), pp. 3562-3570.

(56) References Cited

OTHER PUBLICATIONS

Fenimore E.E., et at, "Coded Aperture Imaging: The Modulation Transfer Function for Uniformly Redundant Arrays," Applied Optics, 1980, vol. 19(14), pp. 2465-2471.
Fenimore E.E., et at, "Coded Aperture Imaging with Uniformly Redundant Arrays," Applied Optics, 1978, vol. 17(3), pp. 337-347.
Fenimore E.E., et al., "Comparison of Fresnel Zone Plates and Uniformly Redundant Arrays," SPIE, Applications of Digital Image Processing, 1978, vol. 149, pp. 232-236.
Fenimore E.E., et al., "Fast Delta Hadamard Transform," Applied Optics, 1981, vol. 20(17), pp. 3058-3067.
Fenimore E.E., et al., "Tomographical Imaging Using Uniformly Redundant Arrays," Applied Optics, 1979, vol. 18(7), pp. 1052-1057.
Fenimore E.E., et at, "Uniformly Redundant Array Imaging of Laser Driven Compressions: Preliminary Results," Applied Optics, 1979, vol. 18(7), pp. 945-947.
Fenimore E.E., et at, "Uniformly Redundant Arrays: Digital Reconstruction Methods," Applied Optics, 1981, vol. 20(10), pp. 1858-1864.
Fenimore E.E., et al., "Uniformly Redundant Arrays," Digital Signal Processing Symposium, 1977, pp. 1-14.
Fenimore E.E., "Large Symmetric π Transformations for Hadamard Transforms," Applied Optics, 1983, vol. 22(6), pp. 826-829.
Fenimore E.E., "Time-Resolved and Energy-Resolved Coded Aperture Images with URA Tagging," Applied Optics, 1987, vol. 26 (14), pp. 2760-2769.
Fenimore E.E., "X-Ray Imaging Using Uniformly Redundant Arrays," 1979, pp. 1-4.
Final Office Action for Japanese Application No. 2005223345 dated May 12, 2011, 9 pages.
Final Office Action from U.S. Appl. No. 14/086,700 dated Oct. 14, 2016, 11 pages.
Final Office Action from U.S. Appl. No. 10/758,475 dated Jul. 8, 2008, 8 pages.
Final Office Action from U.S. Appl. No. 10/817,731 dated Jul. 9, 2008, 21 pages.
Final Office Action from U.S. Appl. No. 10/817,731 dated Sep. 11, 2009, 36 pages.
Final Office Action from U.S. Appl. No. 11/039,029 dated Dec. 15, 2006, 10 pages.
Final Office Action from U.S. Appl. No. 11/039,029 dated Mar. 3, 2009, 9 pages.
Final Office Action from U.S. Appl. No. 11/039,029 dated Nov. 6, 2007, 11 pages.
Final Office Action from U.S. Appl. No. 11/039,029 dated Nov. 6, 2008, 7 pages.
Final Office Action from U.S. Appl. No. 11/210,098 dated Aug. 21, 2008, 10 pages.
Final Office Action from U.S. Appl. No. 11/210,098 dated Jan. 13, 2009, 7 pages.
Final Office Action from U.S. Appl. No. 11/210,098 dated Jan. 29, 2007, 9 pages
Final Office Action from U.S. Appl. No. 11/210,098 dated Mar. 31, 2008, 8 pages.
Final Office Action from U.S. Appl. No. 11/899,814 dated Jul. 29, 2008, 8 pages.
Final Office Action from U.S. Appl. No. 11/899,814 dated Mar. 3, 2009, 8 pages.
Final Office Action from U.S. Appl. No. 12/291,856 dated Sep. 15, 2011, 16 pages.
Final Office Action from U.S. Appl. No. 12/291,858 dated Sep. 15, 2011, 15 pages.
Final Office Action from U.S. Appl. No. 12/630,627 dated Apr. 2, 2013, 23 pages.
Final Office Action from U.S. Appl. No. 12/630,627 dated Oct. 20, 2011, 13 pages.
Final Office Action from U.S. Appl. No. 12/802,958 dated Apr. 15, 2015, 24 pages.
Final Office Action from U.S. Appl. No. 12/802,958 dated Apr. 29, 2016, 33 pages.
Final Office Action from U.S. Appl. No. 12/802,958, dated Jun. 7, 2017, 18 pages.
Final Office Action from U.S. Appl. No. 12/802,958 dated Jun. 25, 2013, 48 pages.
Final Office Action from U.S. Appl. No. 12/802,974 dated Aug. 1, 2014, 23 pages.
Final Office Action from U.S. Appl. No. 12/802,974 dated Nov. 30, 2015, 22 pages.
Final Office Action from U.S. Appl. No. 12/802,975 dated Aug. 4, 2014, 40 pages.
Final Office Action from U.S. Appl. No. 12/802,975 dated Dec. 14, 2015, 26 pages.
Final Office Action from U.S. Appl. No. 12/802,975 dated Dec. 22, 2016, 29 pages.
Final Office Action from U.S. Appl. No. 12/802,988 dated Aug. 2, 2013, 13 pages.
Final Office Action from U.S. Appl. No. 12/802,988, dated Feb. 8, 2017, 13 pages.
Final Office Action from U.S. Appl. No. 12/802,988 dated Jan. 13, 2016, 11 pages.
Final Office Action from U.S. Appl. No. 12/802,988 dated Nov. 27, 2012, 12 pages.
Final Office Action from U.S. Appl. No. 12/802,988 dated Oct. 21, 2014, 13 pages.
Final Office Action from U.S. Appl. No. 12/802,988 dated Sep. 5, 2012, 8 pages.
Final Office Action from U.S. Appl. No. 12/802,989 dated Aug. 25, 2015, 24 pages.
Final Office Action from U.S. Appl. No. 12/802,989 dated Jun. 12, 2014, 17 pages.
Final Office Action from U.S. Appl. No. 12/802,989 dated Nov. 2, 2016, 14 pages.
Final Office Action from U.S. Appl. No. 12/802,989 dated Nov. 27, 2012, 12 pages.
Final Office Action from U.S. Appl. No. 13/232,996 dated Apr. 11, 2017, 149 pages.
Final Office Action from U.S. Appl. No. 13/232,996 dated Jul. 31, 2013, 12 pages.
Final Office Action from U.S. Appl. No. 13/232,996 dated Nov. 12, 2015, 14 pages.
Final Office Action from U.S. Appl. No. 13/232,996 dated Oct. 23, 2014, 15 pages.
Final Office Action from U.S. Appl. No. 13/233,006 dated Feb. 18, 2014, 18 pages.
Final Office Action from U.S. Appl. No. 13/233,006 dated Nov. 5, 2015, 10 pages.
Final Office Action from U.S. Appl. No. 13/233,006 dated Oct. 12, 2016, 10 pages.
Final Office Action from U.S. Appl. No. 13/464,648 dated Aug. 1, 2013, 10 pages.
Final Office Action from U.S. Appl. No. 13/475,598 dated Aug. 27, 2014, 30 pages.
Final Office Action from U.S. Appl. No. 13/652,259 dated Aug. 4, 2016, 7 pages.
Final Office Action from U.S. Appl. No. 13/652,259 dated Oct. 28, 2014, 9 pages.
Final Office Action from U.S. Appl. No. 13/652,259 dated Sep. 23, 2015, 6 pages.
Final Office Action from U.S. Appl. No. 13/797,950 dated Feb. 2, 2016, 65 pages.
Final Office Action from U.S. Appl. No. 13/797,984, dated Sep. 29, 2016, 13 pages.
Final Office Action from U.S. Appl. No. 13/797,984 dated Aug. 20, 2015, 15 pages.
Final Office Action from U.S. Appl. No. 13/798,004 dated Feb. 2, 2016, 12 pages.
Final Office Action from U.S. Appl. No. 13/798,004, dated Jun. 26, 2017, 15 pages.
Final Office Action from U.S. Appl. No. 13/798,004 dated Oct. 22, 2014, 8 pages.

(56) References Cited

OTHER PUBLICATIONS

Final Office Action from U.S. Appl. No. 13/844,355 dated Aug. 12, 2015, 20 pages.
Final Office Action from U.S. Appl. No. 13/844,355, dated Dec. 15, 2016, 23 pages.
Final Office Action from U.S. Appl. No. 14/023,302 dated Mar. 2, 2015, 5 pages.
Final Office Action from U.S. Appl. No. 14/086,700 dated Sep. 2, 2015, 9 pages.
Final Office Action from U.S. Appl. No. 14/611,565 dated Jun. 16, 2016, 22 pages.
Final Office Action with partial English translation for Japanese Patent Application No. 2005223345 dated Feb. 18, 2014, 23 pages.
First Exam Report from counterpart New Zealand Application No. 701567, dated Feb. 3, 2016, 4 pages.
First Exam Report from counterpart New Zealand Application No. 701691, dated Feb. 10, 2016, 4 pages.
First Exam Report from counterpart New Zealand Application No. 701691, dated Feb. 3, 2016, 4 pages.
First Exam Report from counterpart New Zealand Patent Application No. 717370, dated Apr. 8, 2016, 2 pages.
First Examination Report from counterpart Australian Patent Application No. 2014248533, dated Mar. 1, 2017, 5 pages.
First Examination Report mailed for counterpart Australian Patent Application No. AU2011323559 dated Sep. 30, 2015, 3 pages.
First Examination Report mailed for foreign counterpart New Zealand Patent Application No. 622137 dated Aug. 28, 2014, 2 pages.
First Office Action and Search Report from counterpart Taiwan Application No. 100139880, dated Feb. 26, 2016, 27 pages.
First Office Action and Search report from foreign counterpart China Patent Application No. 201380026522.2, dated Mar. 27, 2017, 20 pages.
First Office Action and Search Report from foreign counterpart Chinese Patent Application No. 201210466082X dated Apr. 3, 2015, 26 pages.
First Office Action for counterpart Japan Patent Application No. JP2014264325 dated Nov. 12, 2015, 4 pages.
First office action for foreign counterpart China Patent Application No. 200680021909.9 dated Feb. 25, 2011, 4 pages.
First Office Action from counterpart China Patent Application No. 200880102933.4 dated Dec. 7, 2012, 20 pages.
First Office Action from counterpart European Patent Application No. 201380035543.0, dated Feb. 15, 2016, 8 pages.
First Office Action from counterpart Korean Patent Application No. 10-2015-7033311, dated Feb. 16, 2016, 12 pages.
First Office Action from counterpart Taiwan Patent Application No. 102117728 dated Aug. 9, 2016, 11 pages.
First Office Action from European Patent Application No. 05254757.7 dated Dec. 3, 2012, 6 pages.
First Office Action from foreign counterpart Mexican Patent Application No. MXa2014013795 dated Nov. 1, 2016, 3 pages.
First Office Action from foreign counterpart Mexican Patent Application No. MXa2014013795 dated Oct. 30, 2015, 7 pages.
First Office Action from foreign counterpart Russian Patent Application No. 2011131821 dated Jun. 26, 2015, 8 pages.
First Office Action dated Dec. 7, 2010, System and Method for Powering a Vehicle using Radio Frequency Signals and Feedback, U.S. Appl. No. 12/291,858, filed Nov. 14, 2008, pp. 1-12.
First Office Action dated Apr. 24, 2015 for foreign counterpart Mexican Patent Application No. MX/a/2014/002900 dated Apr. 24, 2015, 3 pages.
First Office Action mailed for counterpart European Patent Application No. 12762167.0 dated Jan. 4, 2016, 4 pages.
First Office Action Report for counterpart Chinese Patent Application No. 201310407419.4 dated Nov. 20, 2015, 8 pages.
Fletcher P.N., et al., "Mutual coupling in multi-element array antennas and its influence on MIMO channel capacity," IEEE Electronics Letters, 2003, vol. 39 (4), pp. 342-344.
Forax RF-over-fiber Communications Systems, Syntonics, 2011, 2 pages, http://www.syntonicscorp.com/products/products-foraxRF.html.
Foreign counterpart Final Rejection for Korean Patent Application No. 10-2007-7028402 dated Nov. 15, 2012, 8 pages.
Foreign counterpart First Office Action for Russian Patent Application No. 2007148006/11(052608), dated Nov. 17, 2009, 7 pages.
Foreign counterpart Inquiry Japan Patent Application No. 2008-513486 dated Mar. 26, 2012, 2 pages.
Foreign counterpart Notice of Acceptance for Australia Patent Application No. 2006249578 dated Jan. 3, 2012, 3 pages.
Foreign counterpart Notice of Grant for China Patent Application No. 200680021909.9 dated Mar. 5, 2012, 3 pages.
Foreign counterpart Notice of Grant for Russian Patent Application No. 2007148006/11(052608), dated Mar. 17, 2010, 12 pages.
Forenza A., et al., "Adaptive MIMO transmission for exploiting the capacity of spatially correlated channels," IEEE Trans. on Veh. Tech, 2007, vol. 56 (2), pp. 619-630.
Forenza A., et al., "Adaptive MIMO transmission scheme: Exploiting the spatial selectivity of wireless channels", Proceedings Institute of Electrical and Electronics Engineers Vehicular Technology Conference, 2005, vol. 5, pp. 3188-3192.
Forenza A., et al., "Benefit of Pattern Diversity Via 2-element Array of Circular Patch Antennas in Indoor Clustered MIMO Channels," IEEE Trans. on Communications, 2006, vol. 54 (5), pp. 943-954.
Forenza A., et al., "Impact of antenna geometry on MIMO communication in indoor clustered channels," Proc. IEEE Antennas and Prop. Symp, 2004, vol. 2, pp. 1700-1703.
Forenza A., et al., "Link Adaptation and Channel Prediction in Wireless OFDM Systems," proceeding of IEEE International Midwest Symposium on Circuits and Systems, 2002, pp. 211-214.
Forenza A., et al., "Optimization Methodology for Designing 2-CPAs Exploiting Pattern Diversity in Clustered MIMO Channels", Institute of Electrical and Electronics Engineers Transactions on Communications, 2008, vol. 56 (10), pp. 1748-1759.
Forenza A., et al., "Switching Between OSTBC and Spatial Multiplexing with Linear Receivers in Spatially Correlated MIMO Channels," IEEE Configuration Guide: Unified Model, 2006, pp. 1-5.
Foschini G.J., et al., "Simplified processing for high spectral efficiency wireless communication employing multi-element arrays," IEEE Jour. Select. Areas in Comm, 1999, vol. 17 (11), pp. 1841-1852.
Fradella R.B., "Electric Highway Vehicles: A Way to Save Our Mobility, Air, Energy, and Fortunes" Technology Assessment of Future Intercity Passenger Transportation Systems, vol. 2, Mar. 1976, pp. cover page iii, v, vi, title page, and XIX3-XIX-27.
Friends of CRC, SHARP (Stationary High Altitude Relay Platform), http://www.friendsofcrc.ca/Projects/SHARP.html, page created on Jun. 25, 1996 by Cynthia Boyko, pp. 1-5.
Friends of CRC, "The Friends of CRC Association", Home page, printed on May 14, 2008, 3 pages, http://www.friendsofcrc.ca/.
Further Examination Report from counterpart New Zealand Application No. 701567, dated Aug. 24, 2016, 6 pages.
Further Examination Report from counterpart New Zealand Application No. 701691, dated Sep. 26, 2016, 3 pages.
Fusco T., et al., "Blind Frequency-offset Estimation for OFDM/OQAM Systems," IEEE Transactions on [see also Acoustics, Speech, and Signal Processing, IEEE Transactions on], 2007, vol. 55, pp. 1828-1838.
G. Caire, et al., "On the Achievable Throughput of a Multiantenna Gaussian Broadcast Channel," IEEE Transactions on Information Theory, Jul. 23, 2001, vol. 49, pp. 1-46.
G. D. Durgin, "Space-Time Wireless Channels", Prentice Hall Communications Engineering and Emerging Technologies Series, 2003, Upper Saddle River, NJ, Cover page, Title pages, Copyright page, Table of Contents, Preface, 16 pages, USA.
G. J. Foschin, et al., "Coordinating multiple antenna cellular networks to achieve enormous spectral efficiency", Proceedings of the IEEE, Aug. 2006, vol. 153 (4), pp. 548-555.
G. J. Foschini, et al., The Value of Coherent Base Station Coordination, Conference on Information Sciences and Systems (CISS 2005), Mar. 16-18, 2005, 6 pages.

(56) References Cited

OTHER PUBLICATIONS

Gao X., et al., "Linear Pre-Coding Performance in Measured Very-Large MIMO Channels," IEEE Vehicular Technology, 2011, pp. 1-5.
Garcia C.R., "Channel Model for Train to Train Communication Using the 400 MHz Band," in Proc. of IEEE Vehicular Technology Conference, 2008, pp. 3082-3086.
Gesbert D., et al., "From Theory to Practice: An Overview of MIMO Space—Time Coded Wireless Systems," IEEE Journal on Selected Areas in Communications, 2003, vol. 21 (3), pp. 281-302.
Gesbert D., et al., "Multi-Cell MIMO Cooperative Networks: A New Look at Interference," IEEE Journal on Selected Areas in Communications, 2010, vol. 28 (9), pp. 1380-1408.
Gesbert D., et al., "Outdoor MIMO Wireless Channels: Models and Performance Prediction," IEEE Transactions on Communications, 2002, vol. 50 (12), pp. 1926-1934.
G. Guthy, et al., Large System Analysis of the Successive Encoding Successive Allocation Method for the MIMO BC, Proc. of the International ITG Workshop on Smart Antennas, Bremen, Germany, Feb. 2010.
Ghogho M., et al., "Training design for multipath channel and frequency offset estimation in MIMO systems," IEEE Transactions on Signal Processing, 2006, vol. 54 (10), pp. 3957-3965.
Glazunov A.A., et al., "Experimental Characterization of the Propagation Channel along a Very Large Virtual Array in a Reverberation Chamber", Progress in Electromagnetics Research B, 2014, vol. 59, pp. 205-217.
Goldman D., "Sorry, America: your wireless airwaves are full", CNN Money, 3 pages, http://money.cnn.com/2012/02/21/technology/spectrum crunch/index.html.
Gopalakrishnan B., et al., "An Analysis of Pilot Contamination on Multi-User MIMO Cellular Systems with Many Antennas," Proceedings in Signal Processing Advances in Wireless Communications, 2011.
Gottesman S., et al., "New Family of Binary Arrays for Coded Aperture imaging," Applied Optics, 1989, vol. 28(20), pp. 4344-4392.
Govindasamy S., et al., "Asymptotic Spectral Efficiency of the Uplink in Spatially Distributed Wireless Networks with Multi-Antenna Base Stations," IEEE Transactions on Communications, 2013, vol. 61(7), pp. 1-13.
GSMA, GSM technology, 2014, 1 page [online]. Retrieved from the Internet< URL: http:www.gsmworld.comtechnologyindex.html>.
Guey J.C., et al., "Modeling and Evaluation of MIMO Systems Exploiting Channel Reciprocity in TDD Mode," VTC 2004-Fall, IEEE 60th, 2004, pp. 4265- 4269.
Guillaud M., et al., "A Practical Method for Wireless Channel Reciprocity Exploitation Through Relative Calibration", IEEE Proceedings of Sign Processing, Aug. 2005, vol. 1, pp. 403- 406.
Guillaud M., et al., "A Specular Approach to MIMO Frequency selective Channel Tracking and Prediction," in Proceedings IEEE Signal Processing Advances in Wireless Communications, Jul. 2004, pp. 59-63.
Gunashekar G., "Investigations into the Feasibility of MIMO Techniques within the HF Band: Preliminary Results," Radio Science, 2009, 33 pages.
Gunson J., et al., "Optimum Design of a Coded Mask X-Ray Telescope for Rocket Applications," Monthly Notices of the Royal Astronomical Society, 1976, vol. 177, pp. 485-497.
Guthy C., et al., "Large System Analysis of Sum Capacity in the Gaussian MIMO Broadcast Channel", IEEE J. Sel. Areas Communication, 2013, vol. 31 (2), pp. 149-159.
Hachem W., et al., "A New Approach for Mutual Information Analysis of Large Dimensional Multi-Antenna Channels," IEEE Transactions on Information Theory, 2008, vol. 54(9), pp. 3987-4004.
Hakkarainen a., et al., "Widely-Linear Beamforming and RF Impairment Suppression in Massive Antenna Arrays", Journal of Communications and Networks, 2013, vol. 15 (4), pp. 383-397.
Hallen H., "Long-Range Prediction of Fading Signals", Institute of Electrical and Electronics Engineers Signal Processing Magazine, 2000, vol. 17 (3), pp. 62-75.
Haring L., "Residual carrier and sampling frequency synchronization in multiuser OFDM systems," IEEE 63rd Vehicular Technology Conference, 2006, vol. 4, pp. 1937-1941.
Hazlett et al., "Radio Spectrum for a Hungry Wireless World", Sep. 22, 2011, 41 pages.
Heath R W., et al., "Antenna selection for spatial multiplexing systems with linear receivers," IEEE Trans. Comm, 2001, vol. 5, pp. 142-144.
Heath R W., et al., "Switching between diversity and multiplexing in MIMO systems," IEEE Trans. Comm, 2005, vol. 53 (6), pp. 962-968.
Heath R.W., et al., "Exploiting Limited Feedback in Tomorrow's Wireless Communication Networks," IEEE Journal on Sel. Areas in Comm., Special Issue on Exploiting Limited Feedback in Tomorrow's Wireless Communication Networks, 2008, vol. 26 (8), pp. 1337-1340.
Heath R.W., et al., "Switching between Multiplexing and Diversity Based on Constellation Distance," Proc. of Allerton Conf on 208, Comm. Control and Comp, Oct. 4-6, 2000, pp. 212-221.
Hendriks B., et al., "Through a Lens Sharply," IEEE Spectrum, 2004, pp. 32-36.
Hewlett Packard., "GPS and Precision Timing Applications," Application Note 1272, pp. 1-28.
High Frequency Active Auroral Research Program—Homepage, printed Apr. 9, 2004, http:www.haarp.alaska.edu, 1 page.
Hochwald B., et al., "Multi-Antenna Channel Hardening and its Implications for Rate Feedback and Scheduling", Institute of Electrical and Electronics Engineers Transactions on Information Theory, 2004, vol. 50 (9), pp. 1893-1909.
Hochwald B.M., et al., "A Vector-Perturbation Technique for Near-Capacity Multiantenna Multiuser Communication—Part I: Channel Inversion and Regularization", Institute of Electrical and Electronics Engineers Transactions on Communications, 2005, vol. 53 (1), pp. 195-202.
Hochwald B.M., et al., "A Vector-Perturbation Technique for Near-Capacity Multiantenna Multiuser Communication—Part II: Perturbation", Institute of Electrical and Electronics Engineers Transactions on Communications, 2005, vol. 53 (3), pp. 537-544.
Hoeffert M., et al., "Climate Change and Energy, Overview", Encyclopedia of Energy, vol. 1, Copyright 2004, Elsevier, Article No. NRGY: 00396, 23 pages.
Hong M., et al., "Joint Base Station Clustering and Beamformer Design for Partial Coordinated Transmission in Heterogeneous Networks," IEEE Journal on Selected Areas in Communications, 2012, vol. 31 (2), pp. 1-20.
Hosseini K., et al., "Massive MIMO and Small Cells: How to Densify Heterogeneous Networks," Wireless Communications Symposium, IEEE ICC, 2013, pp. 5442-5447.
Hoydis J., et al., "Iterative Deterministic Equivalents for the Performance Analysis of Communication Systems," Dec. 18, 2011, pp. 1-43.
Huang Y., et al., "Joint Beamforming and Power Control in Coordinated Multicell: Max-Min Duality, Effective Network and Large System Transition," IEEE Transactions on Wireless Communications, 2013, pp. 1-14.
Huff G.H., et al., "A Novel Radiation Pattern and Frequency Reconfigurable Single Turn Square Spiral Microstrip Antenna", IEEE Microwave and Wireless Components Letters, vol. 13 (2), Feb. 2003, pp. 57-59.
Huh H., et al., Achieving "Massive MIMO" Spectral Efficiency with a Not-so-Large Number of Antennas. IEEE Transactions on Wireless Communications, 2012, vol. 11 (9), pp. 3226-3239.
Huh H., et al., Multi-cell MIMO Downlink with Cell Cooperation and Fair Scheduling: A Large-System Limit Analysis, IEEE Transactions on Information Theory, 2010, vol. 57 (12), pp. 1-29.
IEEE 802.22, "IEEE 802.22 Working Group on Wireless Regional Area Networks", [online], [retrieved on Aug. 14, 2014], Retrieved from the Internet: URL:http:www.ieee802.org/22/.
IntelliCell: A Fully Adaptive Approach to Smart Antennas, ArrayComm, Incorporated, WP-ISA-031502-2.0, 2002, pp. 1-18.

(56) References Cited

OTHER PUBLICATIONS

International Preliminary Report on Patentability and the Written Opinion of the International Searching Authority PCT Application No. PCT/US2015/014511, dated Aug. 18, 2016, 5 pages.
International Preliminary Report on Patentability for Application No. PCT/US11/58663 dated May 7, 2013, 26 pages.
International Preliminary Report on Patentability for Application No. PCT/US2005/11033 dated Jun. 3, 2008, 7 pages.
International Preliminary Report on Patentability for Application No. PCT/US2006/14854 dated Mar. 17, 2009, 4 pages.
International Preliminary Report on Patentability for Application No. PCT/US2008/073780, dated Mar. 4, 2010, 10 pages.
International Preliminary Report on Patentability for Application No. PCT/US2013/039580 dated Nov. 4, 2014, 7 pages.
International Preliminary Report on Patentability for International Application No. PCT/US06/41009 dated Apr. 23, 2008, 4 pages.
International Preliminary Report on Patentability from Foreign Counterpart PCT Application No. PCT/US2013/041726 dated Nov. 18, 2014, 6 pages.
International Search Report and Written Opinion for Application No. PCT/US2008/073780, dated Nov. 19, 2008.
International Search Report and Written Opinion for Application No. PCT/US2009/063932 dated Jan. 7, 2010, 12 pages.
International Search Report and Written Opinion for Application No. PCT/US2009/063935 dated Feb. 3, 2010, 11 pages.
International Search Report and Written Opinion for Application No. PCT/US2012/054937 dated Apr. 2, 2013, 17 pages.
International Search Report and Written Opinion for Application No. PCT/US2014/025108 dated Sep. 19, 2014, 10 pages.
International Search Report and Written opinion for International Application No. PCT/US2013/071749 dated Apr. 8, 2014, 9 pages.
International Search Report and Written opinion for International Application No. PCT/US2014/025102 dated Jul. 18, 2014, 11 pages.
International Search Report and Written opinion for International Application No. PCT/US2014/025123 dated Jul. 18, 2014, 11 pages.
International Search Report and Written Opinion for PCT Application No. PCT/US11/58663 dated Mar. 29, 2012, 33 pages.
International Search Report and Written Opinion from foreign counterpart PCT Application No. PCT/US13/41726 dated Jul. 16, 2013, 7 pages.
International Search Report for Application No. PCT/US06/14854 dated May 8, 2008, 1 page.
International Search Report from International Application No. PCT/US2000/019613, dated Nov. 14, 2000, 1 page.
Itu, "ISM Band," [online], Aug. 14, 2014. Retrieved from the Internet: http://www.itu.int/ITUR/terrestrial/faq/index.html#g013, pp. 1-8.
Jafar S.A., et al., "Channel Capacity and Beamforming for Multiple Transmit and Receive Antennas with Covariance Feedback," Proc. IEEE Int. Conf. on Comm, Jun. 2001, vol. 7, pp. 2266-2270.
Jafar S.A., et al., "Transmitter Optimization and Optimality of Beamforming for Multiple Antenna Systems," IEEE Trans Wireless Comm, pp. 1165- 1175.
Jakes W.C., Microwave Mobile Communications, IEEE Press, 1974, Table of Contents, 4 pages.
Jindal N., et al., "Dirty Paper Coding vs. TDMA for MIMO Broadcast Channels", IEEE Trans. on Information Theory, vol. 51, pp. 1783-1794, May 2005.
Jindal N., et al., "Multi-Antenna Broadcast Channels With Limited Feedback and User Selection," IEEE Journal on Selected Areas in Communications, 2007, vol. 25(7), pp. 1478-1491.
Jindal N., "MIMO Broadcast Channels With Finite-Rate Feedback," IEEE Trans. on Info. Theory, 2006, vol. 52, pp. 5045-5060.
Jing J., et al. "A Downlink Max-SINR Precoding for Massive MIMO System," International Journal of Future Generation Communication and Networking, 2014, vol. 7 (3), pp. 107-116.
Joho D., et al., "Articles of the Electronic Information and Communication Society", vol. J87-C (5), May 2004, pp. 1-19.
Jorswieck E.A., et al., "Channel Capacity and Capacity-Range of Beamforming in MIMO Wireless Systems under Correlated Fading with Covariance Feedback," IEEE Transactions on Wireless Communications, 2004, vol. 3, pp. 1543-1553.
Jose J., "Channel Estimation and Linear Precoding in Multiuser Multiple-Antenna TDD Systems," IEEE Transactions on Vehicular Technology, 2011, vol. 60 (5), pp. 2102-2116.
Jose J., et al. "Pilot Contamination and Precoding in Multi-cell TDD Systems," IEEE Transactions on Wireless Communications, 2011, vol. 10 (8), pp. 2640-2651.
Judge P., "GreenTouch Shows Low Power Wireless," TechWeekEurope UK, [online], Feb. 1, 2011, Retrieved from the Internet< URL: http://www.techweekeruope.co.uk/workspace/greentouch-showslow>, 3 pages.
Jungnickel V., et al., "Capacity of MIMO systems with closely spaced antennas," IEEE, 2003, vol. 7 (8), pp. 361-363, Comm. Lett.
Kamata H, et. al, "Effects of IQ Imbalance and an Effective Compensation Scheme in the MIMO-OFDM Communication System", Proceedings of the 2005 Institute of Electronics, Information and Communication General Conference, Mar. 7, 2005, B-5-90, pp. 539.
Kang M., et al., "Water-Filling Capacity and Beamforming Performance of MIMO Systems With Covariance Feedback," IEEE Workshop on Signal Processing Advances in Wireless Communications, Jun. 2003, pp. 556-560.
Kannan T.P., et al., "Separation of cochannel signals under imperfect timing and carrier synchronization," IEEE Trans. Veh. Technol, 2001, vol. 50 (1), pp. 79-96.
Karakayali M.K., et al. "Network Coordination for Spectrally Efficient Communications in Cellular Systems," IEEE Wireless Communications Magazine, 2006, vol. 13 (4), pp. 56-61.
Karakayali M.K., et al., "On the Maximum Common Rate Achievable in a Coordinated Network," Proceedings of the International Conference on Communications (ICC'06), Mar. 3, 2006, vol. 9, pp. 1-6.
Kayama H., et al., "Demodulation Reference Signal Design and Channel Estimation for LTE-Advanced Uplink," Advances in Vehicular Networking Technologies, 2011, pp. 418-432.
Kellerman F C., "LDPC OFDM Space-Time Multipath Fading Channel Results," Proceedings SPIE, Digital Wireless Communications, XP-002672064, 2003, vol. 5100, pp. 19-30.
Kermoal J.P., et al., "A Stochastic MIMO Radio Channel Model With Experimental Validation," IEEE Journal on Selected Areas in Communications, 2002, vol. 20 (6), pp. 1211-1226.
Knievel C., et al., "On Particle Swarm Optimization for MIMO Channel Estimation", Article ID 614384, Journal of Electrical and Computer Engineering, 2012, vol. 2012, 10 pages.
Knievel C, Low Complexity Receiver for Large-MIMO Space Time Coded Systems, in Proc. IEEE VTC-Fall'2011, Sep. 2011.
Kouassi B. et al., "Reciprocity-Based Cognitive Transmissions using a MU Massive MIMO Approach", 2013, pp. 1331-1335.
Kountouris M., et al., "HetNets and Massive MIMO: Modeling, Potential Gains, and Performance Analysis," in Proc. IEEE-APS Topical Conference on Antennas and Propagation in Wireless Communications, Sep. 2013, 5 pages.
Kreith F., et al., "Efficiency of Advanced Ground Transportation Technologies", Journal of Energy Resources Technology, Copyright 2002 by ASME, Sep. 2002, vol. 124, pp. 173-179.
Krim H., et al., "Two Decades of Array Signal Processing Research," IEEE Signal Proceedings Magazine, 1996, pp. 67-94.
Krishnan N., et al., "Cellular Systems with Many Antennas: Large System Analysis under Pilot Contamination," in Proceedings of the 50th Annual Allerton Conference on Communication, Control, and Computing, 2012, pp. 1220-1224.
Kumagawa S., et al., "A Study of Introducing Distributed Transmit Power Control to Distributed Antenna System," 2011, 30 pages.
Kumar K.R., et al. "Asymptotic Performance of Linear Receivers in MIMO Fading Channels," IEEE Information Theory Workshop, Feb. 19, 2009, 48 pages.
Lang S., et al., "Design and development of a 5.25 GHz software defined wireless OFDM communication platform," IEEE Communications Magazine, 2004, vol. 42 (6), 7 pages.

(56) References Cited

OTHER PUBLICATIONS

Lau H.K., et al., "Insecurity of Position-Based Quantum-cryptography Protocols Against Entanglement Attacks," Physical Review A, 2010, vol. 83, 13 pages.
Lee C, Network Massive MIMO for Cell-Boundary Users: From a Precoding Normalization Perspective, IEEE Goblecom Workshops, 2012.
Lee J., et al., "A Compressed Analog Feedback Strategy for Spatially Correlated Massive MIMO Systems," in Proceedings IEEE Vehicular Technology Conference (VTC), Quebec, Canada, Sep. 2012, pp. 1-6.
Lee J., et al., "MIMO Technologies in 3GPP LTE and LTE-Advanced," EURASIP Journal on Wireless Communications and Networking, 2009, 1-10.
Lee J., "Introduction of LTE-Advanced DL/UL MIMO," Samsung Electronics, Sep. 2009, 18 pages.
Lee K., et al., "Frequency-offset estimation for MIMO and OFDM systems using orthogonal training sequences," IEEE Trans. Veh. Technol, 2007, vol. 56 (1), pp. 146-156.
Letter Restarting Period for Response from U.S. Appl. No. 13/233,006 dated Apr. 15, 2016, 9 pages.
Li P., et al., Multiple Output Selection-LAS Algorithm in Large MIMO Systems, IEEE Commun., 2010, vol. 14 (5), pp. 399-401.
Liang et al., "Asymptotic Performance of MMSE Receivers for Large Systems Using Random Matrix Theory," IEEE Transactions on Information Theory, 2007, vol. 53(11), pp. 4173-4190.
Liang Y., et al., "Interference Suppression in Wireless Cellular Networks through Picocells," Annual Conference on Social Studies Communication and Education, 2007, vol. 2007, pp. 1041-1045.
Liang Y., et al., "On the Relationship Between MMSE-SIC and BI-GDFE Receivers for Large Multiple-Input Multiple-Output Channels," IEEE Transactions on Signal Processing, 2008, vol. 56 (8), pp. 3627-3637.
Liang Y.C., et al., "Block-iterative Generalized Decision Feedback Equalizers (BI-GDFE) for Large MIMO Systems: Algorithm Design and Asymptotic Performance Analysis," IEEE Transactions on Signal Processing, 2006, vol. 54(6), pp. 2035-2048.
Like deck chairs on the Titanic: why spectrum reallocation won't avert the coming data crunch but technology might keep the wireless industry afloat, Feb. 2012, 705-719 pages.
Lin I., et al., "Mirror MoCap: Automatic and efficient capture of dense 3D facial motion parameters from video," International Journal of Computer Graphics, The Visual Computer, Springer Berlin, DE, XP019339114, ISSN: 14328726, DOI:10.1007500371-005-0291, 2005, vol. 21 (6), pp. 355-372.
Lindstrom M., (Ericsson), "LTE-Advanced Radio Layer 2 and RRC Aspects," 3GPP TSG-RAN WG2, Dec. 17-18, 2009, 38 pages.
Liu G., "Time and frequency offset estimation for distributed multiple-input multiple-output orthogonal frequency division multiplexing system," Institute of Engineering and Technology Communications, 2010, vol. 4 (6), pp. 708-715.
Love D J., et al., "An Overview of Limited Feedback in Wireless Communication Systems," Special Issue on Exploiting Limited Feedback in Tomorrow's Wireless Communication Networks, IEEE Journal on Sel. Areas in Comm., 2008, vol. 26 (8), pp. 1341-1365.
Love D J., et al.,"Grassmannian Beamforming for Multiple-Input Multiple-Output Wireless Systems", IEEE Trans. on Info. Theory special issue on MIMO Communication, 2003, vol. 49, pp. 2735-2747.
Lozano A., et at, "Fundamental Limits of Cooperation", 2012, 27 pages.
Luise M., et at, "Carrier frequency acquisition and tracking for OFDM systems," IEEE, 1996, vol. 44 (11), pp. 1590-1598, Trans. Commun.
Luise M., et at, "Low-complexity blind carrier frequency recovery for OFDM signals over frequency-selective radio channels," IEEE Transactions. Communications, 2002, vol. 50 (7), pp. 1182-1188.
Lunghi T., et at, "Experimental Bit Commitment Based on Quantum Communication and Special Relativity," Physical review letters, 2013, vol. 111 (18), pp. 1-16.
Lytro, Lytro Support, What are the specs on the First Generation Lytro Light Field Camera?, 1 page.
Lytro User Manual, 2012, 25 pages, www.lytro.com.
Malaney R.A., et al. "Location-Dependent Communications Using Quantum Entanglement," Physical Review A, 2010, vol. 81 (4), pp. 042319, 11 pages.
Marek S., "AT&T's Rinne talks about carrier aggregation trials, small cells and more", Retrieved from the Internet: URL: http:www.fiercebroadbandwireless.comstoryatts-rinne-talks-about-carrieraggregation- trials-small-cells-and-more2012-11-08, 3 pages.
Martinez A.O., et al., "Energy Detection Using Very Large Antenna Array Receivers", 48th Asilomar Conference on Signals, Systems, and Computers Proceedings, 2014, 5 pages.
Martinez A.O., et al "Very Large Aperture Massive MIMO: a Measurement Based Study", 2014, 6 pages.
Marzetta L.A., et al., "Noncooperative Cellular Wireless with Unlimited Numbers of Base Station Antennas," IEEE Transactions on Wireless Communications, 2010, vol. 9(11), pp. 3590-3600.
Masouros C., et al., "Large-Scale MIMO Transmitters in Fixed Physical Spaces: The Effect of Transmit Correlation and Mutual Coupling", IEEE Trans. Commun., 2013, vol. 61 (7), pp. 2794-2804.
Matthaiou M., et al. "Sum Rate Analysis of ZF Receivers in Distributed MIMO Systems," IEEE Journal on Selected Areas in Communications, 2013, vol. 31 (2), pp. 180-191.
Matthaiou M., et al., "Sum Rate Analysis of ZF Receivers in Distributed MIMO Systems with Rayleigh/Lognormal Fading," 2012 IEEE International Conference on Communications, ICC 2012, Ottawa, Jun. 10-15 pp. 3857-3861.
Mattheijssen P., "Antenna-pattern diversity versus space diversity for use at handhelds," IEEE Trans. on Veh. Technol, 2004, vol. 53 (4), pp. 1035-1042.
Mayers D., "Unconditionally Secure Quantum Bit Commitment is Impossible," Physical Review Letters, APS, 1997, vol. 78 (17), pp. 1-5.
Mazrouei-Sebdani M., "Vector Perturbation Precoding and User Scheduling for Network MIMO," IEEE WCNC , ISBN 978-1-61284-254-7, 2011, pp. 203-208.
McKay M R., et al., "A throughput-based adaptive MIMO BICM approach for spatially-correlated channels," IEEE to appear in Proc. ICC, 2006, 5 pages.
McKay M R., et al., "Multiplexingibeamforming switching for coded MIMO in spatially correlated channels based on Closed-Form BER Approximations," IEEE Transactions on Vehicular Technology, 2007, vol. 56 (5), pp. 2555-2567.
McLean J S., et al., "A re-examination of the fundamental limits on the radiation Q of electrically small antennas," IEEE Transactions on Antennas and Propagation, 1996, vol. 44 (5), pp. 672-676.
MikroTik, "Routerboard," [online], 2015, 30 pages, Retrieved from the Internet: URL: http:routerboard.com.
MIMO System uses SDMA for IEEE802.11n, Electronicstalk, 2004, pp. 1-3, http://www.electronicstalk.com/news/ime/ime149.html.
Minn., et al., "A robust timing and frequency synchronization for OFDM systems," IEEE Trans. Wireless Commun, 2003, vol. 2 (4), pp. 822-839.
MIT Media Lab, "Wireless Power—From Wirelessly Powered Car to Wirelessly Powered Fabrication", MAS 863, Final Project WebPage, 2002, pp. 1-5, http://www.media.mit.edu/physics/pedagogy/fab/fab_2002/personal_pages/akshay/mit.edu/index42.html.
Miyakawa H., et al., "A Method of Code Conversion for Digital Communication Channels with Intersymbol Interference," Transactions of the Institute of Engineers of Japan, vol. 52-A (6), 1969, pp. 272-273.
Mohammed S.K., et al., "A Low-Complexity Precoder for Large Multiuser MISO Systems", IEEE Vehicular Technology Conference, 2008, pp. 797-801.
Mohammed S.K., et al., "Constant-Envelope Multi-User Precoding for Frequency-Selective Massive MIMO Systems," IEEE Wireless Communications Letters, 2013, vol. 2(5), pp. 1-10.

(56) References Cited

OTHER PUBLICATIONS

Mohammed S.K., et al., "Single-User Beamforming in Large-Scale MISO Systems with Per-Antenna Constant-Envelope Constraints," IEEE Transactions on Wireless Communications, 2012, vol. 2012, pp. 3992-4005.
Mohammed S.K., et al., "Per-Antenna Constant Envelope Precoding for Large Multi-User MIMO Systems," IEEE Transactions on Communications, 2012, vol. 61(3), pp. 1-24.
Molisch et al., "MIMO Systems with Antenna Selection", IEEE Microwave Magazine, vol. 5 (1), Mar. 2004, pp. 46-56.
Montgomery B.G., "Analog RF-over-fiber technology, Syntonics LLC," 2008, pp. 2-51, http:chesapeakebayaoc.orgdocumentsSyntonics_AOC_RF_over-Fiber_19_Jan_08.pdf.
Monziano R. A., et al., "Introduction to Adaptive Arrays," New York, Wiley, 1980, Table of Contents 21 pages.
Moose P H., et al., "A technique for orthogonal frequency division multiplexing frequency offset correction," IEEE Trans. Commun, 1994, vol. 42 (10), pp. 2908-2914.
Morelli M., et al., "An improved frequency offset estimator for OFDM applications," IEEE Commun. Lett., 1999, vol. 3 (3), pp. 106-109.
Morelli M., et al., "Frequency ambiguity resolution in OFDM systems," IEEE Commun. Lett, 2000, vol. 4 (4), pp. 134-136.
Morris M. L., et al., "The Impact of Array Configuration on MIMO Wireless Channel Capacity," Proc. IEEE Antennas and Propagation Symposium, Jun. 2002, vol. 3, pp. 214-217.
Morris M.L., et al., "Network model for MIMO systems with coupled antennas and noisy amplifiers," IEEE Transactions on Antennas and Propagation, 2005, vol. 53, pp. 545-552.
Motorola, "Long Term Evolution (LTE): A Technical Overview," 2007, Retrieved from the Internet< URL: http:business.motorola.comexperienceltepdfLTETechnicalOverview.pdf>, 15 pages.
Moustakas A., et al., "MIMO Capacity Through Correlated Channels in the Presence of Correlated Interferers and Noise: A (Not so) Large N Analysis", Institute of Electrical and Electronics Engineers Transformations and Information Theory, 2003, vol. 49 (10), pp. 2545-2561.
Moustakas A.L., et al., "Optimizing Multiple-Input Single-Output (MISO) Communication Systems with General Gaussian channels: Nontrivial Covariance and Nonzero Mean", Institute of Electrical and Electronics Engineers Transactions on Information Theory, 2003, vol. 49, pp. 2770-2780.
Muharar R., et al., "Downlink Beamforming with Transmit-Side Channel Correlation: A Large System Analysis," in Proc. IEEE International Conference on Communications (ICC), Kyoto, Japan, Jun. 2011.
Muller R., et al., "Vector Precoding for Wireless MIMO Systems and its Replica Analysis," IEEE J. Sel. Areas Commun, 2008, vol. 26 (3), pp. 530-540.
Muller R.R., et al., "Blind Pilot Decontamination," IEEE Journal of Selected Topics in Signal Processing on Signal Processing for Large-Scale MIMO Communications, 2013, submitted.
Nam J., et al., "Joint Spatial Division and Multiplexing: Realizing Massive MIMO Gains with Limited Channel State Information," in Proceedings Conference on Information Sciences and Systems, IEEE, 2012, 6 pages.
NEC, "Self organizing networks", White paper, Feb. 2009, 5 pages.
Netsukuku, 8 pages, printed on Sep. 30, 2015, [online], Retrieved from the Internet: URL: http:netsukuku.freaknet.org.
Ngo H.Q., et al., Energy and Spectral Efficiency of Very Large Multiuser MIMO Systems, IEEE Transactions on Communications, May 21, 2012, vol. 61 (4), pp. 1436-1449.
Ngo H.Q., et al., EVD-Based Channel Estimations for Multicell Multiuser MIMO with Very Large Antenna Arrays, IEEE International Conference on Acoustics, Speed and Signal Processing (ICASSP), Kyoto, Japan, Mar. 2012.
Ngo H.Q., et al., Massive MU-MIMO Downlink TDD Systems with Linear Precoding and Downlink Pilots, Proceedings in Allerton Conference on Communication, Control, and Computing, Urbana-Champaign, Illinois, Oct. 2013.
Ngo H.Q., et al., The multicell multiuser MIMO uplink with very large antenna arrays and a finite-dimensional channel, IEEE Transactions Communications, 2013, vol. 61 (6), pp. 2350-2361.
Ngo H.Q., et al., Uplink Performance Analysis of Multicell MU-MIMO Systems with ZF Receivers, 2012, pp. 1-32.
Nguyen., et al., "Multiuser Transmit Beamforming via Regularized Channel Inversion: A Large System Analysis" IEEE Global Communications Conference, New Orleans, LO, US, Dec. 2008, pp. 1-4.
Nguyen S., et al., "Precoding for Multicell Massive MIMO Systems With Compressive Rank-Q Channel Approximation," 24th IEEE International Symposium, 2013, pp. 1227-1232.
Nguyen S., et al., "Compressive Sensing-Based Channel Estimation for Massive Multiuser MIMO Systems" in proceeding IEEE WCNC, 2013.
Nicta, "InterfereX", downloaded Jun. 22, 2015, 3 pages, http://www.interfereX.com.
Nokia Siemens Networks, "2020: Beyond 4g, Radio Evolution for the Gigabit Experience", White Paper, 2011, www.nokiasiemensnetworks.com, 16 pages.
Non Final Office Action from U.S. Appl. No. 13/797,984 dated Feb. 28, 2017, 13 pages.
Non-Final Office Action from U.S. Appl. No. 10/758,475 dated Nov. 24, 2008, 8 pages.
Non-Final Office Action from U.S. Appl. No. 10/758,475 dated Oct. 16, 2007, 8 pages.
Non-Final Office Action from U.S. Appl. No. 10/817,731 dated Jan. 4, 2008, 14 pages.
Non-Final Office Action from U.S. Appl. No. 10/817,731 dated Jan. 21, 2009, 23 pages.
Non-Final Office Action from U.S. Appl. No. 10/817,731 dated Mar. 15, 2010, 26 pages.
Non-Final Office Action from U.S. Appl. No. 10/817,731 dated May 18, 2007, 16 pages.
Non-Final Office Action from U.S. Appl. No. 10/902,978 dated Apr. 10, 2008, 8 pages.
Non-Final Office Action from U.S. Appl. No. 10/902,978 dated Nov. 6, 2007, 11 pages.
Non-Final Office Action from U.S. Appl. No. 11/039,029 dated Apr. 12, 2007, 5 pages.
Non-Final Office Action from U.S. Appl. No. 11/039,029 dated Aug. 14, 2009, 13 pages.
Non-Final Office Action from U.S. Appl. No. 11/039,029 dated Jun. 27, 2006, 9 pages.
Non-Final Office Action from U.S. Appl. No. 11/039,029 dated Mar. 17, 2008, 9 pages.
Non-Final Office Action from U.S. Appl. No. 11/136,946 dated Nov. 14, 2007, 9 pages.
Non-Final Office Action from U.S. Appl. No. 11/210,098 dated Jun. 22, 2006, 8 pages.
Non-Final Office Action from U.S. Appl. No. 11/210,098 dated Sep. 26, 2007, 8 pages.
Non-Final Office Action from U.S. Appl. No. 11/256,478 dated Sep. 19, 2008, 14 pages.
Non-Final Office Action from U.S. Appl. No. 11/894,362 dated Oct. 29, 2008, 17 pages.
Non-Final Office Action from U.S. Appl. No. 11/894,394 dated Oct. 28, 2008, 13 pages.
Non-Final Office Action from U.S. Appl. No. 11/894,540 dated Apr. 29, 2009, 8 pages.
Non-Final Office Action from U.S. Appl. No. 11/894,540 dated Oct. 29, 2008, 13 pages.
Non-Final Office Action from U.S. Appl. No. 11/899,814 dated Aug. 17, 2009, 10 pages.
Non-Final Office Action from U.S. Appl. No. 11/899,814 dated Mar. 7, 2008, 13 pages.
Non-Final Office Action from U.S. Appl. No. 12/143,503 dated Dec. 9, 2010, 15 pages.
Non-Final Office Action from U.S. Appl. No. 12/291,856 dated Dec. 7, 2010, 12 pages.
Non-Final Office Action from U.S. Appl. No. 12/291,858 dated Jun. 28, 2012, 5 pages.
Non-Final Office Action from U.S. Appl. No. 12/630,627 dated Aug. 22, 2012, 23 pages.

(56) References Cited

OTHER PUBLICATIONS

Non-Final Office Action from U.S. Appl. No. 12/630,627 dated Mar. 16, 2011, 5 pages.
Non-Final Office Action from U.S. Appl. No. 12/637,643 dated Jun. 7, 2012, 25 pages.
Non-Final Office Action from U.S. Appl. No. 12/637,643 dated Sep. 23, 2011, 18 pages.
Non-Final Office Action from U.S. Appl. No. 12/691,500 dated Aug. 23, 2010, 9 pages.
Non-Final Office Action from U.S. Appl. No. 12/802,958 dated Aug. 13, 2015, 22 pages.
Non-Final Office Action from U.S. Appl. No. 12/802,958 dated Jun. 23, 2014, 24 pages.
Non-Final Office Action from U.S. Appl. No. 12/802,958 dated Nov. 4, 2016, 19 pages.
Non-Final Office Action from U.S. Appl. No. 12/802,958 dated Nov. 21, 2012, 17 pages.
Non-Final Office Action from U.S. Appl. No. 12/802,974 dated Apr. 24, 2015, 27 pages.
Non-Final Office Action from U.S. Appl. No. 12/802,974 dated Aug. 1, 2013, 35 pages.
Non-Final Office Action from U.S. Appl. No. 12/802,974 dated Dec. 19, 2012, 7 pages.
Non-Final Office Action from U.S. Appl. No. 12/802,975 dated Aug. 1, 2013, 27 pages.
Non-Final Office Action from U.S. Appl. No. 12/802,975 dated Aug. 14, 2013, 26 pages.
Non-Final Office Action from U.S. Appl. No. 12/802,975 dated Dec. 19, 2012, 16 pages.
Non-Final Office Action from U.S. Appl. No. 12/802,975 dated Jul. 1, 2016, 21 pages.
Non-Final Office Action from U.S. Appl. No. 12/802,975 dated May 7, 2015, 25 pages.
Non-Final Office Action from U.S. Appl. No. 12/802,988 dated Apr. 12, 2013, 45 pages.
Non-Final Office Action from U.S. Appl. No. 12/802,988 dated Apr. 17, 2012, 10 pages.
Non-Final Office Action from U.S. Appl. No. 12/802,988 dated Aug. 15, 2016, 19 pages.
Non-Final Office Action from U.S. Appl. No. 12/802,988 dated Jun. 26, 2015, 17 pages.
Non-Final Office Action from U.S. Appl. No. 12/802,988 dated Mar. 24, 2014, 11 pages.
Non-Final Office Action from U.S. Appl. No. 12/802,989 dated Jun. 14, 2012, 10 pages.
Non-Final Office Action from U.S. Appl. No. 12/802,989 dated Mar. 30, 2016, 35 pages.
Non-Final Office Action from U.S. Appl. No. 12/802,989 dated Nov. 25, 2014, 17 pages.
Non-Final Office Action from U.S. Appl. No. 12/802,989 dated Nov. 26, 2013, 27 pages.
Non-Final Office Action from U.S. Appl. No. 13/226,461 dated Dec. 27, 2011, 10 pages.
Non-Final Office Action from U.S. Appl. No. 13/232,996 dated Apr. 11, 2013, 23 pages.
Non-Final Office Action from U.S. Appl. No. 13/232,996 dated Jun. 20, 2016, 30 pages.
Non-Final Office Action from U.S. Appl. No. 13/232,996 dated Jun. 24, 2015, 15 pages.
Non-Final Office Action from U.S. Appl. No. 13/232,996 dated Mar. 21, 2014, 9 pages.
Non-Final Office Action from U.S. Appl. No. 13/233,006 dated Apr. 16, 2013, 8 pages.
Non-Final Office Action from U.S. Appl. No. 13/233,006, dated Apr. 28, 2017, 10 pages.
Non-Final Office Action from U.S. Appl. No. 13/233,006 dated Jun. 4, 2015, 12 pages.
Non-Final Office Action from U.S. Appl. No. 13/233,006 dated Sep. 12, 2013, 6 pages.
Non-Final Office Action from U.S. Appl. No. 13/233,006 dated Sep. 24, 2014, 9 pages.
Non-Final Office Action from U.S. Appl. No. 13/233,006 dated Apr. 1, 2016, 9 pages.
Non-Final Office Action from U.S. Appl. No. 13/461,682 dated Feb. 25, 2014, 37 pages.
Non-Final Office Action from U.S. Appl. No. 13/464,648 dated Feb. 12, 2013, 12 pages.
Non-Final Office Action from U.S. Appl. No. 13/464,648 dated Feb. 14, 2014, 11 pages.
Non-Final Office Action from U.S. Appl. No. 13/475,598 dated Dec. 30, 2013, 16 pages.
Non-Final Office Action from U.S. Appl. No. 13/475,598 dated Mar. 23, 2015, 14 pages.
Non-Final Office Action from U.S. Appl. No. 13/633,702 dated Dec. 17, 2013, 21 pages.
Non-Final Office Action from U.S. Appl. No. 13/652,259 dated Apr. 10, 2014, 13 pages.
Non-Final Office Action from U.S. Appl. No. 13/652,259 dated Feb. 18, 2016, 8 pages.
Non-Final Office Action from U.S. Appl. No. 13/652,259, dated Mar. 31, 2017, 7 pages.
Non-Final Office Action from U.S. Appl. No. 13/652,259 dated May 14, 2015, 9 pages.
Non-Final Office Action from U.S. Appl. No. 13/797,950, dated Jan. 11, 2017, 65 pages.
Non-Final Office Action from U.S. Appl. No. 13/797,950 dated May 11, 2015, 61 pages.
Non-Final Office Action from U.S. Appl. No. 13/797,984 dated Jan. 14, 2016, 14 pages.
Non-Final Office Action from U.S. Appl. No. 13/797,984 dated Jan. 29, 2015, 15 pages.
Non-Final Office Action from U.S. Appl. No. 13/798,004 dated Jun. 17, 2015, 13 pages.
Non-Final Office Action from U.S. Appl. No. 13/798,004 dated Mar. 26, 2014, 12 pages
Non-Final Office Action from U.S. Appl. No. 13/798,004 dated Sep. 23, 2016, 11 pages.
Non-Final Office Action from U.S. Appl. No. 13/844,355 dated Apr. 18, 2016, 21 pages.
Non-Final Office Action from U.S. Appl. No. 13/844,355, dated Jun. 30, 2017, 159 pages.
Non-Final Office Action from U.S. Appl. No. 14/023,302 dated Jul. 17, 2014, 37 pages.
Non-Final Office Action from U.S. Appl. No. 14/023,302 dated Jun. 11, 2015, 8 pages.
Non-Final Office Action from U.S. Appl. No. 14/086,700 dated Apr. 2, 2015, 12 pages.
Non-Final Office Action from U.S. Appl. No. 14/086,700 dated Mar. 4, 2016, 10 pages.
Non-Final Office Action from U.S. Appl. No. 14/086,700 dated May 25, 2017, 12 pages.
Non-Final Office Action from U.S. Appl. No. 14/156,254 dated Sep. 11, 2014, 44 pages.
Non-Final Office Action from U.S. Appl. No. 14/611,565 dated Aug. 31, 2015, 21 pages
Non-Final Office Action from U.S. Appl. No. 14/611,565, dated Mar. 14, 2017, 23 pages.
Non-Final Office Action from U.S. Appl. No. 14/672,014 dated Dec. 30, 2016, 7 pages.
Non-Final Office Action from U.S. Appl. No. 15/181,383, dated May 22, 2017, 48 pages.
Non-Final Office Action from U.S. Appl. No. 15/201,276, dated Mar. 1, 2017, 107 pages.
Notice of Acceptance from foreign counterpart Australian Patent Application No. 2013327697, dated Feb. 15, 2017, 4 pages.
Notice of Acceptance from foreign counterpart Australian Patent Application No. 20160219662, dated May 5, 2017, 3 pages.
Notice of Acceptance from foreign counterpart Australian Patent Application No. AU20140200745 dated Sep. 19, 2016, 3 page.
Notice of Acceptance from foreign counterpart New Zealand Patent Application No. 610463 dated Aug. 5, 2015, 1 page.

(56) References Cited

OTHER PUBLICATIONS

Notice of Allowance and Search Report from foreign counterpart Taiwan Patent Application No. 102134408, dated Feb. 17, 2017, 9 pages.
Notice of Allowance from counterpart Australian Patent Application No. 2011323559, dated May 13, 2016, 2 pages.
Notice of Allowance from counterpart Mexican Patent Application No. MX/a/2014/002900, dated Nov. 26, 2015, 4 pages. Translation attached.
Notice of Allowance from counterpart U.S. Appl. No. 12/917,257, dated Dec. 6, 2012, 8 pages.
Notice of Allowance from foreign counterpart Canadian Patent Application No. 2695799, dated Feb. 9, 2016, 1 page.
Notice of Allowance from foreign counterpart Canadian Patent Application No. P14906 dated Jun. 1, 2015, 1 page.
Notice of Allowance from foreign counterpart Korean Patent Application No. 2015-7002560, dated Feb. 4, 2016, 2 pages.
Notice of Allowance from U.S. Appl. No. 12/802,976, dated Mar. 14, 2011, 9 pages.
Notice of Allowance from U.S. Appl. No. 13/232,996 dated Oct. 12, 2016, 5 pages.
Notice of Allowance from U.S. Appl. No. 10/758,475 dated May 11, 2009, 4 pages.
Notice of Allowance from U.S. Appl. No. 10/817,731 dated Sep. 30, 2010, 6 pages.
Notice of Allowance from U.S. Appl. No. 10/902,978 dated Apr. 16, 2008, 7 pages.
Notice of Allowance from U.S. Appl. No. 10/902,978 dated Jun. 27, 2008, 7 pages.
Notice of Allowance from U.S. Appl. No. 11/039,029 dated Mar. 24, 2010, 5 pages.
Notice of Allowance from U.S. Appl. No. 11/136,946 dated Jul. 14, 2008, 7 pages.
Notice of Allowance from U.S. Appl. No. 11/210,098 dated Oct. 21, 2009, 8 pages.
Notice of Allowance from U.S. Appl. No. 11/210,098, dated Oct. 21, 2009, 7 pages.
Notice of Allowance from U.S. Appl. No. 11/256,478 dated Jan. 26, 2010, 9 pages
Notice of Allowance from U.S. Appl. No. 11/256,478 dated Jul. 30, 2009, 9 pages.
Notice of Allowance from U.S. Appl. No. 11/256,478 dated Oct. 29, 2009, 16 pages.
Notice of Allowance from U.S. Appl. No. 11/894,362 dated Mar. 23, 2009, 10 pages.
Notice of Allowance from U.S. Appl. No. 11/894,362 dated Nov. 10, 2009, 5 pages.
Notice of Allowance from U.S. Appl. No. 11/894,362 dated Sep. 3, 2009, 12 pages.
Notice of Allowance from U.S. Appl. No. 11/894,394 dated Jul. 30, 2009, 14 pages.
Notice of Allowance from U.S. Appl. No. 11/894,394 dated Jun. 26, 2009, 7 pages.
Notice of Allowance from U.S. Appl. No. 11/894,394 dated Mar. 6, 2009, 11 pages.
Notice of Allowance from U.S. Appl. No. 11/894,540 dated Nov. 9, 2009, 5 pages.
Notice of Allowance from U.S. Appl. No. 11/894,540 dated Sep. 14, 2009, 13 pages.
Notice of Allowance from U.S. Appl. No. 11/899,814 dated Mar. 23, 2010, 5 pages.
Notice of Allowance from U.S. Appl. No. 12/143,503 dated Apr. 11, 2011, 9 pages.
Notice of Allowance from U.S. Appl. No. 12/143,503 dated Aug. 18, 2011, 12 pages.
Notice of Allowance from U.S. Appl. No. 12/143,503 dated Dec. 9, 2011, 11 pages.
Notice of Allowance from U.S. Appl. No. 12/291,856 dated Jun. 28, 2012, 8 pages.
Notice of Allowance from U.S. Appl. No. 12/291,858 dated Feb. 25, 2013, pages.
Notice of Allowance from U.S. Appl. No. 12/291,858 dated Oct. 15, 2012, 8 pages.
Notice of Allowance from U.S. Appl. No. 12/630,627 dated Sep. 25, 2013, 11 pages.
Notice of Allowance from U.S. Appl. No. 12/637,643 dated Jan. 17, 2013, 11 pages.
Notice of Allowance from U.S. Appl. No. 12/691,500 dated Apr. 29, 2011, 7 pages.
Notice of Allowance from U.S. Appl. No. 12/691,500 dated Dec. 27, 2010, 5 pages.
Notice of Allowance from U.S. Appl. No. 12/802,938 dated Apr. 4, 2013, 16 pages.
Notice of Allowance from U.S. Appl. No. 12/802,938 dated Dec. 6, 2012, 37 pages.
Notice of Allowance from U.S. Appl. No. 12/802,938 dated May 24, 2013, 10 pages.
Notice of Allowance from U.S. Appl. No. 12/802,938 dated Sep. 19, 2012, 8 pages.
Notice of Allowance from U.S. Appl. No. 12/802,974 dated Sep. 29, 2016, 5 pages.
Notice of Allowance from U.S. Appl. No. 12/802,974, dated Feb. 28, 2017, 15 pages.
Notice of Allowance from U.S. Appl. No. 12/802,974, dated Jun. 30, 2017, 89 pages.
Notice of Allowance from U.S. Appl. No. 12/802,974 dated Sep. 13, 2016, 43 pages.
Notice of Allowance from U.S. Appl. No. 12/802,976 dated Apr. 14, 2011, 16 pages.
Notice of Allowance from U.S. Appl. No. 12/802,976 dated Aug. 22, 2011, 8 pages.
Notice of Allowance from U.S. Appl. No. 12/802,976 dated Dec. 9, 2011, 11 pages.
Notice of Allowance from U.S. Appl. No. 12/802,976 dated Nov. 29, 2010, 7 pages.
Notice of Allowance from U.S. Appl. No. 12/802,989, dated Jun. 27, 2017, 121 pages.
Notice of Allowance from U.S. Appl. No. 12/917,257 dated May 31, 2013, 12 pages.
Notice of Allowance from U.S. Appl. No. 13/226,461 dated Jun. 12, 2012, 7 pages.
Notice of Allowance from U.S. Appl. No. 13/232,996 dated Oct. 26, 2016, 4 pages.
Notice of Allowance from U.S. Appl. No. 13/461,682 dated Oct. 2, 2014, 10 pages.
Notice of Allowance from U.S. Appl. No. 13/464,648 dated Apr. 24, 2015, 23 pages.
Notice of Allowance from U.S. Appl. No. 13/464,648 dated Aug. 14, 2015, 21 pages.
Notice of Allowance from U.S. Appl. No. 13/464,648 dated Aug. 25, 2015, 4 pages.
Notice of Allowance from U.S. Appl. No. 13/464,648 dated Feb. 23, 2016, 15 pages.
Notice of Allowance from U.S. Appl. No. 13/464,648 dated Jan. 9, 2015, 11 pages.
Notice of Allowance from U.S. Appl. No. 13/464,648 dated Nov. 30, 2015, 12 pages.
Notice of Allowance from U.S. Appl. No. 13/464,648 dated Sep. 19, 2014, 5 pages.
Notice of Allowance from U.S. Appl. No. 13/475,598 dated Feb. 14, 2017, 41 pages.
Notice of Allowance from U.S. Appl. No. 13/475,598 dated Oct. 19, 2015, 29 pages.
Notice of Allowance from U.S. Appl. No. 13/633,702, dated Jan. 6, 2015, 27 pages.
Notice of Allowance from U.S. Appl. No. 13/633,702 dated Aug. 15, 2014, 11 pages.
Notice of Allowance from U.S. Appl. No. 14/023,302 dated Oct. 9, 2015, 5 pages.
Notice of Allowance from U.S. Appl. No. 14/023,302 dated Apr. 27, 2016, 3 pages.

(56) References Cited

OTHER PUBLICATIONS

Notice of Allowance from U.S. Appl. No. 14/023,302, dated Feb. 5, 2016, 27 pages.
Notice of Allowance from U.S. Appl. No. 14/156,254, dated Feb. 26, 2016, 21 pages.
Notice of Allowance from U.S. Appl. No. 14/156,254 dated Jul. 8, 2015, 7 pages.
Notice of Allowance from U.S. Appl. No. 14/156,254 dated Mar. 12, 2015, 5 pages.
Notice of Allowance from U.S. Appl. No. 14/156,254, dated Nov. 3, 2015, 29 pages.
Notice of Allowance mailed for U.S. Appl. No. 12/917,257 dated Feb. 15, 2013, 18 pages.
Notice of Allowance dated May 17, 2016 for U.S. Appl. No. 14/023,302, filed Sep. 10, 2013, 5 pages.
Notice of Grant from foreign counterpart China Patent Application No. 201210464974.6 dated Jul. 1, 2015, 3 pages.
Notice of Reasons for Rejection from foreign counterpart Japanese Patent Application No. 20150510498, dated Sep. 26, 2016, 21 pages.
Notice to File a Response from foreign counterpart Korea Patent Application No. 10-2007-7028402 dated Jul. 31, 2012, 13 pages.
Notification Concerning Transmittal of International Preliminary Report on Patentability and Written Opinion for Application No. PCT/US2009/063932 dated May 17, 2011, 8 pages.
Notification Concerning Transmittal of International Preliminary Report on Patentability and Written Opinion for Application No. PCT/US2009/063935 dated May 17, 2011, 8 pages.
Notification Concerning Transmittal of International Preliminary Report on Patentability (Chapter I of the Patent Cooperation Treaty) and Written Opinion of the International Searching Authority from Counterpart PCT Application No. PCT/US06/01111 dated Jul. 24, 2007, 8 pages.
Notification Concerning Transmittal of International Preliminary Report on Patentability for Application No. PCT/US2012/054937 dated Mar. 27, 2014, 13 pages.
Notification Concerning Transmittal of International Search Report and the Written Opinion for Application No. PCT/US2013/061493 dated Dec. 6, 2013, 9 pages.
Notification for Granting Patent Right from foreign counterpart China Patent Application No. 201180061132.X, dated Apr. 6, 2017, 6 pages.
Notification of Reason for Rejection for counterpart Japan Patent Application No. 2007552179 dated Oct. 28, 2010, 2 pages.
Notification of Reason for Rejection office action from foreign counterpart for Japan Patent Application No. 2008-513486 dated Dec. 6, 2010, 2 pages.
Notification of Transmittal of International Search Report and Written opinion for Application No. PCT/US06/41009 dated May 24, 2007, 6 pages.
Notification of Transmittal of International Search Report and Written opinion for Application No. PCT/US05/11033 dated May 2, 2008, 10 pages.
Notification of Transmittal of International Search Report and Written opinion for Application No. PCT/US06/01111 dated Aug. 3, 2006, 13 pages.
Notification of Transmittal of International Search Report and Written opinion for Application No. PCT/US2014/025105 dated Jul. 14, 2014, 12 pages.
Notification of Transmittal of International Search Report and Written opinion for Application No. PCT/US2014/025109 dated Jul. 14, 2014, 6 pages.
Notification of Transmittal of the European Search Report for Application No. 10156954.9-2411 dated Sep. 2, 2010, 5 pages.
Notification of Transmittal of the International Search Report and the Written Opinion of the International Searching Authority, or the Declaration, PCT/US2013/039580 dated Aug. 20, 2013, 12 pages.
Notification on Grant of Patent Right for Invention from foreign counterpart China Patent Application No. 201210466082.X, dated Jan. 26, 2017, 3 pages.
NuCORE Technology, CleanCapture NDX-1260 Analog Image Processor, 2004, 12 pages.
Oberli C., et al., "Maximum likelihood tracking algorithms for MIMOOFDM, in Communications," IEEE International Conference on Networking, Jun. 20-24, vol. 4, pp. 2468-2472.
Oda Y., "Measured Path Loss and Multipath Propagation Characteristics in UHF and Microwave Frequency Bands for Urban Mobile Communications," IEEE, 2001, pp. 337-341.
Office Action and Search Report from foreign counterpart China Patent Application No. CN201380035543, dated Jan. 3, 2017, 22 pages.
Office Action and Search Report from foreign counterpart Russian Patent Application No. 2014148791/28(078479), dated Apr. 13, 2017, 14 pages.
Office Action for foreign counterpart China Patent Application No. 20051008867.1 dated Oct. 26, 2010, 4 pages.
Office Action for Korean Patent Application No. 20050070079 dated Jul. 29, 2011, 3 pages.
Office Action from Australian Patent Application No. 2004203336 dated Jun. 5, 2009, 2 pages.
Office Action from Canada Patent Application No. 2514383 dated Jul. 26, 2012, 3 pages.
Office Action from counterpart Mexican Patent Application No. MX/a/2014/013377, dated Mar. 22, 2016, 20 pages.
Office Action from counterpart Taiwan Application No. 100139880, dated Jan. 26, 2017, 7 pages.
Office Action from foreign counterpart China Patent Application No. 200510088676 dated Jan. 25, 2011, 8 pages.
Office Action from foreign counterpart China Patent Application No. 200510088676.1 dated Feb. 5, 2010, 18 pages.
Office Action from foreign counterpart China Patent Application No. 200510088676.1 dated Mar. 20, 2009, 24 pages.
Office Action from foreign counterpart China Patent Application No. 201180061132.X, dated May 27, 2015, 6 pages.
Office Action from foreign counterpart China Patent Application No. 201180061132.X, dated Oct. 10, 2016, 11 pages.
Office Action from foreign counterpart for Japan Patent Application No. 2007-506302 dated Jan. 11, 2011, 5 pages.
Office Action from foreign counterpart Japan Patent Application No. 2013-537753, dated Sep. 7, 2015, 9 pages.
Office Action from foreign counterpart Japanese Patent Application No. 2013-156855 dated Apr. 22, 2015, 6 pages.
Office Action from foreign counterpart Japanese Patent Application No. 2014-140413, dated Jun. 27, 2015, 6 pages. Translation attached.
Office Action from foreign counterpart Japanese Patent Application No. 20150162819, dated Oct. 3, 2016, 6 pages.
Office Action from foreign counterpart Korean Patent Application No. 2015-7002560, dated May 21, 2015, 10 pages.
Office Action from foreign counterpart mailed for New Zealand Patent Application No. 610463 dated Jan. 22, 2014, 2 pages.
Office Action from foreign counterpart Mexican Patent Application No. MX/a/2015/002992, dated Nov. 8, 2016, 4 pages.
Office Action from foreign counterpart Mexico Patent Application No. MX/a/2014/002900, dated May 25, 2015, 7 pages.
Office Action from foreign counterpart Russian Patent Application No. 2014151216, dated Sep. 30, 2016, 12 pages.
Office Action from foreign counterpart Russian Patent Application No. 2016144927, dated Dec. 21, 2016, 6 pages.
Office Action from Foreign Counterpart Taiwan Patent Application No. 094125985 dated Jan. 6, 2012, 7 pages.
Office Action from foreign counterpart Taiwan Patent Application No. 101133865, dated Oct. 28, 2016, 5 pages.
Office Action from foreign counterpart Taiwan Patent Application No. 102116145, dated Mar. 31, 2017, 7 pages.
Office Action from foreign counterpart Taiwan Patent Application No. 102117728, dated Nov. 29, 2016, 6 pages.
Office Action from U.S. Appl. No. 13/844,355 dated Jan. 8, 2015, 23 pages.
Office Action with English translation for Japanese Patent Application No. 2012-057351 dated Mar. 10, 2014, 2 pages.

(56) References Cited

OTHER PUBLICATIONS

Office Action with English translation from foreign counterpart Korean Patent Application No. 1020107006265 dated Jul. 29, 2014, 10 pages.
Office Action with English translation from Japanese Patent Application No. 2012-057351, dated Jul. 1, 2013, 6 pages.
Oman H, et al., "Eventful Developments in Energy Conversion", Conference Report, IEEE AESS Systems Magazine, Jan. 2002, pp. 34-40.
Onggosanusi E. N., et al., High Rate Space—Time Block Coded Scheme: Performance and Improvement in Correlated Fading Channels, Proc. IEEE Wireless Comm. and Net. Conf, Mar. 2002, vol. 1, pp. 194-199.
Optimized Markov Chain Monte Carlo for Signal Detection in MIMO Systems: An Analysis of the Stationary Distribution and Mixing Time, Signal Processing, vol. 62, No. 17, Sep. 2014.
Ozgur A., et al., "Spatial Degrees of Freedom of Large Distributed MIMO Systems and Wireless Ad Hoc Networks", Institute of Electrical and Electronics Engineers Journal on Selected Areas in Communications, 2013, vol. 31 (2), pp. 202-214.
Pan, Chengkang, et al, "Precoding and Power allocation for Cooperative MIMO systems", International Conference on Wireless Communications, Networking and Mobile Computing, IEEE, 2006, 4 pages.
Papadogiannis A., et al "Efficient Selective Feedback Design for Multicell Cooperative Networks", Institute of Electrical and Electronics Engineers Transactions on Vehicular Technology, 2010, vol. 60 (1), pp. 196-205.
Papadopoulos H.C., et al., Achieving Large Spectral Efficiencies from MU-MIMO with Tens of Antennas: Location-Adaptive TDD MU-MIMO Design and User Scheduling, in Proc. IEEE Asilomar Conf. on Signals, Systems, and Computers (ACSSC), Pacific Grove, CA, Nov. 2010.
Parvall, et al., "LTE Advanced-Evolving LTE Towards IMT-Advanced," IEEE VTC 2008, 978-1-4244-1722-3/08/$25.00, pp. 5.
Paul Carlisle "Coded Aperture Imaging," 1998, pp. 1-6, printed on Mar. 15, 2007 Internet: http://paulcarlisle.net/old/codedaperature.html.
Paulraj A., et al., "Introduction to Space-Time Wireless Communications", 2003, 33 Pages.
Payami S., et al., Channel Measurements and Analysis for Very Large Array Systems At 2.6 GHz, in Proc. 6th European Conference on Antennas and Propagation, EuCAP 2012, Prague, Czech Republic, Mar. 26, 2012.
Per-Erik ., et al., "VDSL2: Next Important Broadband Technology", Ericsson Review No. 1, 2006, pp. 36-47.
Perlman., et al., Distributed-Input Distributed-Output (Dido) Wireless Technology: A New Approach to Multiuser Wireless, Aug. 2011, Retrieved from the Intemet:< URL: http://www.rearden.com/DIDO/DIDO White Paper 110727.pdf>.
Perlman et al., "Distributed-Input Distributed-Output (Dido) Wireless Technology: A New Approach to Multiuser Wireless", Rearden Labs White Paper, 19 pages, Jul. 2011, Retrieved from the Internet: http:www.reardenwireless.com11 0727-DIDOA %20New %20Approach%20to%20Multiuser%20Wireless.pdf.
Piazza D., et al., "Design and Evaluation of a Reconfigurable Antenna Array for MIMO Systems", IEEE Transactions on Antennas and Propagation, 2008, vol. 56 (3), pp. 869-881.
Ping-Heng., et al., "Compressive Sensing Based Channel Feedback Protocols for Spatially-Correlated Massive Antenna Arrays", in Proc. IEEE Wireless Communications and Networking Conference (WCNC 2012), Apr. 2012, pp. 492-497.
Pitarokoilis A. et al., "On the Optimality of Single-Carrier Transmission in Large-Scale Antenna Systems," IEEE Wireless Commun. Lett., vol. 1, No. 4, pp. 276-279, Aug. 2012.
Pohl V., et al., "Antenna spacing in MIMO indoor channels," IEEE Proc. Veh. Technol. Conf, 2002, vol. 2, pp. 749-753.
Pollock et al., "Antenna Saturation Effects on MIMO Capacity," IEEE International Conference on Communications, 2003, vol. 4, pp. 2301-2305.
Post-quantum Cryptography [Web], Retrieved on Nov. 14, 2014, 3 pages. Retrieved from the Internet< URL: http://pqcrypto.org/>.
Proakis J., "Digital Communications Fourth edition," 2001, pp. 9, Department of Electrical and Computer Engineering, Northeastern University, ISBN 0-07-232111-3, Cover page, Title page, Table of Contents.
Proakis J.G., "Communication System Engineering," Prentice Hall, Table of Contents, 1994, 11 pages.
Propagation, 2 pages, printed Oct. 21, 2005, http://home.planet.n1/~alphe078/propagat1.htm.
Qian, "Partially Adaptive Beamforming for Correlated Interference Rejection", IEEE Trans. On Sign. Proc., 1995, vol. 43 (2), pp. 506-515.
Qibi, "A Forward Link Performance Study of the 1 xEV-DO Rev. 0 System Using Field Measurements and Simulations," Lucent Technologies. Retrieved from the Internet:< URL: http:www.cdg.orgresourceswhite_papersfilesLucent%201 xEVDO%20Rev%200%20Mar%2004.pdf>. 2004, 19 pages.
QUALCOMM, "The 1000x Data Challenge, the Latest on Wireless, Voice, Services and Chipset Evolution," 4G World, Oct. 31, 2012, 61 pages, Submitted as Parts 1-3.
Quantum Cryptography. Wikipedia: The Free Encyclopedia. Wikimedia Foundation, Inc. Jul. 26, 2014. [Web], Retrieved on Nov. 14, 2014, 5 pages [online]. Retrieved from the Internet.
Radio Frequency Identification Tag Application for Tracking Vehicle Refueling, Maintenance, and Theft, IBM Technical disclosure Bulletin, vol. 40 (3), Mar. 1997, p. 81/82.
Rao R., et al., "I/Q mismatch cancellation for MIMO-OFDM systems in Personal, Indoor and Mobile Radio Communication," PIMRC, vol. 4, 2004, pp. 2710-2714.
Rao R.M., et al., "Multi-antenna testbeds for research and education in wireless communications," IEEE Communications Magazine, 2004, vol. 42 (12), pp. 72-81.
Rapajic P., et al., Information Capacity of Random Signature Multiple-Input Multiple Output Channel, IEEE Trans. Commun., 2000, vol. 48 (8), pp. 1245-1248.
Rappaport T., "Wireless Communications Principles and Practice," 2002, 13 pages, Prentice Hall.
Ravindran N., et al., "MIMO Broadcast Channels with Block Diagonalization and Finite Rate Feedback," IEEE, ICASSP Apr. 2007, pp. III-13-III-16.
Reconfigurable Radio Systems (RRS); Radio Base Station (RBS) Software Defined Radio (SDR) status implementations and costs aspects including future possibilities, Technical Report, ETSI, No. V1.1.1, 2009, pp. 24.
Regenerative Power and Motion, "Electric Highway Vehicles", 10 pages, http://home.earthlink.net/~fradella/car.htm.
Rejection Decision from foreign counterpart Japan Patent Application No. JP2014264325, dated Oct. 3, 2016, 7 pages.
Renner E., "Pinhole Photography," 2000, pp. 1-5.
Restriction Requirement for U.S. Appl. No. 11/039,029 dated Apr. 12, 2006, 5 pages.
Robert K., et al. "Unconditional Security From Noisy Quantum Storage," IEEE Transactions on Information Theory, 2012, vol. 58 (3), pp. 1962-1984.
Robinson S., Toward an Optimal Algorithm for Matrix Multiplication, Nov. 2005, 3 pages, vol. 38 (9).
Ruckus wireless, "Long-range 802.11n (5GHz) Wi-Fi Point-to-Point/Multipoint backhaul," Sep. 4, 2015, 2 pages, Retrieved from the lnternet:< URL: http://www.ruckuswireless.Com/products/ZoneFlex-outdoor7731>.
Rysavy P., "No silver bullets for FCC, NTIA spectrum challenge", Daily report for executives, Bloomberg BNA, Aug. 2012, pp. 1-4, http://www.rysavy.com/Articles/2012 09 No Spectrum Silver Bullets.pdf.
Saleh A.A.M., et al.,"A Statistical Model for Indoor Multipath Propagation ", Institute of Electrical and Electronics Engineers Journal on Selected Areas in Communications, 1987, vol. SAC-5 (2), pp. 128-137.
Samsung: "Discussion on open-loop CoMP schemes", 3GPP Draft; R1-093377 Open-Loop Comp, 3rd Generation Partnership Project (3GPP), Mobile Competence Centre; 650, Route Des Lucioles ;

(56) References Cited

OTHER PUBLICATIONS

F-06921 Sophia-Antipolis Cedex, France, No. Shenzhen. China, Aug. 19, 2009, Aug. 19, 2009, 4 pages.
Sasako M., et al., "Device for Detecting Abnormality on Wheel Tread of Railcar," Abstract, 1993, pp. 1.
Schafhuber D et al., "MMSE and Adaptive Prediction of Time-Varying Channels for OFDM Systems", IEEE Trans. Wireless Commun., 2005, vol. 4 (2), pp. 593-602.
Schmidl T.M., et al., "Robust frequency and timing synchronization for OFDM," IEEE Trans. Commun, 1997, vol. 45 (12), pp. 1613-1621.
Schubert M., et al., "Joint 'Dirty Paper' Pre-Coding and Downlink Beamforming," Spread Spectrum Techniques and Applications, 2002 IEEE Seventh International Symposium, Dec. 2002, vol. 2, pp. 536-540.
Schuchert S., et al., "A novel I/Q imbalance compensation scheme for the reception of OFDM signals," IEEE Transaction on Consumer Electronics, 2001, pp. 313-318.
Second Office Action and Search Report from foreign counterpart China Patent Application No. 201180061132.X dated Mar. 11, 2016, 11 pages.
Second Office Action and Search report from foreign counterpart China Patent Application No. 201280044869.5, dated Jan. 17, 2017, 19 pages.
Second Office Action from counterpart Mexican Patent Application No. MX/a/2014/013795, dated Feb. 3, 2016, 7 pages.
Second office action from foreign counterpart China Patent Application No. 200680021909.9 dated Sep. 5, 2011, 4 pages.
Serpedin E., et al., "Blind channel and carrier frequency offset estimation using periodic modulation precoders," IEEE Signal Processing, IEEE Transactions on [see also Acoustics, Speech, and Signal Processing, IEEE Transactions on], 2000, vol. 48 (8), pp. 2389-2405.
Sharif M., et al., "On the capacity of MIMO broadcast channel with partial side information," IEEE Trans. Info. Th, Feb. 2005, vol. 51 (2), pp. 506-522.
Shen Z., et al., "Low complexity user selection algorithms for multiuser MIMO systems with block diagonalization," IEEE Transactions on Signal Processing, 2005, pp. 1-12.
Shen Z., et al., "Sum capacity of multiuser MIMO broadcast channels with block diagonalization," IEEE Trans. Wireless Comm, 2005, 5 pages.
Shepard C., Argos: Practical Many-Antenna Base Stations, in Proc. ACM Int. Conf. Mobile Computing and Networking (MobiCom), Aug. 2012.
Shepard C., ArgosV2: A Flexible Many-Antenna Research Platform, Extended Abstract for demonstration in Proc. ACM Int. Conf. Mobile Computing and Networking (MobiCom), Oct. 2013.
Shi K., et al., "Coarse frame and carrier synchronization of OFDM systems: a new metric and comparison," IEEE Trans. Wireless Commun, 2004, vol. 3 (4), pp. 1271-1284.
Shiu D., et al., "Fading correlation and its effect on the capacity of multielement antenna systems," IEEE Trans. Comm, 2000, vol. 48 (3), pp. 502-513.
Shuangqing Wei., et al., "On the Asymptotic capacity of MIMO Systems with Fixed Length Linear Antenna Arrays," IEEE International Conference on Communications, 2003, vol. 4, pp. 2633-2637.
Simon, M, K., et al., "Digital Communication over Fading Channels" A Unified Approach to Performance Analysis, Wiley Series in Telecommunications and Signal Processing, 2000.
Simon S.H., et al., "Optimizing MIMO Antenna Systems with Channel Covariance Feedback," IEEE Journal on Selected Areas in Communications, 2003, vol. 2003, pp. 406-417.
Spencer Q H., et al., "Adaptive Antennas and MIMO Systems for Wireless Communications—An Introduction to the Multi-User MIMI Downlink," IEEE Communications Magazine, 2004, pp. 60-67.
Spencer Q H., et al., "Zero-forcing methods for downlink spatial multiplexing in multiuser MIMO channels," IEEE Trans. Sig. Proc, 2004, vol. 52, pp. 461-471.
Srinidhi N., et al., "Layered Tabu Search Algorithm for Large-MIMO Detection and a Lower Bound on ML Performance", IEEE Trans. Commun, 2010, 5 pages.
Srinidhi N., et al., "Layered Tabu Search Algorithm for Large-MIMO Detection and a Lower Bound on ML Performance", IEEE Trans. Commun, vol. 59, No. 11, pp. 2955-2963, Nov. 2011.
Stancil D.D., et al., "Doubling wireless channel capacity using co-polarised, co-located electric and magnetic dipoles", Electronics Letters, 2002, vol. 38 (14), pp. 746-747.
Stanford Tech Report CTSR 2005-02, "Light Field Photography with a Hand-held Plenoptic Camera," 11 pages.
Stanley M., "Mobile Data Wave: Who Dares to Invest, Wins," Jun. 13, 2012, 23 pages.
Sternad M., et al., "Channel Estimation and Prediction for Adaptive OFDM Downlinks [Vehicular Applications]," in Proceeding IEEE Vehicular Technology Conference, vol. 2, Oct. 2003, pp. 1283-1287.
Stoytchev M., et al., "Compact antenna arrays for MIMO applications," IEEE Proc. IEEE Antennas and Prop. Symp., 2001, vol. 3, pp. 708-711.
Strangeways H., "Determination of the Correlation Distance for Spaced Antennas on Multipath HF Links and Implications for Design of SIMO and MIMO Systems," School of Electronic and Electrical Engineering, University of Leeds, IEEE First European Conf. on Antennas and Prop., 12 pages.
Strangways H.J., "Investigation of signal correlation for spaced and co-located antennas on multipath hf links and implications for the design of SIMO and MIMO system," IEEE First European Conf. on Antennas and Propagation (EuCAP 2006), 2006, vol. , No. 6-10, pp. 1-6.
Strohmer T., "Application of Time-Reversal with MMSE Equalizer to UWB Communication," Proc. of IEEE Globecom, 2004, vol. 5, pp. 3123-3127.
Studer C., et al., "PAR-Aware Large-Scale Multi-User MIMO-OFDM Downlink", IEEE J. Sel. Areas Commun., Sep. 4, 2012, vol. 31 (2), pp. 303-313.
Sulonen K., et al. "Comparison of MIMO Antenna Configurations in Picocell and Microcell Environments," IEEE Journal on Selected Areas in Communications, 2003, vol. 21 (5), pp. 703-712.
Supplementary European Search Report for Application No. EP05733294 dated Apr. 5, 2012, 4 pages.
Supplementary Partial European Search Report for Application No. EP11838640.8, dated Mar. 2, 2017, 13 pages.
Supplementary Partial European Search Report for Application No. EP14770916, dated Oct. 21, 2016, 6 pages.
Suraweera H.A., et al., Multi-Pair Amplify-and-Forward Relaying with Very Large Antenna Arrays, Proceedings in IEEE International Conference on Communications (ICC), Budapest, Hungary, Jun. 2013.
Suthisopapan P., et al., "Near Capacity Approaching Capacity of Large MIMO Systems by Non-Binary LDPC Codes and MMSE Detection", in Proc. of the IEEE International Symposium on Information Theory, 2012.
Suzuki H., et al., Highly Spectrally Efficient Ngara Rural Wireless Broadband Access Demonstrator, Proceedings in IEEE International Symposium on Communications and Information Technologies (ISCIT), Oct. 2012.
Suzuki H., et al., Large-scale multiple antenna fixed wireless systems for rural areas, Proceedings in IEEE PIMRC, Sep. 2012.
Svac P., et al., Soft-Heuristic Detectors for Large MIMO Systems, IEEE Trans. Signal Processing, 2013, vol. 61 (18), pp. 4573-4586.
Svantesson T., et al., "Analysis of Electromagnetic Field Polarizations in Multiantenna Systems", IEEE Transactions on Wireless Communications, vol. 3 (2), Mar. 2004, pp. 641-646.
Svantesson T., et al., "On Capacity and Correlation of Multi-Antenna Systems Employing Multiple Polarizations," IEEE Antennas and Propagation Society, 2002, vol. 3, pp. 202-205.

(56) References Cited

OTHER PUBLICATIONS

T. Datta, N. Srinidhi, A. Chockalingam, and B. Sundar Rajan, A Hybrid RTS-BP Algorithm for Improved Detection of Large-MIMO M-QAM Signals, in Proc. IEEE National Conference on Communication, 2011.
T. L. Narasimhan and A. Chockalingam, M-ary Detection and q-ary Decoding in Large-Scale MIMO: A Non-Binary Belief Propagation Approach, Oct. 16, 2013, 7 pages.
T. Yoo, N. Jindal, and A. Goldsmith, "Multi-antenna broadcast channels with limited feedback and user selection," Draft Version, 36 pages, dated Jun. 8, 2006 of IEEE Journal on Set Areas in Communications, vol. 25, pp. 1478-91, Jul. 2007.
Takeuchi K., et al. "On an Achievable Rate of Large Rayleigh Block-Fading MIMO Channels with No CSI" IEEE Transactions on Information Theory, 2011.
Taluja P. S., et al., Diversity Limits of Compact Broadband Multi-Antenna Systems, IEEE J. Set Areas Communication, 2013, vol. 31 (2), pp. 326-337.
Tanaka T., et al., "Power Supply System of Electric Automobile Electric Automobile used for its System and the Same Power Supply Device," Patent Abstract, 2005, pp. 1.
Tang T., et al., "Joint frequency offset estimation and interference cancellation for MIMO-OFDM systems [mobile radio]," 2004 IEEE 60th Vehicular Technology Conference, VTC2004-Fal, 2004, vol. 3, pp. 1553-1557.
Tanumay Datta., et al., "A Novel Monte-Carlo-Sampling-Based Receiver for Large-Scale Uplink Multiuser MIMO Systems," IEEE Transactions on Vehicular Technology, 2013, vol. 62(7), pp. 3019-3038.
Taricco G., et al., "Asymptotic Mutual Information Statistics of Separately-Correlated Rician Fading MIMO Channels," IEEE Trans. Inform. Theory, Aug. 2008, vol. 54 (8), pp. 3490-3504.
Tarighat A., et al., "Compensation schemes and performance analysis of IQ imbalances in OFDM receivers," IEEE Signal Processing, Transactions on [see also Acoustics, Speech, and Signal Processing, IEEE Transactions on], 2005, vol. 53, pp. 3257-3268.
Tarighat, et al., "MIMO OFDM receivers for systems with IQ imbalances," IEEE Trans. Sig. Pro, for orthogonal space-time block codes (OSTBC), 2005, vol. 53, pp. 3583-3596.
Tarokh V., et al., "Space-time block codes from orthogonal designs," IEEE Trans. Info, 1999, vol. 45, pp. 1456-1467.
Tarokh V., et al., "Space-Time Codes for High Data Rate Wireless Communication: Performance Criterion and Code Construction," IEEE Transactions on Information Theory, 1998, vol. 44, pp. 744-765.
Teletar I.E., "Capacity of Multi-antenna Gaussian Channels", European Transactions on Telecommunications, vol. 10, Nov. 1999, pp. 1-28.
Tesla's Experiments With Electric Cars, Teslas FAQ No. 15, Interesting Facts About Nik, Twenty First Century Books, Could you write something about Tesla's experiments with electric cars?, 1 page, http://www.tfcbooks.corn/teslafaq/q&a_015.htm.
Teukolsky S.A., Numerical Recipes in C: The Art of Scientific Computing, Cambridge University Press, 1992, pp. 949.
The White House, "Presidential Memorandum: Unleashing the Wireless Broadband Revolution", [retrieved on Jun. 28, 2010] Retrieved from the Internet: URL: http://www.whitehouse.gov/the-press-office/presidential-memorandum-unleashing-wireless-broad-band-revolution.
Third Office Action from counterpart Mexican Patent Application No. MX/a/2014/013795 dated Jul. 27, 2016, 6 pages.
Tomlinson M., "New Automatic Equaliser Employing Modulo Arithmetic," Electronics Letters, 1971, vol. 7 (5/6), pp. 138-139.
Toyota Special Reports, Toyota FCHV—The First Step Toward the Hydrogen Society of Tomorrow, "Accelerating Towards a Hydrogen Society through Fuel Cell Vehicles", pp. 1-8.
Tran L.N., et al. "A Conic Quadratic Programming Approach to Physical Layer Multicasting for Large-Scale Antenna Arrays,"IEEE Signal Processing Letters, 2014, vol. 21 (1), pp. 114-117.
International Preliminary Report on Patentability and Written Opinion for Application No. PCT/US2013/071749 dated Jun. 4, 2015, 7 pages.
International Preliminary Report on Patentability and Written Opinion for Application No. PCT/US2014/025102 dated Sep. 24, 2015, 10 pages.
International Preliminary Report on Patentability and Written Opinion for Application No. PCT/US2014/025105 dated Sep. 24, 2015, 10 pages.
International Preliminary Report on Patentability and Written Opinion for Application No. PCT/US2014/025108 dated Sep. 24, 2015, 8 pages.
International Preliminary Report on Patentability and Written Opinion for Application No. PCT/US2014/025109 dated Oct. 1, 2015, 5 pages.
International Preliminary Report on Patentability and Written Opinion for Application No. PCT/US2014/025123 dated Sep. 24, 2015, 10 pages.
International Preliminary Report on Patentability from foreign counterpart PCT/US2013/061493 dated Apr. 16, 2015, 7 pages.
International Search Report and Written Opinion for Application No. PCT/US2015/23436 dated Aug. 19, 2015, 10 pages.
International Search Report and the Written Opinion for Application No. PCT/US15/14511 dated May 18, 2015, 7 pages.
Truong K.T., et al. "Effects of Channel Aging in Massive MIMO Systems," Journal of Communications and Networks, Special Issue on Massive MIMO, 2013, vol. 15 (4), pp. 338-351.
Truong K.T., et al., "The Viability of Distributed Antennas for Massive MIMO Systems," Proceedings of the Asilomar Conference on Signals, Systems, and Computers, Pacific Grove, CA, Nov. 3-6, 2013, pp. 1318-1323.
Tsakalaki E. P., et al., On the Beamforming Performance of Large-Scale Antenna Arrays , Proc. Loughborough Antennas and Propagation Conference (LAPC), Nov. 2012.
Tse D et al., "Diversity-multiplexing tradeoff in multiple-access channels", IEEE Trans. Info. Th., 2004, vol. 50 (9), pp. 1859-1874.
Tse et al., "Performance Tradeoffs between Maximum Ratio Transmission and Switched-Transmit Diversity", in Proc. 11.sup.th IEEE International Symposium on Personal, Indoor and Mobile Radio Communication, vol. 2, Sep. 2000, pp. 1485-1489.
Tureli U., et al., "OFDM blind carrier offset estimation: ESPRIT," IEEE Trans. Commun, 2000, vol. 48 (9), pp. 1459-1461.
Tyler N., et al., "Adaptive antennas: the Calibration Problem", IEEE Comm. Mag., pp. 114-122, Dec. 2004.
Ubuquiti, "airFiber", http://www.ubnt.com/airfiber, 10 pages.
Ubuquiti, "airMAX", [online], Retrieved from the Internet< URL:http:www.ubnt.comairmax>, 2015, 10 pages.
U.S. Appl. No. 12/802,976, filed Jun. 16, 2010.
Uthansakul P., et al., MIMO antenna selection using CSI from reciprocal channel, Int. Journal of Elect. And Info. Eng., 2010, vol. 4 (10), pp. 482-491.
Valkama M., et al., "Advanced methods for I/Q imbalance compensation in communication receivers," IEEE Transactions on Signal Processing, vol. 49, No. 10, 2001, pp. 2335-2344.
Vallet P., et al., Improved Subspace Estimation for Multivariate Observations of High Dimension: The Deterministic Signals Case, IEEE Trans. Inform. Theory, 2012, vol. 58 (2), pp. 1043-1068.
Van B.D. et al.,"Beamforming: A Versatile Approach to Spatial Filtering," IEEE ASSP Magazine, 1988, pp. 4-24.
Van De Beek J., et al., "ML estimation of time and frequency offset in OFDM systems," IEEE Transactions, Signal Processing, 1997, vol. 45 (7), pp. 1800-1805.
Vaughan R.G., "On Optimum Combining at the Mobile," IEEE Transactions on Vehicular Technology, Nov. 1988, vol. 37(4), pp. 181-188.
Vaughn R., et al., "Switched parasitic elements for antenna diversity," IEEE Transactions on Antennas and Propagation, 1999, vol. 47, pp. 399-405.
Venkatesan et al., "Network MIMO: Overcoming InterCell Interference in Indoor Wireless Systems," Asilomar Conference on Signals, 2007, vol. 2007, pp. 83-87.

(56) References Cited

OTHER PUBLICATIONS

Venkatesan S., et al., "A WiMAX-Based Implementation of Network MIMO for Indoor Wireless Systems," EURASIP Journal on Advances in Signal Processing, 2009, vol. 2009, 11 pages.
Vieira J., et al., "A flexible 100-antenna testbed for Massive MIMO," in Proc IEEE Globecom 2014 Workshop—Massive MIMO: From Theory to Practice, Austin, Texas, USA, Dec. 2014, pp. 287-293.
Vishwanath S., "Duality, Achievable Rates, and Sum-Rate Capacity of Gaussian MIMO Broadcast Channels," IEEE Trans. Info. Th, 2003, vol. 49 (10), pp. 2658-2668.
Visotsky E., et al., "Space-Time Transmit Precoding with Imperfect Feedback," IEEE Transactions on Information Theory, 2001, vol. 47, pp. 2632-2639.
Visuri et al "Colocated Antenna Arrays: Design Desiderata for Wireless Communications," 2002, vol. 2002, pp. 580-584.
Viswanath P., et al., "Opportunistic beamforming using dump antennas," IEEE Transactions on Information Theory, 2002, vol. 48, pp. 1277-1294.
Viswanath, "Sum Capacity of the Vector Gaussian Broadcast Channel and Uplink-Downlink Duality," IEEE Transactions on Information Theory, 2003, vol. 49 (8), pp. 1912-1921.
Vivato—Homepage, http://www.vivato.net/, printed Apr. 9, 2004, 1 page.
Wagner et al., "Large System Analysis of Linear Precoding in MISO Broadcast Channels with Limited Feedback," IEEE Transactions on Information Theory, 2012, vol. 58(7), pp. 4509-4537.
Waldschmidt C., et al., "Compact MIMO-arrays based on polarisation-diversity", Proc. IEEE Antennas and Prop. Symp., 2003, vol. 2, pp. 499-502.
Waldschmidt C., et al., "Complete RF system model for analysis of compact MIMO arrays," IEEE Trans. on Vehicular Technologies, 2004, vol. 53, pp. 579-586.
Wallace J W., et al., "Termination-dependent diversity performance of coupled antennas: Network theory analysis," IEEE Transactions on Antennas and Propagation, 2004, vol. 52, pp. 98-105.
Wallace J.W., et al., "Statistical Characteristics of Measured MIMO Wireless Channel Data and Comparison to Conventional Models," Proceedings IEEE Vehicular Technology Conference, Oct. 2001, vol. 2 (7-11), pp. 1078-1082.
Wampfler, Inc., Home page, Wampfler, Inc., KY, USA—Wampfler Group, 1 page, printed on Apr. 17, 2006, http://www.wampfler.us/.
Wang Z., et al., "Enhanced downlink MU-Comp schemes for TD-LTE-Advanced," Wireless Communications and Networking Conference (WCNC), IEEE, 2010, 6 pages.
Wang Z., Performance of uplink multiuser massive MIMO system, International Conference on Acoustics Speech, and Signal Processing, Florence, Italy, 2014.
Wannstrom J., "Carrier Aggregation Explained," 3GPP Retrieved from the Internet: URL: http://www.3gpp.org/Carrier-Aggregation-explained.
Warrington et al., "Measurement and Modeling of HF Channel Directional Spread Characteristics for Northerly Path," Radio Science, RS2006, 2006, vol. 41, pp. 1-13.
Watrous, et al., "Zero-Knowledge against Quantum Attacks," SIAM Journal on Scientific Computing, 2009, vol. 2009, pp. 25-58.
Webpass, Buildings online, printed on Sep. 4, 2015, Retrieved from the Internet< http://www.webpass.net/buildings?city=san+francisco &column=address&order=asc>, 3 pages.
Weedon W.H., et al., "MEMS—switched reconfigurable antennas", IEEE Antennas and Propagation Society, AP-S International Symposium (Digest), vol. 3, 2001, pp. 654-657.
Well-to-Wheels Analysis of Advanced Fuel/Vehicle Systems—A North American Study of Energy Use, Greenhouse Gas Emission, and Criteria Pollutant Emissions, May 2005, 238 pages.
Wen C K., et al., "Asymptotic Mutual Information for Rician MIMO-MA Channels with Arbitrary Inputs: A Replica Analysis", IEEE Trans. Commun., 2010, vol. 58 (10), pp. 2782-2788.
Wen C K., et al., "On the Sum-Rate of Multiuser MIMO Uplink Channels with Jointly-Correlated Rician fading", IEEE Trans. Commun., 2011, vol. 59 (10), pp. 2883-2895.
Wenger J., et al., "The Intelligent Highway: A Smart Idea?", Strategy+ Business, Boaz & Co., Feb. 26, 2008, http://www.strategy-business.com/media/file/leading.ideas-20080226.pdf, pp. 5 total.
Wennestrom et at, "An Antenna Solution for MIMO Channels: The Switched Parasitic Antenna", IEEE International Symposium on Personal, Indoor and Mobile Radio Communications, PIMRC, vol. 1, 2001, pp. 159-163.
Wheeler H A., et at, "Small antennas," IEEE Transactions on Antennas and Propagation, 1975, vol. AP-23 (4), pp. 462-469.
Wi-Fi alliance, homepage, pp. 1-3, printed on Aug. 14, 2014, Retrieved from the Internet< URL: www.wi-fi.org>.
Wi-Fi alliance, "Wi-Fi certified makes it Wi-Fi" http://www.wi-fi.org/files/WFA_Certification_Overview_WP_en.pdf, 1 page.
Wi-Fi alliance. "Wi-Fi certified makes it Wi-Fi: What Retailers and Consumers Need to Know" pp. 1-8, Sep. 2009, Retrieved from the Internet< URL: http://www.wi-fi.org/files/WFA_Certification_Overview_WP_en.pdf>.
Wikipedia, 2014, 6 pages [online]. "IS-95" Retrieved from the Internet: URL: http:en.wikipedia.orgwikiIS-95.
Wikipedia, Advanced Mobile Phone System. 2014, 6 pages [online]. Retrieved from the Internet: URL: https://en.wikipedia.org/wiki/AdvancedMobilePhoneSystem.
Wikipedia, "List of ad hoc routing protocols", printed on Mar. 8, 2011, 1 page, http://en.wikipedia.org/wiki/List_of_ad-hoc_routing_protocols.
Wikipedia, "Mobile ad hoc network," 2011, pp. 1-3, https://en.wikipedia.org/wiki/Mobile_ad_hoc_network.
WiMAX forum, 1 page, Aug. 14, 2014 http://www.wimaxforum.org/.
Wired, Has OnLive's Steve Perlman Discovered Holy Grail of Wireless?, Jun. 30, 2011 Retrieved from the Intemet:< URL: http:www.wired.comepicenter201106perlman-holy-grail-wireless>.
Wong I., et al., "Long Range Channel Prediction for Adaptive OFDM Systems," Proceedings IEEE Asilomar Conf. on Signals, Systems, and Computers, vol. 1, pp. 723-736, Pacific Grove, CA, USA, Nov. 7-10, 2004.
Wong I.C., et al., "Exploiting Spatia-Temporal Correlations in MIMO Wireless Channel Prediction," Dec. 2006, IEEE Globecom Conference, 5 pages.
Wong, I.C., et al., "Joint Channel Estimation and Prediction for OFDM Systems," Proceedings in IEEE Global Telecommunications Conference, St. Louis, MO, 2005, pp. 2255-2259.
Wong K., et al., "A Joint-Channel Diagonalization for Multiuser MIMO Antenna Systems," IEEE Transactions on Wireless Communications, 2003, vol. 2 (4), pp. 773-786.
Wong, "Performance Enhancement of Multiuser MIMO Wireless Communication Systems," IEEE Transactions on Communications, 2002, vol. 50 (12), pp. 1960-1970.
Written Opinion for Application No. PCT/US06/14854 dated May 8, 2008, 3 pages.
Wu M., et al., "Approximate Matrix Inversion for High-Throughput Data Detection in the Large-scale MIMO Uplink," IEEE International Symposium on Circuits and Systems (ISCAS), May 2013, pp. 2155-2158.
www.tfcbooks.com Resource cite on Nikola Tesla.
Xiao L., et al., "A Comparative Study of MIMO Capacity With Different Antenna Topologies," IEEE ICCS'02, vol. 1, Nov. 2002, pp. 431-435.
Xu J., "LTE-Advanced Signal Generation and Measurements using SystemVue," Agilent Technologies, 46 pages.
Yang W., et al., "On the Capacity of Large-MIMO Block-Fading Channels," IEEE Journal on Selected Areas in Communications, Sep. 30, 2012, vol. 31(2), pp. 1-16.
Yin B., et al., "Full-Duplex in Large-Scale Wireless System," Proceeding of the Asilomar Conference on Signals, Systems and Computers, 2013, 5 pages.
Yin B., et al., "Implementation trade-offs for linear detection in large-scale MIMO systems," Proceeding Institute of Electrical and

(56) References Cited

OTHER PUBLICATIONS

Electronics Engineers International Conference on Acoustics Speech, and Signal Processing, 2013, 5 pages.
Yin H., et al., A Coordinated Approach to Channel Estimation in Large-scale Multiple-antenna Systems, IEEE Journal on Selected Areas in Communications, Sep. 2, 2012, vol. 31 (2), pp. 1-10.
Yoo, "Multi-Antenna Downlink Channels with Limited Feedback and User Selection," IEEE Journal on Selected Areas in Communications, Sep. 2007, vol. 25 (7), pp. 1478-1491.
Yu, "Sum Capacity of Gaussian Vector Broadcast Channels," IEEE Transactions on Information Theory, 2004, vol. 50 (9), pp. 1875-1892.
Yu W., et al., "Trellis Precoding for the Broadcast Channel," IEEE Globecom, 2001, vol. 2, pp. 1344-1348.
Zaidel B., et al., "Vector Precoding for Gaussian MIMO Broadcast Channels: Impact of Replica Symmetry Breaking", Institute of Electrical and Electronics Engineers Transactions on Information Theory, 2012, vol. 58 (3), pp. 1413-1440.
Zakhour R., et al., "Min-Max Fair Coordinated Beamforming via Large Systems Analysis,", in Proc. of the IEEE International Symposium on Information Theory, St. Petersburg, Jul. 2011.
Zamir R ., et al., "Capacity and lattice-strategies for cancelling known interference," Proceedings of International Symposium on Information Theory, Honolulu, Hawaii, Nov. 2000, pp. 1-32.
Zetterberg P., "Experimental Investigation of TDD Reciprocity based Zero-Forcing Transmit Precoding", EURASIP, Jun. 2010.
Zhang, "Coordinated Multi-Cell MIMO Systems With Cellular Block Diagonalization," IEEE, 2007, pp. 1669-1673.
Zhang H., et al., "Cochannel Interference Mitigation and Cooperative Processing in Downlink Multicell Multiuser MIMO Networks," EURASIP Journal on Wireless Communications and Networking, vol. 2004 (2), 2004, pp. 222-235.
Zhang J., et al., "Hermitian Precoding for Distributed MIMO Systems with Individual Channel State Information," IEEE Journal on Selected Areas in Communications, 2013, vol. 31 (2), pp. 241-250.
Zhang J., et al. "On Capacity of Large-Scale MIMO Multiple Access Channels with Distributed Sets of Correlated Antennas," IEEE Journal on Selected Areas in Communications, Sep. 26, 2012, vol. 31 (2), pp. 1-52.
Zhang, "Networked MIMO with Clustered Linear," IEEE Transactions on Wireless Communications, 2009, vol. 8 (4), pp. 1910-1921.
Zhang R., et al. Electromagnetic Lens-focusing Antenna Enabled Massive MIMO, Jun. 6, 2013, pp. 1-7.
Zheng L., et al., "Diversity and multiplexing: a fundamental tradeoff in multiple antenna channels," IEEE Trans. Info. Th., 2003, vol. 49 (5), pp. 1073-1096.
Zhou Q., et al., "An Improved LR-aided K-Best Algorithm for MIMO Detection," in Proc. IEEE International Conference on Wireless Communications and Signal Processing (WCSP), 2012.
Zhuang X., et at, "Channel models for link and system level simulations," IEEE 802.16 Broadband Wireless Access Working Group, 2004, 15 pages.
Zogg, "Multipath Delay Spread in a Hilly Region at 210 MHz," IEEE Transactions on Vehicular Technology, 1987, vol. VT-36 (4), pp. 184-187.
Zou R., et al., "Li Reducing the Complexity of Quasi-Maximum—Likelihood Detectors Through Companding for Coded MIMO Systems," IEEE Transactions on Vehicular Technology, 2012, vol. 2012, pp. 1109-1123.
Zyren J., "Overview on the 3GPP Long Term Evolution Physical Layer," Freescale White Paper, Jul. 2007, 27 pages.
Communication under rule 71(3) EPC for European Application No. 08798313.6, dated Oct. 24, 2017, 8 pages.
International Search Report and Written Opinion for Application No. PCT/US2017/047963, dated Nov. 3, 2017, 9 pages.
Partial Supplementary European Search Report for Application No. 15780522.7, dated Oct. 20, 2017, 7 pages.
Abandonment from U.S. Appl. No. 14/086,700, dated Dec. 26, 2017, 2 pages.
Final Office Action from U.S. Appl. No. 13/233,006, dated Dec. 19, 2017, 114 pages.
Final Office Action from U.S. Appl. No. 14/611,565, dated Oct. 25, 2017, 25 pages.
Final Office Action from U.S. Appl. No. 14/672,014, dated Oct. 16, 2017, 9 pages.
Final Office Action from U.S. Appl. No. 15/181,383, dated Jan. 11, 2018, 8 pages.
Non-Final office action from U.S. Appl. No. 15/057,002, dated Oct. 23, 2017, 60 pages.
Non-Final Office Action from U.S. Appl. No. 15/616,817, dated Nov. 1, 2017, 14 pages.
Notice of Allowance from U.S. Appl. No. 13/797,984, dated Oct. 19 , 2017, 10 pages.
Notice of Allowance from U.S. Appl. No. 15/201,276, dated Nov. 7, 2017, 7 pages.

* cited by examiner

SYSTEMS AND METHODS FOR EXPLOITING INTER-CELL MULTIPLEXING GAIN IN WIRELESS CELLULAR SYSTEMS VIA DISTRIBUTED INPUT DISTRIBUTED OUTPUT TECHNOLOGY

RELATED APPLICATIONS

This application may be related to the following co-pending U.S. Patent Applications/U.S. Patents:

U.S. application Ser. No. 13/633,702, entitled "Systems and Methods for wireless backhaul in distributed-input distributed-output wireless systems"

U.S. application Ser. No. 13/475,598, entitled "Systems and Methods to enhance spatial diversity in distributed-input distributed-output wireless systems"

U.S. application Ser. No. 13/233,006, entitled "System and Methods for planned evolution and obsolescence of multiuser spectrum"

U.S. application Ser. No. 13/232,996, entitled "Systems and Methods to Exploit Areas of Coherence in Wireless Systems"

U.S. application Ser. No. 13/464,648, entitled "System and Methods to Compensate for Doppler Effects in Distributed-Input Distributed Output Systems"

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication";

BACKGROUND

In the last three decades, the wireless cellular market has experienced increasing number of subscribers worldwide as well as demand for better services shifting from voice to web-browsing and real-time HD video streaming. This increasing demand for services that requires higher data rate, lower latency and improved reliability has driven a radical evolution of wireless technologies through different standards. Beginning from the first generation analog AMPS and TACS (for voice service) in the early 1980s, to 2G and 2.5G digital GSM, IS-95 and GPRS (for voice and data services) in the 1990s, to 3G with UMTS and CDMA2000 (for web-browsing) in the early 2000s, and finally LTE (for high-speed internet connectivity) currently under deployment in different countries worldwide.

Long-term evolution (LTE) is the standard developed by the 3$^{rd}$ generation partnership project (3GPP) for fourth generation (4G) wireless cellular systems. LTE can achieve theoretically up to 4× improvement in downlink spectral efficiency over previous 3G and HSPA+ standards by exploiting the spatial components of wireless channels via multiple-input multiple-output (MIMO) technology. LTE-Advanced is the evolution of LTE, currently under standardization, that will enable theoretically up to 8× increase in spectral efficiency over 3G standard systems.

Despite this technology evolution, it is very likely that in the next three years wireless carriers will not be able to satisfy the growing demand for data rate due to raising market penetration of smartphones and tables, offering more data-hungry applications like real-time HD video streaming, video conferencing and gaming. It has been estimated that capacity of wireless networks will grow 5× in Europe from 2011 to 2015 due to improved technologies such as LTE as well as more spectrum made available by the government [25]. For example, the FCC is planning to free 500 MHz of spectrum by 2020 (of which 300 MHz will be available by 2015) to promote wireless Internet connectivity throughout the US as part of the National Broadband Plan [24]. Unfortunately, the forecast for capacity usage by 2015 is 23× over 2011 in Europe [25] and similar spectrum deficit is expected to happen in the US by 2014 [26-27]. As a result of this data crunch, revenues for wireless carriers may drop below their CAPEX and OPEX with potentially devastating impact on the wireless market [28].

As capacity gains offered by LTE deployment and increased spectrum availability are insufficient, the only foreseeable solution to prevent this upcoming spectrum crisis is to promote new wireless technologies [29]. LTE-Advanced (the evolution of LTE standard) promises additional gains over LTE through more sophisticated MIMO techniques and by increasing the density of "small cells" [30]. However, there are limits to the number of cells that can fit a certain area without incurring interference issues or increasing the complexity of the backhaul to allow coordination across cells.

One promising technology that will provide orders of magnitude increase in spectral efficiency over wireless links without the limitations of conventional cellular systems is distributed-input distributed-output (DIDO) technology (see Related Patents and Applications referenced in [0002-0020] above. The present invention describes DIDO technology employed in the context of cellular systems (such as LTE or LTE-Advanced), both within and without the constraints of cellular standards, to provide significant performance benefits over conventional wireless systems. We begin with an overview on MIMO and review different spatial processing techniques employed by LTE and LTE-Advanced. Then we show how the present invention provides significant capacity gains for next generation wireless communications systems compared to prior art approaches.

MIMO employs multiple antennas at the transmitter and receiver sides of the wireless link and uses spatial processing to improve link reliability via diversity techniques (i.e., diversity gain) or provide higher data rate via multiplexing schemes (i.e., multiplexing gain) [1-2]. Diversity gain is a measure of enhanced robustness to signal fading, resulting in higher signal-to-noise ratio (SNR) for fixed data rate. Multiplexing gain is obtained by exploiting additional spatial degrees of freedom of the wireless channel to increase data rate for fixed probability of error. Fundamental tradeoffs between diversity and multiplexing in MIMO systems were described in [3-4].

In practical MIMO systems, link adaptation techniques can be used to switch dynamically between diversity and multiplexing schemes based on propagation conditions [20-23]. For example, link adaptation schemes described in [22-23] showed that beamforming or Orthogonal Space-Time Block Codes (OSTBC) are preferred schemes in low SNR regime or channels characterized by low spatial selectivity. By contrast, spatial multiplexing can provide significant gain in data rate for channels with high SNR and high spatial selectivity. For example, FIG. 1 shows that cells can be divided in two regions: i) multiplexing region 101, characterized by high SNR (due to proximity to the cell tower or base station) where the spatial degrees of freedom of the channel can be exploited via spatial multiplexing to increase data rate; ii) diversity region 102 or cell-edge, where spatial multiplexing techniques are not as effective and diversity methods can be used to improve SNR and coverage (yielding only marginal increase in data rate). Note that the circle of the macrocell 103 in FIG. 1 labels the shaded center of the circle as the "multiplexing region" and the unshaded outer region of the circle as the "diversity region". This same region designation is used throughout FIGS. 1,3-5, where the shaded region is the "multiplexing region" and the unshaded region is the "diversity region", even if they are not labeled. For example, the same designation is used for the small-cell 104 in FIG. 1.

The LTE (Release 8) and LTE-Advanced (Release 10) standards define a set of ten transmission modes (TM) including either diversity or multiplexing schemes [35,85-86]:

Mode 1: Single antenna port, port 0

Mode 2: Transmit diversity

Mode 3: Large-delay cyclic delay diversity (CDD), extension of open-loop spatial multiplexing for single-user MIMO (SU-MIMO)

Mode 4: Closed-loop spatial multiplexing for SU-MIMO

Mode 5: Multi-user MIMO (MU-MIMO)

Mode 6: Closed-loop spatial multiplexing, using a single transmission layer□

Mode 7: Single antenna port, UE-specific RS (port 5) □

Mode 8: Single or dual-layer transmission with UE-specific RS (ports 7 and/or 8)

Mode 9: Single or up to eight layers closed-loop SU-MIMO (added in Release 10)

Mode 10: Multi-layer closed-loop SU-MIMO, up to eight layers (added in Release 10)

Hereafter we describe diversity and multiplexing schemes commonly used in cellular systems as well as specific methods employed in LTE as outlined above, and compare them against techniques that are unique for DIDO communications. We first identify two types of transmission methods: i) intra-cell methods (exploiting micro-diversity in cellular systems), using multiple antennas to improve link reliability or data rate within one cell; ii) inter-cell methods (exploiting macro-diversity), allowing cooperation between cells to provide additional diversity or multiplexing gains. Then we describe how the present invention provides significant advantages (including spectral capacity gain) over prior art.

1. Intra-Cell Diversity Methods

Intra-cell diversity methods operate within one cell and are designed to increase SNR in scenarios with poor link quality (e.g., users at the cell-edge subject to high pathloss from the central tower or base station). Typical diversity schemes employed in MIMO communications are beamforming [5-11] and orthogonal space-time block codes (OSTBC) [12-15].

Diversity techniques supported by the LTE standard are transmit diversity, closed-loop rank-1 precoding and dedicated beamforming [31-35]. Transmit diversity scheme supports two or four transmit antennas over the downlink (DL) and only two antennas for the uplink (UL). In the DL channel, it is implemented via space-frequency block codes (SFBC) combined with frequency-switched transmit diversity (FSTD) to exploit space as well as frequency selectivity [31]. Rank-1 precoding creates a dedicated beam to one user based on quantized weights selected from a codebook (predesigned using limited feedback techniques [36-42]) to reduce the feedback overhead from the user equipment (UE) to the base transceiver station (BTS 105 in FIG. 1, or eNodeB using LTE terminology). Alternatively, dedicated beamforming weights can be computed based on UE-specific reference signal.

2. Intra-Cell Multiplexing Methods

MIMO multiplexing schemes [1,19] provide gain in data rate in high SNR regime and in scenarios with enough spatial degrees of freedom in the channel (e.g., rich multipath environments with high spatial selectivity [16-18]) to support multiple parallel data streams over wireless links.

The LTE standard supports different multiplexing techniques for single-user MIMO (SU-MIMO) and multi-user MIMO (MU-MIMO) [31]. SU-MIMO schemes have two modes of operation: i) closed-loop, exploiting feedback information from the UE to select the DL precoding weights; ii) open-loop, used when feedback from the UE is unavailable or the UE is moving too fast to support closed-loop schemes. Closed-loop schemes use a set of pre-computed weights selected from a codebook. These weights can support two or four transmit antennas as well as one to four parallel data streams (identified by number of layers of the precoding matrix), depending on the UE request and decision of the scheduler at the BTS. LTE-Advanced will include new transmission modes up to MIMO 8×8 to provide up to 8× increase in spectral efficiency via spatial processing [62].

MU-MIMO schemes are defined for both UL and DL channels [31,50]. In the UL, every UE sends a reference signal to the BTS (consisting of cyclically shifted version of the Zadoff-Chu sequence [33]). Those reference signals are orthogonal, such that the BTS can estimate the channel from all UEs and demodulate data streams from multiple UEs simultaneously via spatial processing. In the DL, precoding weights for different UEs are selected from codebooks based on the feedback from the UEs and the scheduler (similarly to closed-loop SU-MIMO schemes) and only rank-1 precoding is allowed for every UE (e.g., each UE receives only one data stream).

Intra-cell multiplexing techniques employing spatial processing provide satisfactory performance only in propagation scenarios characterized by high SNR (or SINR) and high spatial selectivity (multipath-rich environments). For conventional macrocells, these conditions may be harder to achieve as BTSs are typically far from the UEs and the distribution of the SINR is typically centered at low values [43]. In these scenarios, MU-MIMO schemes or diversity techniques may be better choices than SU-MIMO with spatial multiplexing.

Other techniques and network solutions contemplated by LTE-Advanced to achieve additional multiplexing gain (without requiring spatial processing through MIMO) are: carrier aggregation (CA) and small cells. CA [30,44-47] combines different portions of the RF spectrum to increase signal bandwidth up to 100 MHz [85], thereby yielding higher data rates. Intra-band CA combines different bands within the same portion of the spectrum. As such it can use the same RF chain for multiple channels, and multiple data streams are recombined in software. Inter-band CA requires different RF chains to operate at different portions of the spectrum as well as signal processing to recombine multiple data streams from different bands.

The key idea of small cells [30,47] is to reduce the size of conventional macro-cells, thereby allowing higher cell density and larger throughput per area of coverage. Small-cells are typically deployed through inexpensive access points 106 with low power transmission (as depicted in FIG. 1) as opposed to tall and expensive cell towers used for macrocells. Two types of small cells are defined in LTE-Advanced: i) metrocells, for outdoor installation in urban areas, supporting up 32 to 64 simultaneous users; and ii) femtocells, for indoor use, can serve at most 4 active users. One advantage of small cells is that the density of UEs close to the BTS is statistically higher, yielding better SNR that can be exploited via spatial multiplexing to increase data rate. There are, however, still many concerns about practical deployment of small cells, particularly related to the backhaul. In fact, it may be challenging to reach BTSs of every small cell via high-speed wireline connections, especially considering the high density of metrocells and femtocells in a given coverage area. While using Line-Of-Sight (LOS) backhaul to small cells can often be implemented inexpensively, compared to wireline backhaul, there often are no practical LOS backhaul paths available for preferred small cell BTS placements, and there is no general solution for Non-Line-Of-Sight (NLOS) wireless backhaul to small cell BTSs. Moreover, small cells require complex real-time coordination across BTSs to avoid interference as in self-organized networks (SON) [30,51-52] and sophisticated cell-planning tools (even more complex than conventional cellular systems, due to higher density of small cells) to plan their optimal location [48,49]. Finally, handoff is a limiting factor for small cells deployment, particularly in scenarios where groups of subscribers switch cells at the same time, causing large amount of handoff overhead over the backhaul, resulting in high latency and unavoidable dropped calls.

It can be trivially shown there is no practical general solution that enables small cells to co-exist with macrocells and achieve optimal, or necessarily even improved, throughput. Among the myriad of such unsolvable situations is when a small cell is located such that its UEs unavoidably overlap with a macrocell transmission and the small cell and the macrocell use the same frequencies to reach their respective UEs. Clearly in this situation, the macrocell transmission will interfere with the small cell transmission. While there may be some approach that mitigates such interference for particular circumstances of a particular macrocell, a particular small cell, the particular macrocell and small cell UEs involved, the throughput requirements of those UEs, and environmental circumstances, etc., any such approach would be highly specific, not only to the static plan of the macrocell and small cell, but to the dynamic circumstances of a particular time interval. Typically, the full throughput of the channel to each UE cannot be achieved.

3. Inter-Cell Diversity Methods

In a heterogeneous network (HetNet) [90] where macrocells coexist with small-cells (e.g., metro-cells, pico-cells and femto-cells) it is necessary to employ different techniques to eliminate inter-cell interference. While HetNets provide better coverage through small-cells, the gains in data rate are only marginal since they require sharing the spectrum through different forms of frequency reuse patterns or using spatial processing to remove interference rather than achieve multiplexing gain. The LTE standards employ inter-cell interference coordination (ICIC) schemes to remove interference particularly at the cell-edge. There are two types of ICIC methods: cell-autonomous and coordinated between BTSs.

Cell-autonomous ICIC schemes avoid inter-cell interference via different frequency reuse patterns depicted in FIG. 2, where the hexagons represent the cells and the colors refer to different carrier frequencies. Three types of schemes are considered in LTE: i) full frequency reuse (or reuse 1), where the cells utilize all the available bandwidth as in FIG. 2*a*, thereby producing high interference at the cell-edge; ii) hard frequency reuse (HFR), where every cell is assigned with a different frequency band as in FIG. 2*b* (with typical reuse factor of 3) to avoid interference across adjacent cells; iii) fractional frequency reuse (FFR), where the center of the cell is assigned with the whole available bandwidth as in frequency reuse 1, whereas the cell-edge operates in HFR mode to mitigate inter-cell interference as in FIG. 2*c*.

Coordinated ICIC methods enable cooperation across BTSs to improve performance of wireless networks. These techniques are a special case of methods taught in Related Patents and Applications [0002-0022] to enable cooperation across wireless transceivers in the general case of distributed antenna networks for multiple UEs all using the same frequency simultaneously. Cooperation across BTSs to remove inter-cell interference for the particular case of cellular systems for a single UE at a given time at a given frequency was described in [53]. The system in [53] divides every macrocell into multiple subcells and enables soft-handoff across subcells by employing dedicated beamforming from coordinated BTSs to improve link robustness at a single UE at a single frequency, as it moves along the subcell boundaries.

More recently, this class of cooperative wireless cellular networks has been defined in the MIMO literature as "network MIMO" or "coordinated multi-point" (CoMP) systems. Theoretical analysis and simulated results on the benefits obtained in network MIMO by eliminating inter-cell interference are presented in [54-61]. The key advantage of network MIMO and CoMP is to remove inter-cell interference in the overlapping regions of the cells denoted as "interference region" 301 in FIG. 3 for the case of macro-cells 302.

CoMP networks are actively becoming part of LTE-Advanced standard as a solution to mitigate inter-cell interference in next generation cellular networks [62-64]. Three CoMP solutions have been proposed so far in the standard to remove inter-cell interference: i) coordinated scheduling/beamforming (CS/CB), where the UE receives its data stream from only one BTS via beamfoming and coordination across BTSs is enabled to remove interference via beamforming or scheduling techniques; ii) dynamic cell selection (DCS) that chooses dynamically the cell for every UE on a per-subframe basis, transparently to the UE; iii) joint transmission (JT), where data for given UE is jointly transmitted from multiple BTSs to improve received signal quality and eliminate inter-cell interference. CoMP-JT yields larger gains than CoMP-CS/CB at the expenses of higher overhead in the backhaul to enable coordination across BTSs.

4. Inter-Cell Multiplexing Methods

Prior art multi-user wireless systems add complexity and introduce limitations to wireless networks which result in a situation where a given user's experience (e.g. available throughput, latency, predictability, reliability) is impacted by the utilization of the spectrum by other users in the area. Given the increasing demands for aggregate throughput within wireless spectrum shared by multiple users, and the increasing growth of applications that can rely upon multi-user wireless network reliability, predictability and low latency for a given user, it is apparent that prior art multi-user wireless technology suffers from many limitations. Indeed, with the limited availability of spectrum suitable for particular types of wireless communications (e.g. at wavelengths that are efficient in penetrating building walls), prior art wireless techniques will be insufficient to meet the increasing demands for bandwidth that is reliable, predictable and low-latency.

Prior art intra-cell diversity and multiplexing methods can only provide up to a theoretical 4× increase in throughput over current cellular networks for LTE (through MIMO 4×4) or at most a theoretical 8× for LTE-Advanced (through MIMO 8×8), although higher orders of MIMO achieve diminishing improvements in increasing throughput in a given multipath environment, particularly as UEs (such as smartphones) get smaller and more constrained in terms of antenna placement. Other marginal throughput gains in next generation cellular systems may be obtained from additional spectrum allocation (e.g., FCC national broadband plan), exploited via carrier aggregation techniques, and more dense distribution of BTSs via small cell networks and SON [30,46]. All the above techniques, however, still rely heavily on spectrum or time sharing techniques to enable multi-user transmissions, since the spectral efficiency gains obtained by spatial processing is limited.

While prior art inter-cell methods (e.g., network MIMO and CoMP systems [53-64]) can improve reliability of cellular networks by eliminating inter-cell interference, their capacity gains are only marginal. In fact, those systems constrain power transmitted from every BTS to be contained within the cell boundaries and are only effective to eliminate inter-cell interference due to power leakage across cells. FIG. 3 shows one example of cellular networks with three BTSs, each one characterized by its own coverage area or cell. The power transmitted from each BTS is constrained to limit the amount of interference across cells, depicted in FIG. 3 by the areas where the cells overlap. As these systems operate in the low SINR regime at the interference region, their gains in spectral efficiency is only marginal, similarly to intra-cell schemes for SU-MIMO. To truly obtain significant capacity gains in inter-cell cooperative networks, power constraints limited to cell-boundaries must be relaxed and spatial multiplexing techniques should be enabled throughout the cells where the SINR is high (not just at the cell-edge with poor SINR performance as in prior art approaches).

FIG. 4 shows the case where the power transmitted from the three BTSs 401 all transmitting simultaneously at the same frequency is increased, thereby allowing a higher level of interference throughout the cell 402. In prior art systems, such interference would result in incoherent interference (disrupting UE signal reception) throughout the interfering areas of the BTSs, but this interference is actually exploited in the present invention through novel inter-cell multiplexing methods using spatial processing to create areas of coherent interference (enhancing UE signal reception) around every UE, thereby providing simultaneous non-interfering data streams to every UE and increasing their SINR throughout the cell.

The scenario depicted in FIG. 4 is described in [89] for the particular case of cellular systems. The system in [89] consists of several BTSs identifying different cells that are grouped into clusters. Cooperation is allowed only across BTSs from adjacent cells within the same clusters. In this case it was shown that, as the power transmitted from the BTSs increases, there is a limit to the capacity (or spectral efficiency) achievable through inter-cell multiplexing methods. In fact, as the transmit power increases, the out-of-cluster interference increases proportionally, producing a saturation regime for the SINR and consequently for the capacity. As a consequence of this effect, the system in [89] can theoretically achieve at most 3× gain in capacity (i.e., at most three cells within the cluster) and any additional cell included in the cluster would reduce capacity due to increased out-of-cluster interference (e.g., the case of 21 cells per cluster yields lower capacity than the case of 3 cells per cluster). We observe that the fundamental capacity limit in [89] holds because the BTSs are constrained to predefined locations, as in cellular systems, and multiplexing gain is achieved by increasing transmit power from the BTSs. To obtain theoretically unlimited capacity gain via inter-cell multiplexing methods, the constraint on the BTS placement must be removed, allowing the BTSs to be placed anywhere is convenient.

It would thus be desirable to provide a system that achieves orders of magnitudes increase in spectral efficiency exploiting inter-cell multiplexing gain via spatial processing by removing any constraint on the power transmitted from distributed BTSs 501 as well as on their placement. FIG. 5 shows one example where many additional access points 502 are added to deliberately increase the level of incoherent interference throughout the cell 503, that is exploited in the present invention to generate areas of coherent interference around UEs, thereby yielding theoretically unlimited inter-cell multiplexing gain. The additional access points are placed serendipitously wherever it is convenient and are not constrained to any specific cell planning, as in cellular systems described in prior art. In an exemplary embodiment of the invention, the serendipitous access points are distributed-input distributed-output (DIDO) access points and the inter-cell multiplexing gain is achieved through DIDO methods described in [0014-0020] and [77-78]. In another embodiment, the serendipitous access points are low power transceivers, similar to inexpensive Wi-Fi access points or small-cells [30,47], thereby providing smaller areas of coverage overlapping throughout the macro-cell as shown in FIG. 5.

We observe that prior art inter-cell methods [53-64] avoid incoherent interference by intentionally limiting the transmit power from every BTS as in FIG. 3 and eliminate residual inter-cell interference (on the overlapping areas between cells) via spatial processing, thereby providing improved SINR and inter-cell diversity gain. We further observe that [89] constrains BTS placement to cell planning while increasing transmit power, thereby limiting the achievable capacity due to out-of-cluster interference, and as such it is still limited by interference. By contrast, the present invention exploits incoherent interference to create coherent interference around the UEs, by transmitting higher power from every BTS serendipitously placed, thereby improving signal quality at the UE that is necessary condition to obtain inter-cell multiplexing gain throughout the cell via spatial processing. As such, the systems described in prior art cannot be used to achieve unlimited inter-cell multiplexing gain via spatial processing, since there is not sufficient SINR throughout the cell (due to the limited transmit power from the BTSs or the out-of-cluster interference when transmit power is increased) to enable inter-cell multiplexing methods as in the present invention. Moreover, the systems described in prior art would be inoperable to achieve the multiplexing gain achieved in the present invention depicted in FIGS. 4-5, given that prior art systems were designed to avoid inter-cell interference within the diversity regions shown in the shaded area of FIG. 1 and FIGS. 3-5 rather than exploit inter-cell interference in the multiplexing regions to obtain inter-cell multiplexing gain as achieved in the present invention.

BRIEF DESCRIPTION OF THE DRAWINGS

A better understanding of the present invention can be obtained from the following detailed description in conjunction with the drawings, in which.

DETAILED DESCRIPTION

Figure 1:
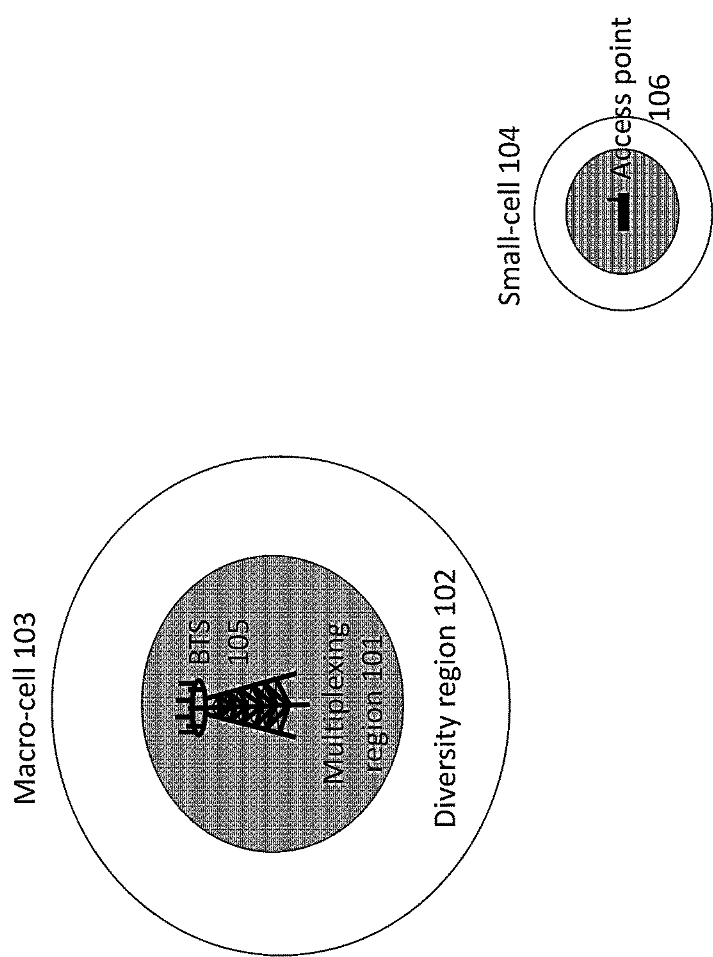
FIG. 1 illustrates multiplexing and diversity regions for a macro-cell and a small-cell.
Figure 2:
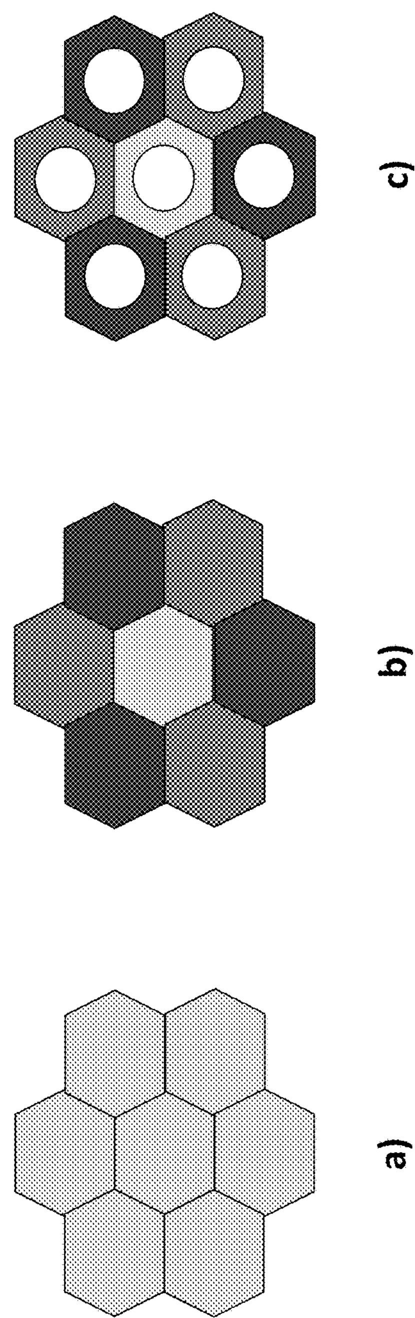
FIG. 2*a* illustrates full frequency reuse pattern in conventional cellular systems.
FIG. 2*b* illustrates hard frequency reuse (HFR) pattern in conventional cellular systems.
FIG. 2*c* illustrates fractional frequency reuse (FFR) pattern in conventional cellular systems.

One solution to overcome many of the above prior art limitations is an embodiment of Distributed-Input Distributed-Output (DIDO) technology. DIDO technology is described in the following patents and patent applications, all of which are assigned the assignee of the present patent and are incorporated by reference. These patents and applications are sometimes referred to collectively herein as the "Related Patents and Applications."

U.S. application Ser. No. 13/633,702, entitled "Systems and Methods for wireless backhaul in distributed-input distributed-output wireless systems"

U.S. application Ser. No. 13/475,598, entitled "Systems and Methods to enhance spatial diversity in distributed-input distributed-output wireless systems"

U.S. application Ser. No. 13/233,006, entitled "System and Methods for planned evolution and obsolescence of multiuser spectrum"

U.S. application Ser. No. 13/232,996, entitled "Systems and Methods to Exploit Areas of Coherence in Wireless Systems"

U.S. application Ser. No. 13/464,648, entitled "System and Methods to Compensate for Doppler Effects in Distributed-Input Distributed Output Systems"

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication";

To reduce the size and complexity of the present patent application, the disclosure of some of the Related Patents and Applications is not explicitly set forth below. Please see the Related Patents and Applications for a full description of the disclosure.

The present invention describes system and methods to exploit inter-cell multiplexing gain in wireless communications networks via spatial processing, employing a multiple antenna system (MAS) with multi-user (MU) transmissions (a Multi-User Multiple Antenna System, or "MU-MAS"), where the multiple antennas are placed serendipitously. In one embodiment of the invention, the power transmitted from the multiple antennas is constrained to minimize interference at cell boundaries (as in conventional cellular systems) and spatial processing methods are employed only to eliminate inter-cell interference. In another embodiment of the invention, the power transmitted from the multiple antennas is not constrained to any particular power level (as long as their power emission level falls within the regulatory, safety or practical (e.g. available power, transmitter and/or antenna specifications) limits), thereby creating intentionally higher levels of inter-cell interference throughout the cell that is exploited to achieve inter-cell multiplexing gain and increase the capacity of the wireless communications network.

Figure 3:
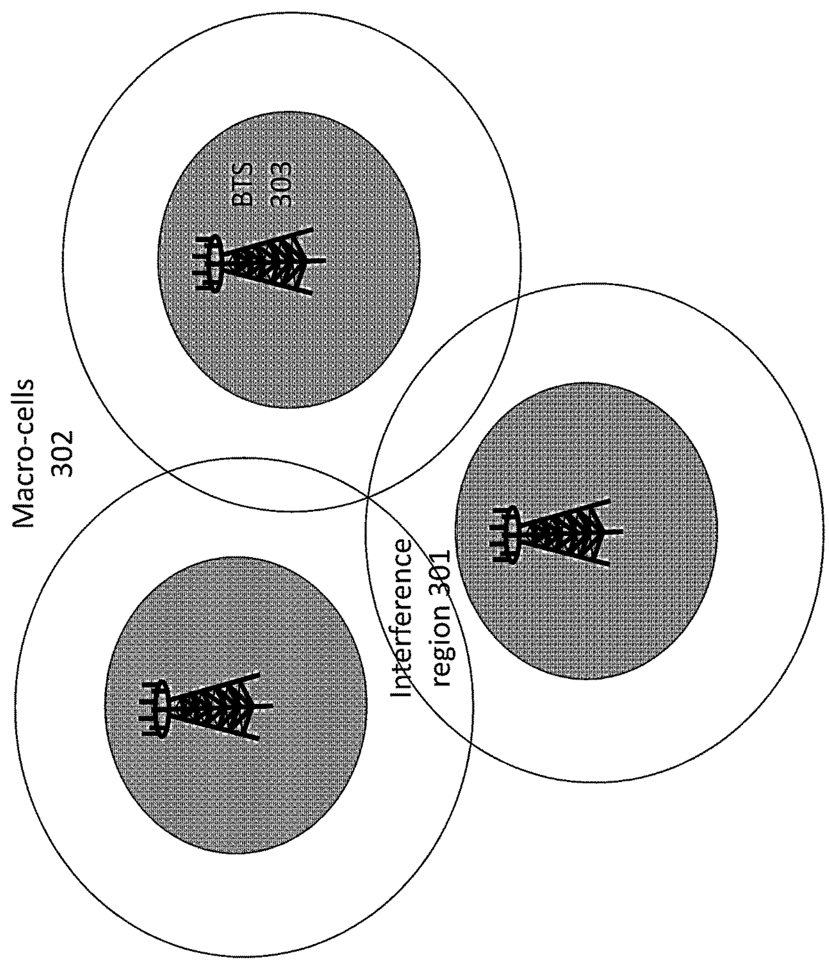
FIG. 3 illustrates the interference region between adjacent macro-cells.
Figure 4:
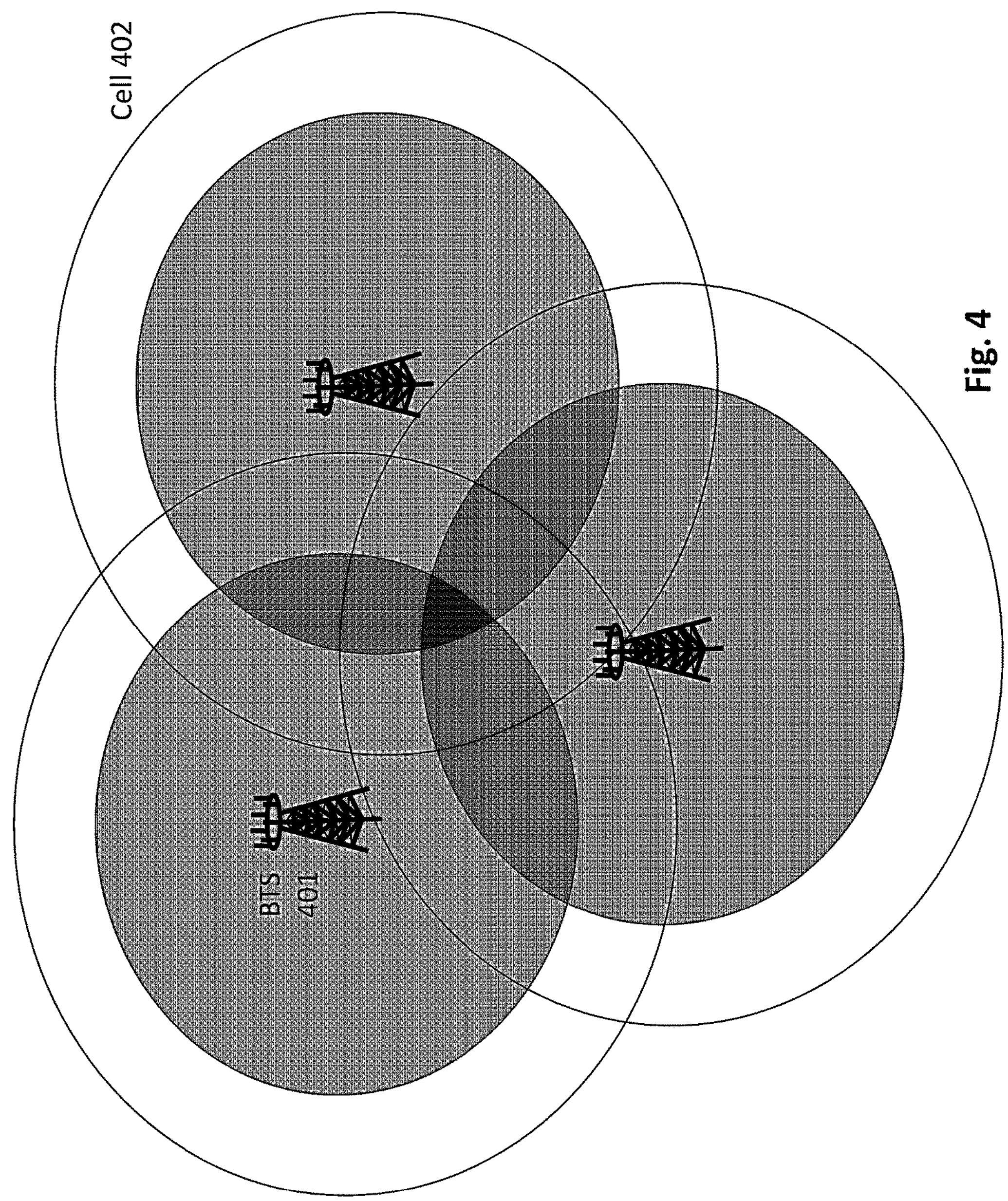
FIG. 4 illustrates multiple BTSs transmitting at higher power to increase the level of interference between cells.
Figure 5:
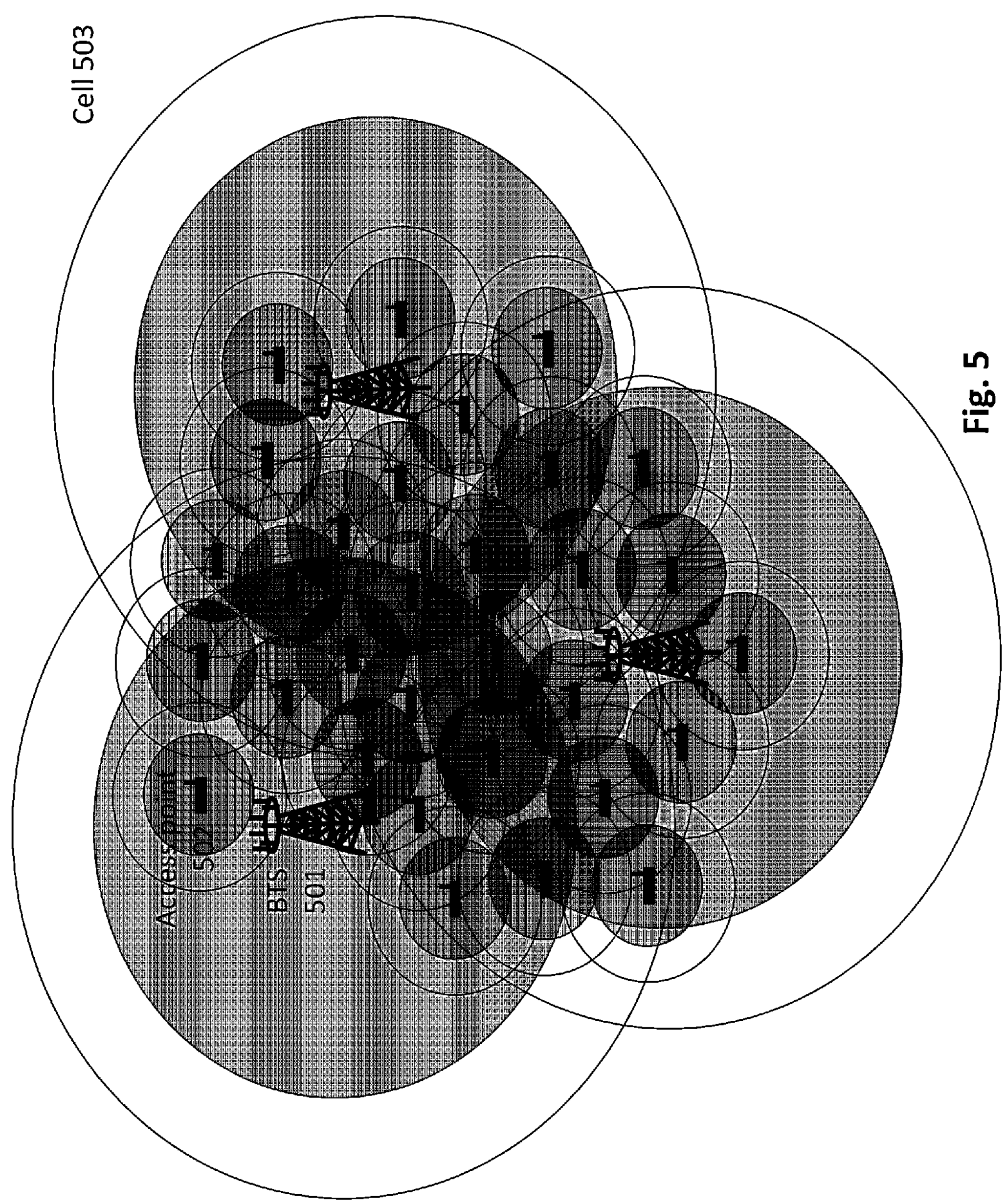
FIG. 5 illustrates one example where many access points are added to deliberately increase the level of incoherent interference throughout the cell.

In one embodiment, the wireless communications network is a cellular network as in FIGS. 1 and 3, such as a cellular network based on LTE standards and the multiple antennas serendipitously deployed are transceivers for macro-cells or small-cells. In another embodiment of the invention, the wireless communications network is not constrained to any particular cell layout and the cell boundaries can extend over larger areas as in FIGS. 4-5. For example, the wireless communications network could be a wireless local area network (WLAN) with multiple antennas being WiFi access points, or a mesh, ad-hoc or sensor network, or a distributed antenna system, or a DIDO system with access points placed serendipitously without any transmit power constraint. But, such example network structures should not be considered as limiting the general applicability of the present invention to wireless communications networks. The present invention applies to any wireless network where multiplexing gain is achieved by transmitting signals from multiple antennas that interfere where received by multiple UEs so as to create simultaneous non-interfering data streams to multiple UEs.

The MU-MAS consists of a centralized processor, a network and M transceiver stations (or distributed antennas) communicating wirelessly to N client devices or UEs. The centralized processor unit receives N streams of information with different network content (e.g., videos, web-pages, video games, text, voice, etc., streamed from Web servers or other network sources) intended for different client devices. Hereafter, we use the term "stream of information" to refer to any stream of data sent over the network containing information that can be demodulated or decoded as a standalone stream, according to certain modulation/coding scheme or protocol, to produce any data, including but not limited to audio, Web and video content. In one embodiment, the stream of information is a sequence of bits carrying network content that can be demodulated or decoded as a standalone stream.

The centralized processor utilizes precoding transformation to combine (according to algorithms, such as those described in the Related Patents and Applications) the N streams of information from the network content into M streams of bits. By way of example, but not limitation, the precoding transformation can be linear (e.g., zero-forcing [65], block-diagonalization [66-67], matrix inversion, etc.) or non-linear (e.g., dirty-paper coding [68-70] or Tomlinson-Harashima precoding [71-72], lattice techniques or trellis precoding [73-74], vector perturbation techniques [75-76]). Hereafter, we use the term "stream of bits" to refer to any sequence of bits that does not necessarily contain any useful bit of information and as such cannot be demodulated or decoded as a standalone stream to retrieve the network content. In one embodiment of the invention, the stream of bits is the complex baseband signal produced by the centralized processor and quantized over given number of bits to be sent to one of the M transceiver stations.

Precoding is computed at the centralized processor by employing the Channel State Information (CSI) and applied over the DL or UL channels to multiplex data streams to or from multiple users. In one embodiment of the invention, the centralized processor is aware of the CSI between the distributed antennas and the client devices, and utilizes the CSI to precode data sent over the DL or UL channels. In the same embodiment, the CSI is estimated at the client devices and fed back to the distributed antennas. In another embodiment, the DL-CSI is derived at the distributed antennas from the UL-CSI using radio frequency (RF) calibration and exploiting UL/DL channel reciprocity.

Figure 13:
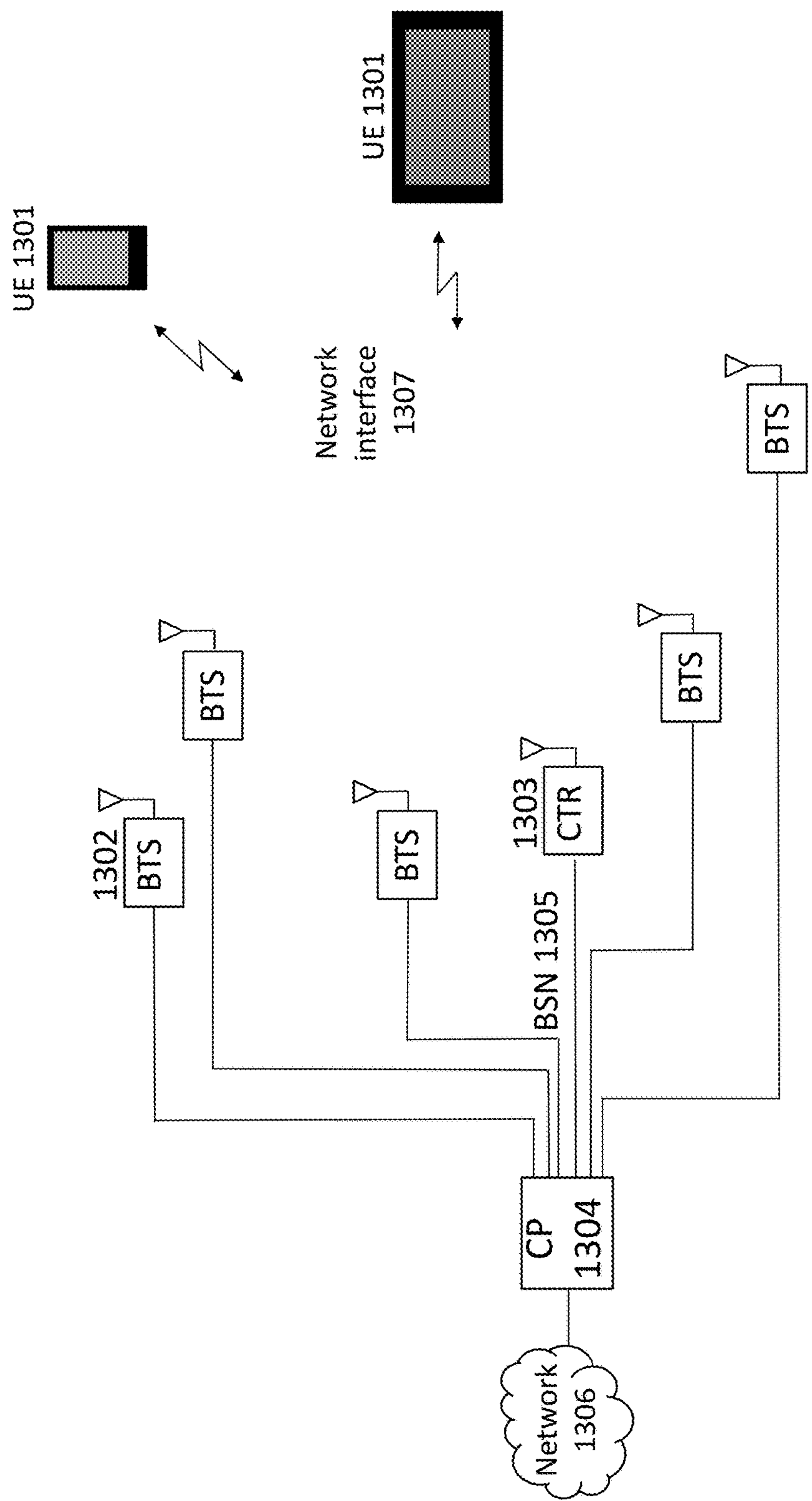
FIG. 13 illustrates one embodiment of a MU-MAS consisting of CP, distributed BTSs and multiple UEs.

In one embodiment, the MU-MAS is a distributed-input distributed-output (DIDO) system as described in Related Patents and Patent Applications. In another embodiment, the MU-MAS depicted in FIG. 13 consists of:

User Equipment (UE) 1301: An RF transceiver for fixed and/or mobile clients receiving data streams over the downlink (DL) channel from the backhaul and transmitting data to the backhaul via the uplink (UL) channel Base Transceiver Station (BTS) 1302: The BTSs interface the backhaul with the wireless channel. BTSs of one embodiment are access points consisting of Digital-to-Analog Converter (DAC)/Analog-to-Digital Converter (ADC) and radio frequency (RF) chain to convert the baseband signal to RF. In some cases, the BTS is a simple RF transceiver equipped with power amplifier/antenna and the RF signal is carried to the BTS via RF-over-fiber technology as described in Related Patents and Applications.

Controller (CTR) 1303: A CTR is one particular type of BTS designed for certain specialized features such as transmitting training signals for time/frequency synchronization of the BTSs and/or the UEs, receiving/transmitting control information from/to the UEs, receiving the channel state information (CSI) or channel quality information from the UEs. One or multiple CTR stations can be included in any MU-MAS system. When multiple CTRs are available, the information to or from those stations can be combined to increase diversity and improve link quality. In one embodiment, the CSI is received from multiple CTRs via maximum ratio combining (MRC) techniques to improve CSI demodulation. In another embodiment, the control information is sent from multiple CTRs via maximum ratio transmission (MRT) to improve SNR at the receiver side. The scope of the invention is not limited to MRC or MRT, and any other diversity technique (such as antenna selection, etc.) can be employed to improve wireless links between CTRs and UEs.

Centralized Processor (CP) 1304: The CP is a server interfacing the Internet or other types of external networks 1306 with the backhaul. In one embodiment, the CP computes the MU-MAS baseband processing and sends the waveforms to the distributed BTSs for DL transmission Base Station Network (BSN) 1305: The BSN is the network connecting the CP to the distributed BTSs carrying information for either the DL or the UL channel. The BSN is a wireline or a wireless network or a combination of the two. For example, the BSN is a DSL, cable, optical fiber network, or Line-of-Sight (LOS) or Non-Line-of-Sight (NLOS) wireless link. Furthermore, the BSN is a proprietary network, or a local area network, or the Internet.

Hereafter we describe how the above MU-MAS framework is incorporated into the LTE standard for cellular systems (and also non-cellular system utilizing LTE protocols) to achieve additional gains in spectral efficiency. We begin with a general overview of LTE framework and modulation techniques employed in the DL and UL channels. Then we provide a brief description of the physical layer frame structure and resource allocation in the LTE standard. Finally, we define MU-MAS precoding methods for downlink (DL) and uplink (UL) channels in multi-user scenarios using the LTE framework. For the DL schemes, we propose two solutions: open-loop and closed-loop DIDO schemes.

Figure 6:
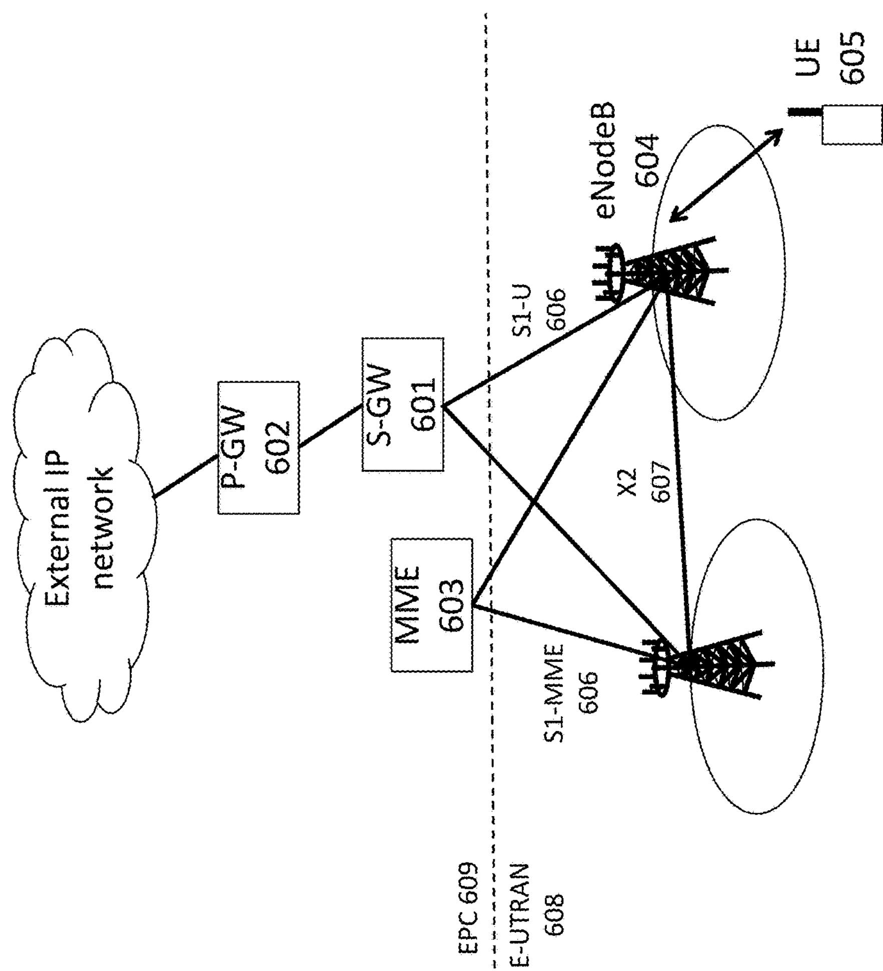
FIG. 6 illustrates the network elements in LTE networks.

LTE is designed with a flat network architecture (as opposed a hierarchical architecture from previous cellular standards) to provide: reduced latency, reduced packet losses via ARQ, reduced call setup time, improved coverage and throughput via macro-diversity. The network elements in LTE networks depicted in FIG. 6 are per [79]:

- GW (gateway): is the router connecting the LTE network to external networks (i.e., the Internet). The GW is split into serving gateway (S-GW) 601 that terminates the E-UTRAN interface 608 and PDN gateway (P-GW) 602 being the interface with external networks. The S-GW and P-GW are part of the so called evolved packet core (EPC) 609;
- MME (mobility management entity) 603: manages mobility, security parameters and UE identity. The MME is also part of the LTE EPC;
- eNodeB (enhanced Node-B) 604: is the base station handling radio resource management, user mobility and scheduling;
- UE (user equipment) 605: is the mobile station.
- S1 and X2 interfaces (606 and 607): are the wireline or wireless backhauls between the MME and eNodeBs (S1-MME), the S-GW and eNodeBs (S1-U) and between multiple eNodeBs (X2).

In one embodiment of the invention, the MU-MAS network is an LTE network wherein the UE is the LTE UE, the BTS is the LTE eNodeB, the CTR is the LTE eNodeB or MME, the CP is the LTE GW, the BSN is the S1 or X1 interface. Hereafter we use the terms distributed antennas, BTS and eNodeB interchangeably to refer to any base station in MU-MAS, DIDO or LTE systems.

Figure 7A:
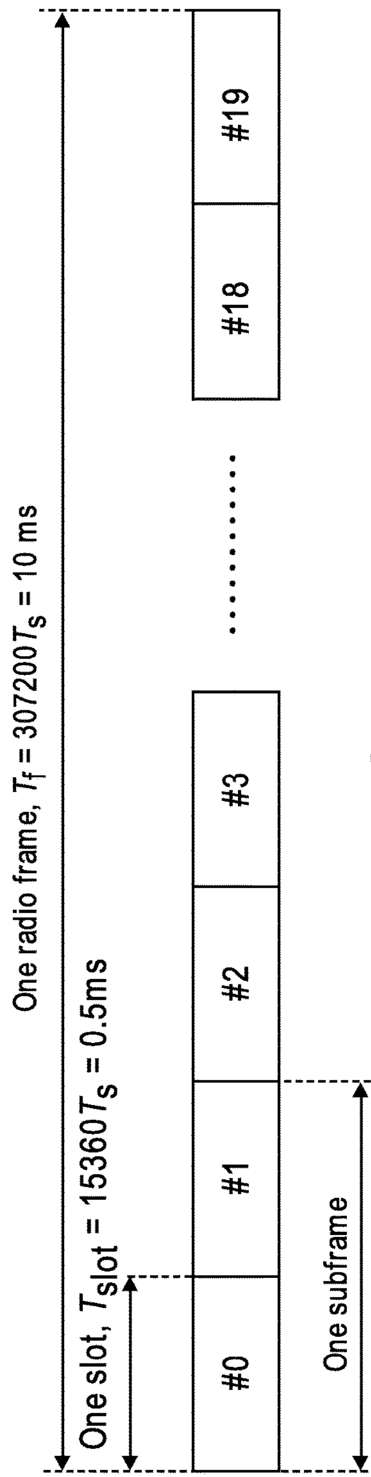
FIG. 7*a* illustrates the LTE frame structure for FDD operation.
Figure 7B:
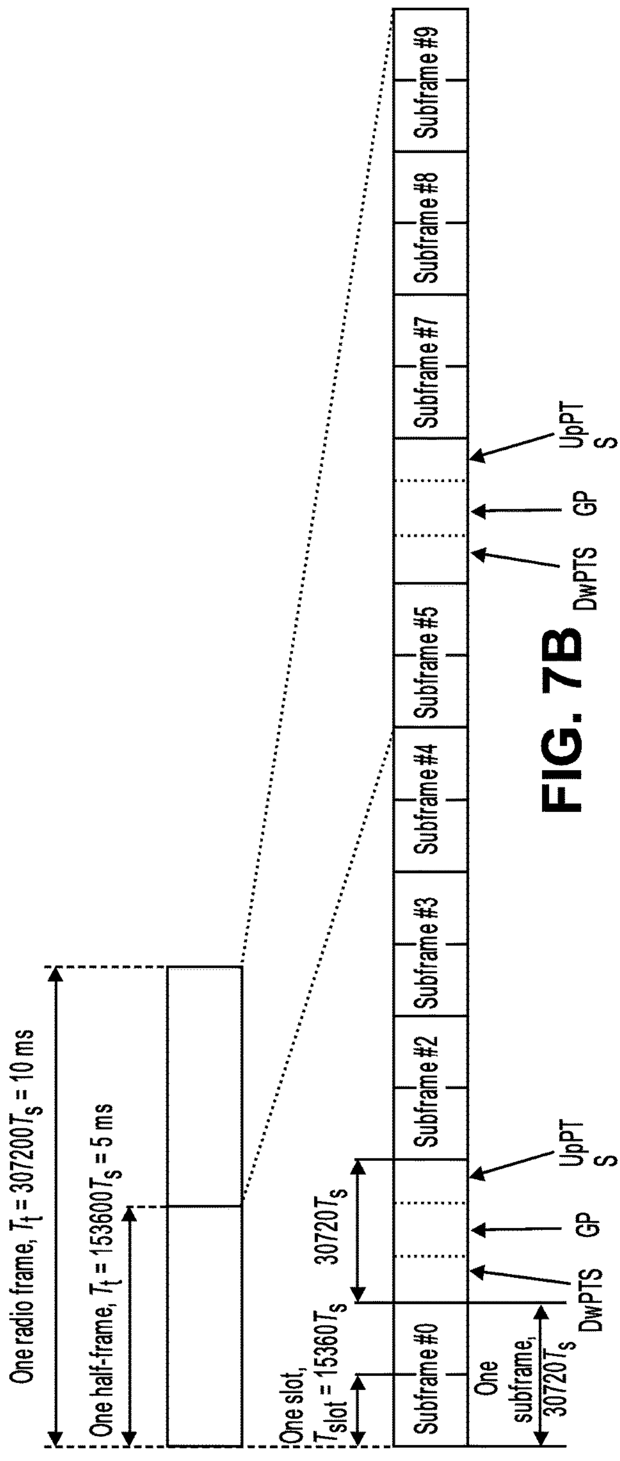
FIG. 7*b* illustrates the LTE frame structure for TDD operation.

The LTE frame has duration of 10 msec and consists of ten subframes as depicted in FIG. 7 [33,80]. Every subframe is divided in two slots of duration 0.5 msec each. The LTE standards defines two types of frames: i) type 1 for FDD operation as in FIG. 7*a*), where all subframes are assigned either for the DL or UL channels; ii) type 2 for TDD operation as in FIG. 7*b*), where, part of the subframes are assigned to the DL and part to the UL (depending on the selected configuration), whereas a few subframes are reserved for "special use". These is at least one special subframe per frame and it consists of three fields: i) downlink pilot time slot (DwPTS) reserved for DL transmission; ii) guard period (GP); iii) uplink pilot time slot (UpPTS), for UL transmission.

Figure 8A:
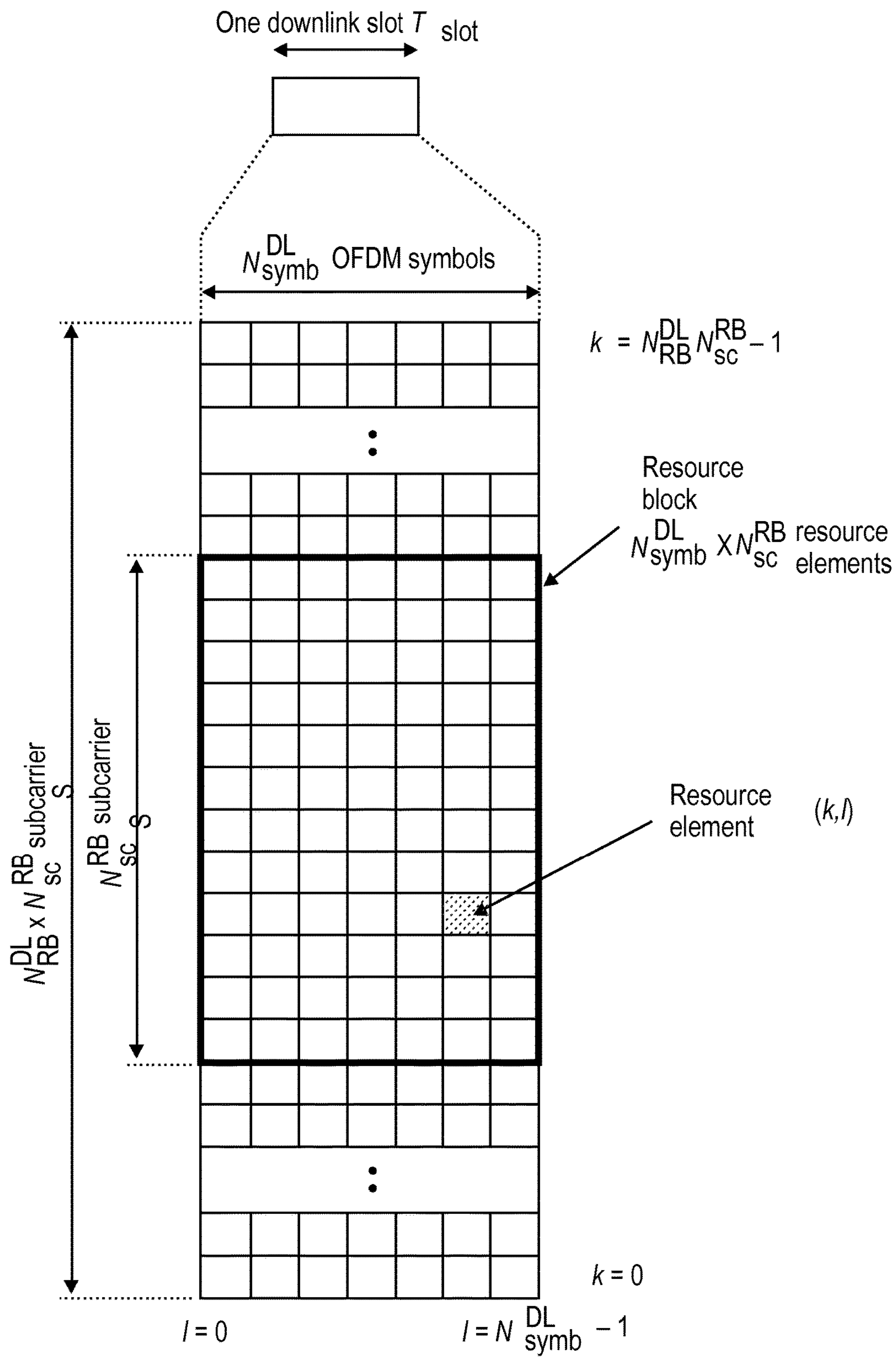
FIG. 8*a* illustrates the LTE "resource elements" and "resource blocks" in the OFDM DL channel.
Figure 8B:
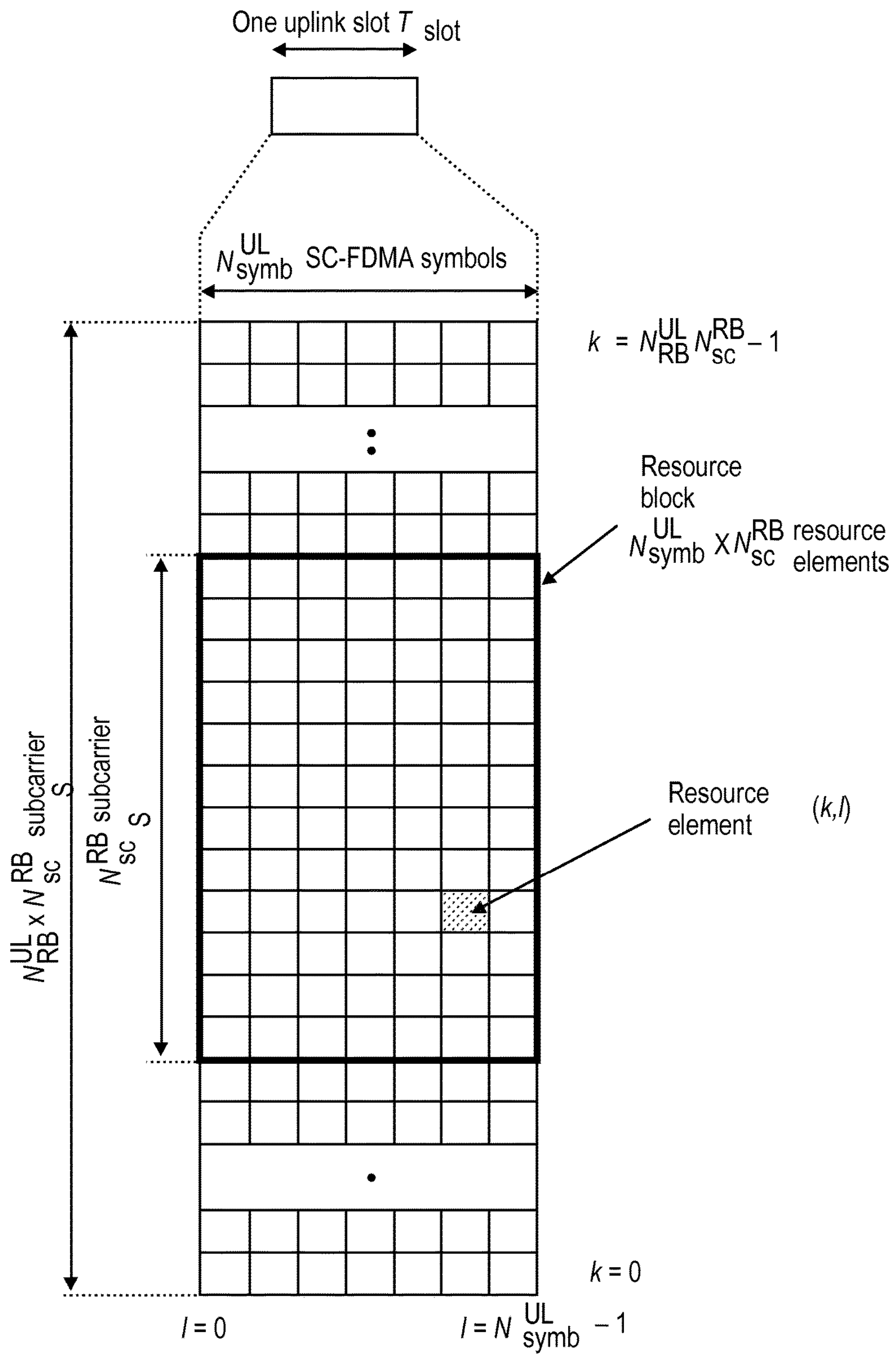
FIG. 8*b* illustrates the LTE "resource elements" and "resource blocks" in the SC-FDMA UL channel.

LTE employs orthogonal frequency division multiplexing (OFDM) and orthogonal frequency division multiple access (OFDMA) modulation for the DL and single-carrier frequency division multiple access (SC-FDMA) for the UL. The "resource element" (RE) is the smallest modulation structure in LTE and consists of one OFDM subcarrier in frequency and one OFDM symbol duration in time, as shown in FIG. 8*a* for the DL channel and in FIG. 8*b* for the UL channel. The "resource block" (RB) consists of 12 subcarriers in frequency and one 0.5 msec slot in time (consisting of 3 to 7 OFDM symbol periods, depending on DL versus UL channel and type of cyclic prefix). Resource blocks for every UE are assigned on a subframe basis. Since the MU-MAS in the present invention uses spatial processing to send multiple data streams to different UEs, at every subframe all resource blocks can be allocated to the same UE. In one embodiment, all or a subset of resource blocks are allocated to every UE and simultaneous non-interfering data streams are sent to the UEs via precoding.

To setup the link between the BTS and the UEs, the LTE standard defines the synchronization procedure. The BTS sends two consecutive signals to the UE: the primary synchronization signal (P-SS) sent over the primary synchronization channel (PSCH) and the secondary synchronization signal (S-SS) sent over the secondary synchronization channel (SSCH). Both signals are used by the UE for time/frequency synchronization as well as to retrieve the cell ID. The P-SS consists of length-63 Zadoff-Chu sequence from which the UE derives the physical layer ID (0 to 2). The S-SS is an interleaved concatenation of two length-31 binary sequences and is used to derive the cell ID group number (0 to 167). From the two identity numbers above, the UE derives the physical cell ID (PCI, defined from 0 to 503).

Figure 9:
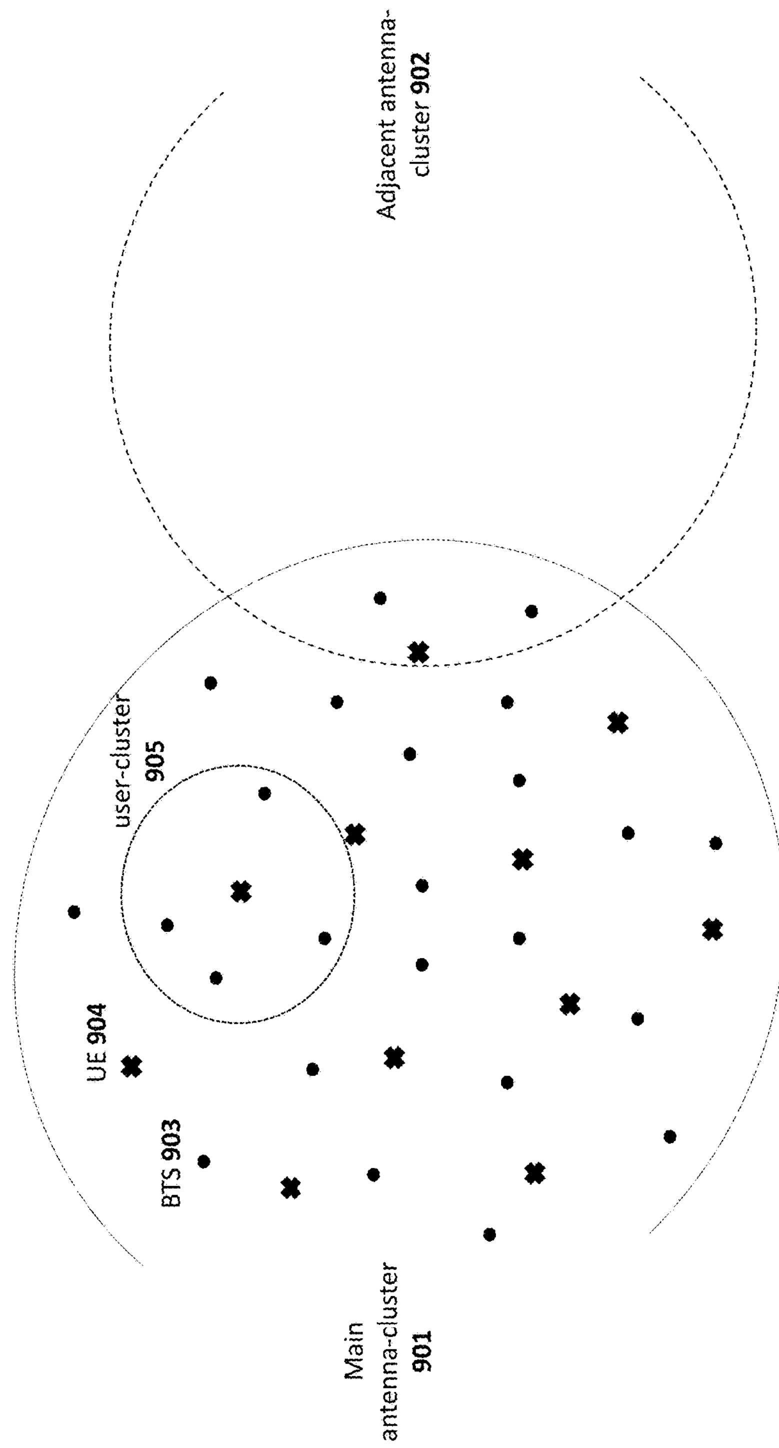
FIG. 9 illustrates one embodiment of a multi-user (MU) multiple antenna system (MAS), or MU-MAS, consisting of antenna-clusters and user-clusters.

In the MU-MAS system described in the present invention, there are no cell boundaries as the power transmitted from the BTSs is increased intentionally to produce interference that is exploited to create areas of coherence around the UEs. In the present invention, different BTSs are grouped into "antenna-clusters" or "DIDO-clusters" as defined in related U.S. Pat. No. 8,170,081, issued May 1, 2012, entitled "System And Method For Adjusting DIDO Interference Cancellation Based On Signal Strength Measurements". For example, FIG. 9 shows the main antenna-cluster 901 and one adjacent antenna-cluster 902. Every antenna-cluster consists of multiple BTSs 903.

The cell ID can be used in MU-MAS and DIDO systems to differentiate the antenna-clusters. In one embodiment of the invention, the same cell ID is transmitted from all BTSs of the same antenna-cluster via the P-SS and S-SS. In the same embodiment, different antenna-clusters employ different cell IDs. In another embodiment of the invention, all BTSs within the same antenna-cluster 1001 are grouped into "antenna-subclusters" 1003 depicted in FIG. 10 with different shaded colors and a different cell ID 1004 is associated to every antenna-subcluster. In one embodiment, the antenna-subclusters are defined statically according to predefined cluster planning or based on GPS positioning information. In another embodiment, the antenna-subclusters are defined dynamically based on measurements of relative signal strength between BTSs or GPS positioning information. In a different embodiment of the invention, a different cell ID is assigned to every area of coherence (described in related co-pending U.S. application Ser. No. 13/232,996, entitled "Systems and Methods to Exploit Areas of Coherence in Wireless Systems") associated to the UEs.

When all BTSs within the same antenna-cluster or antenna-subcluster transmit the LTE broadcast channels (e.g., P-SS and S-SS) to the UEs, destructive interference may degrade the performance of time or frequency synchronization enabled by the broadcast channel. Destructive interference may be caused by multipaths generated from spatially distributed BTSs that recombine incoherently at some UE locations. To avoid or mitigate this effect, in one embodiment of the invention, only one BTS out of all BTSs within the same antenna-cluster or antenna-subcluster transmits the LTE broadcast channels (e.g., P-SS and S-SS) to all UEs. In the same embodiment, the BTS that transmits the LTE broadcast channels is selected to maximize the power received at the UEs over the broadcast channels. In another embodiment, only a limited set of BTSs is selected to transmit simultaneously the LTE broadcast channels to all UEs, such that destructive interference is avoided at the UE. In a different embodiment of the invention, the LTE broadcast channels are sent at higher power than the payload to reach all the UEs within the same antenna-cluster or antenna-subcluster.

As described above, LTE-Advanced supports carrier aggregation (CA) schemes to increase data rate over the DL channel. In MU-MASs, CA can be used in combination with precoding to increase per-user data rate. In one embodiment of this invention, transmit precoding is applied to different portions of the RF spectrum (inter-band CA) or different bands within the same portion of the spectrum (intra-band CA) to increase per-user data rate. When employing inter-band CA, pathloss at different bands may change significantly as those bands are centered at different carrier frequencies. In conventional LTE cellular systems, frequency bands at lower carrier frequencies may experience lower pathloss than higher carrier frequencies. Hence, applying inter-band CA in cellular systems may cause undesired inter-cell interference at lower carrier frequencies. By contrast, the MU-MAS in the present invention is not limited by interference at the cell boundary as the BTSs are distributed and there is no concept of cell. This more flexible system layout allows different methods for inter-band CA in MU-MAS. In one embodiment of the present invention, the MU-MAS enables inter-band CA by employing one set of BTSs to operate at lower carrier frequencies and another set of BTSs to operate at higher carrier frequencies, such that the two sets intersect or one set is the subset of the other. In another embodiment, the MU-MAS with precoding employs CA methods in conjunction with frequency hopping patterns to improve robustness against frequency-selective fading or interference.

1. Downlink Closed-Loop MU-MAS Precoding Methods in LTE

MU-MAS closed-loop schemes can be used either in time-division duplex (TDD) or frequency division duplex (FDD) systems. In FDD systems, DL and UL channels operate at different frequencies and therefore the DL channel state information (CSI) must be estimated at the UE side and reported back to the CP through the BTSs or the CTRs via the UL channel. In TDD systems, DL and UL channels are set at the same frequency and the system may employ either closed-loop techniques or open-loop schemes exploiting channel reciprocity (as described in the following section). The main disadvantage of closed-loop schemes is they require feedback, resulting in larger overhead for control information over the UL.

The general mechanism for closed-loop schemes in MU-MASs is described as follows: i) the BTSs send signaling information to the UEs over the DL; ii) the UEs exploit that signaling information to estimate the DL CSI from all the "active BTSs"; iii) the UEs quantize the DL CSI or use codebooks to select the precoding weights to be used for the next transmission; iv) the UEs send the quantized CSI or the codebook index to the BTSs or CTRs via the UL channel; v) the BTSs or CTRs report the CSI information or codebook index to the CP that calculates the precoding weights for data transmission over the DL. The "active BTSs" are defined as the set of BTSs that are reached by given UE. For example, in related co-pending U.S. application Ser. No. 12/802,974, entitled "System And Method For Managing Inter-Cluster Handoff Of Clients Which Traverse Multiple DIDO Clusters" and related co-pending U.S. application Ser. No. 12/917,257, entitled "Systems And Methods To Coordinate Transmissions In Distributed Wireless Systems Via User Clustering" we defined the "user-cluster" 905 as the set of BTSs that are reached by given UE, as depicted in FIG. 9. The number of active BTSs are limited to a user-cluster so as to reduce the amount of CSI to be estimated from the BTSs to given UE, thereby reducing the feedback overhead over the UL and the complexity of the MU-MAS precoding calculation at the CP.

As described above, MU-MAS precoding employs either linear or non-linear methods. In the case of non-linear methods (e.g., dirty-paper coding or Tomlinson-Harashima precoding, lattice techniques or trellis precoding, vector perturbation techniques), successive interference cancellation is applied at the transmitter to avoid inter-user interference. In this case the precoding matrix is computed accounting for the CSI to all the UEs within the antenna-cluster. Alternatively, linear precoding methods (e.g., zero-forcing, block-diagonalization, matrix inversion, etc.) can be used on a user-cluster basis, since the precoding weights for every UE are computed independent on the other UEs. Depending on the number of UEs and eNodeBs inside the antenna-cluster and user-clusters, linear versus non-linear precoding methods offer different computational performance. For example, if the MU-MAS consists of K UEs per antenna-cluster, M eNodeBs per antenna-cluster and C eNodeBs per user-cluster, the complexity of linear precoding is $O(K*C^3)$ whereas for non-linear precoding it is $O(M*K^2)$. It is thus desirable to develop a method that dynamically switches between the two types of precoding techniques based on the number if UEs and eNodeBs in MU-MASs to reduce the computational complexity at the CP. In one embodiment of the invention, the MU-MAS employs linear precoding methods. In another embodiment, the MU-MAS employs non-linear precoding methods. In the same embodiment of the invention, the MU-MAS dynamically switches between linear and non-linear precoding methods based on the number of UEs and eNodeBs in the antenna-clusters and user-clusters to reduce computational complexity at the CP. In a different embodiment, the MU-MAS switches between precoding multiplexing methods for UEs experiencing good channel quality (e.g., in the proximity of eNodeBs) and beamforming or diversity methods for UEs with poor link quality (e.g., far away from the eNodeBs).

1.1 Downlink MU-MAS Signaling Methods within the LTE Standard

The LTE standard defines two types of reference signals (RS) that can be used for DL signaling in closed-loop schemes [33,50,82-83]: i) cell-specific reference signal (CRS); ii) UE specific RS such as channel state information (CSI) reference signal (CSI-RS) and demodulation RS (DM-RS). The cell-specific RS is not precoded, whereas the UE-specific RS is precoded [50]. CRS is used in LTE Release 8 that employs SU/MU-MIMO codebook-based techniques with up to four antennas in every cell. LTE-Advanced Release 10 supports non-codebook based SU/MU-MIMO schemes with up to eight transmit antennas as well as CoMP schemes with antennas distributed over different cells. As such, Release 10 allows for more flexible signaling schemes via CSI-RS. In the present invention, we describe how either types of signaling schemes can be used in MU-MAS systems to enable precoding.

1.1.1 MU-MAS Signaling Using CRS

The CRS is employed in LTE (Release 8) systems to estimate the CSI from all transmit antennas at the BTS to the UE [80,84]. The CRS is obtained as the product of a two-dimensional orthogonal sequence and a two-dimensional pseudo-random numerical (PRN) sequence. There are 3 orthogonal sequences (i.e., placed on orthogonal sets of OFDM subcarriers) and 168 possible PRN sequences, for a total of 504 different CRS sequences. Every sequence uniquely identifies one cell. Each of the three orthogonal CRSs is associated to one of the three physical layer IDs (0 to 2) that generate a different cell ID, as explained in the previous subsection. The CRS is transmitted within the first and third-last OFDM symbol of every slot, and every sixth subcarrier. Orthogonal patterns in time and frequency are designed for every transmit antenna of the BTS, for the UE to uniquely estimate the CSI from each of transmit antennas. Release 8 defines up to four orthogonal patters per CRS, one for each of the four transmit antennas employed in MIMO 4×4. This high density of CRS in time and frequency (i.e., sent every slot of 0.5 msec, and every sixth subcarrier), producing 5% overhead, was designed intentionally to support scenarios with fast channel variations over time and frequency [83].

In Release 8, since there are up to 3 orthogonal CRSs with 4 orthogonal patterns each for multi-antenna modes (or 6 orthogonal CRSs for single antenna mode), it is possible to discriminate up to 12 transmit antennas within the same coverage area, without causing interference to the CRS. In one embodiment of the invention, the antenna-cluster 1001 is divided into three antenna-subclusters 1005 as in FIG. 10. Different physical layer IDs (or cell IDs) are associated to each of the antenna-subclusters, such that each antenna-subcluster is assigned with one of the three orthogonal CRSs with four orthogonal patterns (i.e., each antenna-subcluster can support up to four BTS without causing interference to the CRS from other BTSs). In this embodiment, every cluster can support up to 12 BTSs without causing interference to the CRS.

Figure 11:
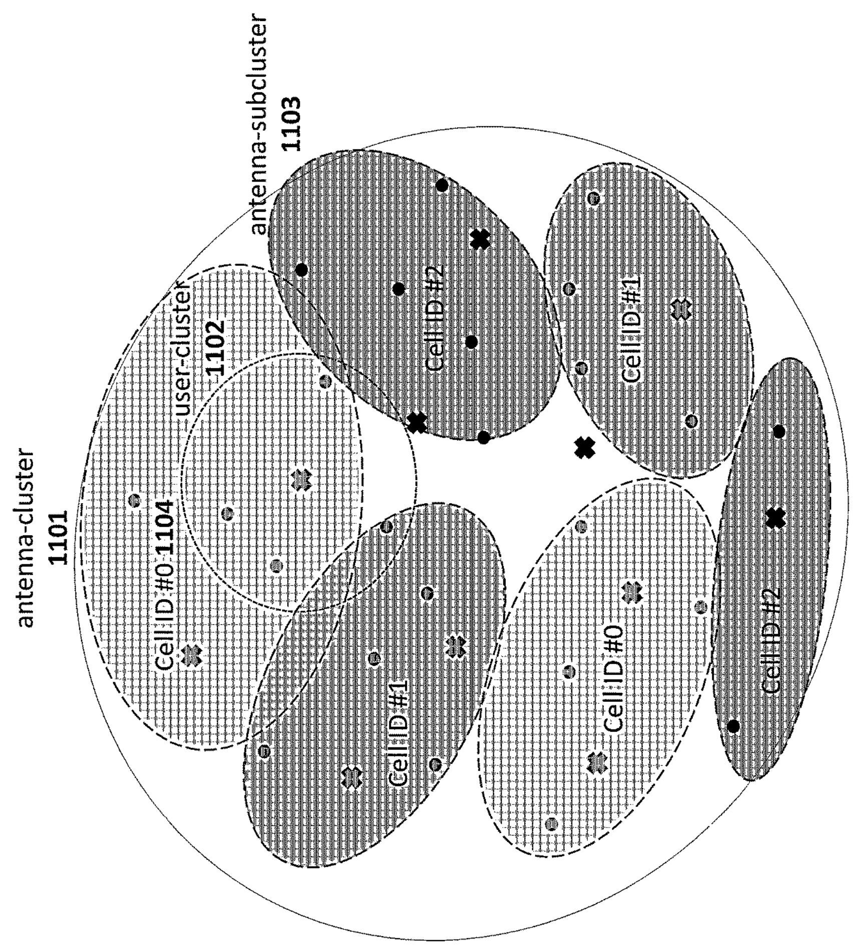
FIG. 11 illustrates one embodiment of a MU-MAS wherein the same set of cell IDs are assigned to the antenna-subclusters with given repetition pattern.

In scenarios where more than twelve BTSs are placed within the same cluster, it is desirable to increase the number of available orthogonal CRSs to support larger number of active BTSs (i.e., BTSs that simultaneously transmit precoded signals to the UEs). One way to achieve that is to define more than three antenna-subclusters 1003 per antenna-cluster 1101 and assign the same three physical layer IDs (or cell ID 1104 from 0 to 2) to the antenna-subclusters 1103 with a repetition pattern as shown in FIG. 11. We observe that the antenna-subclusters may come in different shapes and are defined in such a way that every user-cluster 1102 cannot reach two antenna-subclusters with the same physical layer ID, thereby avoiding interference to the CRS. For example, one way to achieve that is to define the area of the antenna-subcluster 1103 larger than the user-cluster 1102 and avoid that adjacent antenna-subcluster use the same physical layer ID. In one embodiment of the invention, the multiple antenna-subclusters are placed within the same antenna-cluster with repetition patterns such that their respective CRSs do not interfere, thereby enabling simultaneous non-interfering transmissions from more than twelve BTSs.

Figure 12:
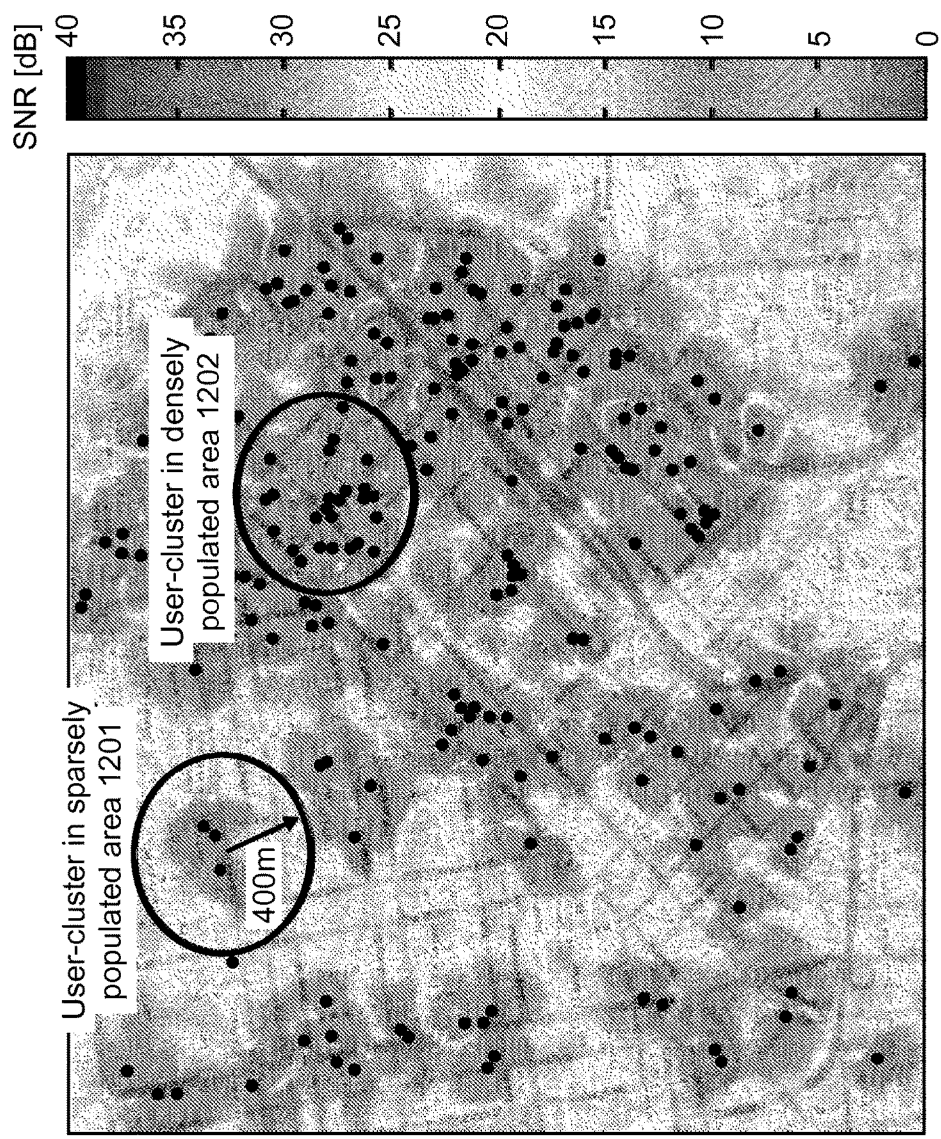
FIG. 12 illustrates the SNR distribution for practical deployment of MU-MAS systems in downtown San Francisco, Calif., with sparsely and densely populated areas.

In practical MU-MAS systems, it may be the case that every UE sees more than only four BTSs within its user-cluster. For example, FIG. 12 shows the SNR distribution for practical deployment of DIDO or MU-MAS systems in downtown San Francisco, Calif. The propagation model is based on 3GPP pathloss/shadowing model [81] and assumes a carrier frequency of 900 MHz. The dots in the map indicate the location of the DIDO-BTSs, whereas the dark circle represents the user-cluster (with the UE being located at the center of the circle). In sparsely populated areas 1201, the UE sees only a few BTSs within its user-cluster (e.g., as low as three BTSs for the example in FIG. 12), whereas in densely populated areas 1202 each user-cluster may comprise as many as 26 BTSs as in FIG. 12.

The high redundancy of the CRS can be exploited in MU-MASs to enable CSI estimation from any number of transmit antennas greater than four. For example, if the channel is fixed-wireless or characterized by low Doppler effects, there is no need to compute the CSI from all four transmit antennas every 0.5 msec (slot duration). Likewise, if the channel is frequency-flat, estimating the CSI every sixth subcarrier is redundant. In that case, the resource elements (RE) occupied by the redundant CRS can be re-allocated for other transmit antennas or BTSs in the MU-MAS. In one embodiment of the invention, the system allocates resource elements of redundant CRS to extra antennas or BTSs in the MU-MAS system. In another embodiment, the system estimates time and frequency selectivity of the channel and dynamically allocates the CRS for different BTSs or only the BTSs within the user-cluster to different resource elements.

The number of BTSs included in every user-cluster depends on the signal power level measured at the UE from all BTSs in the user-cluster relative to the noise power level, or signal-to-noise ratio (SNR). In one embodiment, the UE estimates the SNR from all BTSs in its neighborhood and selects the BTSs that belong to its user-cluster based on the SNR information. In another embodiment, the CP is aware of the SNR from the BTSs to every UE (based on feedback information from the UEs or information obtained from the UL channel, assuming UL/DL channel reciprocity) and selects the set of BTSs to be included in every user-cluster.

The number of BTSs included in every user-cluster determines the performance of the MU-MAS methods described in the present invention. For example, if the number of BTSs per user-cluster is low, the UE experiences higher level of out-of-cluster interference, resulting in high signal-to-interference-plus-noise ratio (SINR) and low data rate. Similarly, if large number of BTSs is selected for every user-cluster, the SNR measured at the UE from the BTSs at the edge of the user-cluster is low and may be dominated by the out-of-cluster interference from adjacent BTSs outside the user-cluster. There is an optimal number of BTSs per user-cluster that produces the highest SINR and data rate. In one embodiment of the invention, the CP selects the optimal number of BTSs per user-cluster to maximize SINR and data rate to the UE. In another embodiment of the invention, the BTSs per user-cluster are dynamically selected to adapt to the changing conditions of the propagation environment or UE mobility.

Another drawback of using large number of BTSs per user-cluster is high computational load. In fact, the more BTSs in the user-cluster the larger the computation complexity of the MU-MAS precoder. In one embodiment of the inventions, the BTSs per user-cluster are selected to achieve optimal tradeoff between SINR or data rate performance and computational complexity of the MU-MAS precoder. In another embodiment, the BTSs per user-cluster are dynamically selected based on tradeoffs between propagation conditions and computational resources available in the MU-MAS.

1.1.2 MU-MAS Signaling Using CSI-RS and DM-RS

In the LTE-Advanced (Release 10) standard the CSI-RS is used by every UE to estimate the CSI from the BTSs [33,83]. The standard defines orthogonal CSI-RS for different transmitters at the BTS, so that the UE can differentiate the CSI from different BTSs. Up to eight transmit antennas at the BTS are supported by the CSI-RS as in Tables 6.10.5.2-1,2 in [33]. The CSI-RS is sent with a periodicity that ranges between 5 and 80 subframes (i.e., CSI-RS send every 5 to 80 msec) as in Tables 6.10.5.3-1 in [33]. The periodicity of the CSI-RS in LTE-Advanced was designed intentionally larger than the CRS in LTE to avoid excessive overhead of control information, particularly for legacy LTE terminals unable to make use of these extra resources. Another reference signal used for CSI estimation is to demodulation RS (DM-RS). The DM-RS is a demodulation reference signal intended to a specific UE and transmitted only in the resource block assigned for transmission to that UE.

When more than eight antennas (maximum number of transmitters supported by the LTE-Advanced standard) are within the user-cluster, alternative techniques must be employed to enable DIDO precoding while maintaining system compliance to the LTE-Advanced standard. In one embodiment of the invention, every UE uses the CSI-RS or the DM-RS or combination of both to estimate the CSI from all active BTSs in its own user-cluster. In the same embodiment, the DIDO system detects the number of BTSs within the user-cluster and whether or not the user-cluster is compliant to the LTE-Advanced standard (supporting at most eight antennas). If it not compliant, the DIDO system employs alternative techniques to enable DL signaling from the BTSs to the current UE. In one embodiment, the transmit power from the BTSs is reduced until at most eight BTSs are reachable by the UE within its user-cluster. This solution, however, may result in reduction of data rate as coverage would be reduced.

Another solution is to divide the BTSs in the user-cluster in subsets and send one set of CSI-RS for every subset at a time. For example, if the CSI-RS periodicity is 5 subframes (i.e., 5 msec) as in Table 6.10.5.3-1 in [33], every 5 msec the CSI-RS is sent from a new subset of BTSs. Note that this solution works as long as the CSI-RS periodicity is short enough to cover all BTS subsets within the channel coherence time of the UE (which is a function of the Doppler velocity of the UE). For example, if the selected CSI-RS periodicity is 5 msec and the channel coherence time is 100 msec, it is possible to define up to 20 BTS subsets of 8 BTS each, adding up to a total of 160 BTSs within the user-cluster. In another embodiment of the invention, the DIDO system estimates the channel coherence time of the UE and decides how many BTSs can be supported within the user-cluster for given CSI-RS periodicity, to avoid degradation due to channel variations and Doppler effect.

The solutions for CSI-RS proposed so far are all compliant with the LTE standard and can be deployed within the framework of conventional LTE systems. For example, the proposed method that allows more than eight antennas per user-cluster would not require modifications of the UE LTE hardware and software implementation, and only slight modification of the protocols used at the BTSs and CP to enable selection of BTSs subset at any given time. These modifications can be easily implemented in a cloud-based software defined radio (SDR) platform, which is one promising deployment paradigm for DIDO and MU-MAS systems. Alternatively, if it is possible to relax the constraints of the LTE standard and develop slightly modified hardware and software for LTE UEs to support similar, but non-LTE-compliant DIDO or MU-MAS modes of operation, so as enable UEs to be able to operate in full LTE-compliant mode, or in a modified mode that supports non-LTE-compliant DIDO or MU-MAS operation. For example, this would enable another solution is to increase the amount of CSI-RS to enable higher number of BTSs in the system. In another embodiment of the invention, different CSI-RS patterns and periodicities are allowed as a means to increase the number of supported BTSs per user-cluster. Such slight modifications to the LTE standard may be small enough that existing LTE UE chipsets can be used with simply software modification. Or, if hardware modification would be needed to the chipsets, the changes would be small.

1.2 Uplink MU-MAS CSI Feedback Methods within the LTE Standard

In the LTE and LTE-Advanced standards, the UE feedbacks information to the BTS to communicate its current channel conditions as well as the precoding weights for closed-loop transmission over the DL channel. Three different channel indicators are included in those standards [35]:

Rank indicator (RI): indicates how many spatial streams are transmitted to given UE. This number is always equal or less than the number of transmit antennas.

Precoding matrix indicator (PMI): is the index of the codebook used for precoding over the DL channel.

Channel quality indicator (CQI): defines the modulation and forward error correction (FEC) coding scheme to be used over the DL to maintain predefined error rate performance for given channel conditions Only one RI is reported for the whole bandwidth, whereas the PMI and CQI reporting can be wideband or per sub-band, depending on the frequency-selectivity of the channel. These indicators are transmitted in the UL over two different types of physical channels: i) the physical uplink control channel (PUCCH), used only for control information; ii) the physical uplink shared channel (PUSCH), used for both data and control information, allocated over one resource block (RB) and on a subframe basis. On the PUCCH, the procedure to report the RI, PMI and CQI is periodic and the indicators can be either wideband (for frequency-flat channels) or UE-selected on a sub-band basis (for frequency-selective channels). On the PUSCH, the feedback procedure is aperiodic and can be UE-selected on a sub-band basis (for frequency-selective channels) or higher-layer configured sub-band (e.g., for transmission mode 9 in LTE-Advance with eight transmitters).

In one embodiment of the invention, the DIDO or MU-MAS system employs RI, PMI and CQI to report to BTSs and CP its current channel conditions as well as precoding information. In one embodiment, the UE uses the PUCCH channel to report those indicators to the CP. In another embodiment, in case a larger number of indicators is necessary for DIDO precoding, the UE employs the PUSCH to report additional indicators to the CP. In case the channel is frequency-flat, the UE can exploit extra UL resources to report the PMI for a larger number of antennas in the DIDO systems. In one embodiment of the invention, the UE or BTSs or CP estimate the channel frequency selectivity and, in case the channel is frequency-flat, the UE exploits the extra UL resources to report the PMI for larger number of BTSs.

2. Downlink Open-Loop MU-MAS Precoding Methods in LTE

Open-loop MU-MAS precoding schemes can only be used in time-division duplex (TDD) systems employing RF calibration and exploiting channel reciprocity. The general mechanism of open-loop schemes in MU-MASs consists of: i) the UEs send signaling information to the BTSs or CTRs over the UL; ii) the BTSs or CTRs exploit that signaling information to estimate the UL CSI from all UEs; iii) the BTSs or CTRs employ RF calibration to convert the UL CSI into DL CSI; iv) the BTSs or CTRs send the DL CSI or codebook index to the CP via the BSN; v) based on that DL CSI, the CP calculates the precoding weights for data transmission over the DL. Similarly to closed-loop MU-MAS precoding schemes, user-clusters can be employed to reduce the amount of CSI to be estimated at the BTSs from the UEs, thereby reducing the computational burden at the BTSs as well as the amount of signaling required over the UL. In one embodiment of the invention, open-loop precoding techniques are employed to send simultaneous non-interfering data streams from the BTSs to the UEs over the DL channel.

In LTE there are two types of reference signal for the uplink channel [31,33,87]: i) sounding reference signal (SRS), used for scheduling and link adaptation; ii) demodulation reference signal (DMRS), used for data reception. In one embodiment of the invention, the DMRS is employed in open-loop precoding systems to estimate the UL channels form all UEs to all BTSs. In the time domain, the DMRS is sent at the fourth OFDM symbol (when a normal cyclic prefix is used) of every LTE slot (of duration 0.5 msec). In the frequency domain, the DMRS sent over the PUSCH is mapped for every UE to the same resource block (RB) used by that UE for UL data transmission.

The length of the DMRS is $M^{RS}=mN^{RB}$, where m is the number of RBs and $N^{RB}=12$ is the number of subcarriers per RB. To support multiple UEs, up to twelve DMRSs are generated from one base Zadoff-Chu [88] or computer-generated constant amplitude zero autocorrelation (CG-CAZAC) sequence, via twelve possible cyclic shifts of the base sequence. Base sequences are divided into 30 groups and neighbor LTE cells select DMRS from different groups to reduce inter-cell interference. For example, if the maximum number of resource blocks within one OFDM symbol is 110 (i.e., assuming 20 MHz overall signal bandwidth), it is possible to generate up to 110×30=3300 different sequences. We observe that the 30 base sequences are not guaranteed to be orthogonal and are designed to reduce interference across cells, without eliminating it completely. By contrast, the 12 cyclic shifts of the same base sequence are orthogonal, thereby allowing up to 12 UEs to transmit in the UL over the same RB without interference. The value of cyclic shift to be used by every UE is provided by the BTS through the downlink control information (DCI) message sent over the PDCCH. The DCI in Release 8 consists of 3 bits, that enables the UE to use only up to 8 values of cyclic shift in the pool of twelve possible options.

The cyclic shifts of the base DMRS sequence are exploited in the present invention to enable MU-MIMO schemes over the UL channel as well as to estimate the CSI from multiple UEs for DL precoding when channel reciprocity is exploited in TDD mode. In one embodiment of the invention, open-loop precoding methods are employed to send simultaneous non-interfering data streams from the distributed BTSs to the UEs over the DL channel. In a different embodiment of the invention, open-loop MU-MIMO methods are employed to receive simultaneous non-interfering data streams from the UEs to the BTSs over the UL channel. The same CSI estimated over the UL from all active UEs can be used to compute the receiver spatial filter for MU-MIMO operation in the UL as well as the weights for DL precoding. Since Release 8 defines only up to 8 orthogonal DMRSs (due to limited DCI bits, as explained above), MU-MIMO schemes for the UL channel and MU-MAS precoding schemes for the DL channel can support at most eight UEs, assuming all UEs utilize the full UL bandwidth.

One way to increase the number of simultaneous UEs being served through MU-MIMO in UL or MU-MAS precoding in DL is to multiplex the DMRS of the UEs over the frequency domain. For example, if 10 MHz bandwidth is used in TDD mode, there are 50 RBs that can be allocated to the UEs. In this case, 25 interleaved RBs can be assigned to one set of eight UEs and the remaining 25 interleaved RBs to another set of UEs, totaling to 16 UEs that can be served simultaneously. Then, the CSI is computed by interpolating the estimates from the DMRS sent over interleaved RBs. Larger number of simultaneous UEs can be supported by increasing the number of interleaving patterns of the UL RBs. These patterns can be assigned to different UEs statically or dynamically according to certain frequency hopping sequence. In one embodiment of the invention, DMRSs are assigned to the UEs over orthogonal interleaved RBs to increase the number of UEs to be supported via MU-MIMO or MU-MAS precoding. In the same embodiment, the interleaved RBs are assigned statically. In another embodiment, the interleaved RBs are assigned dynamically according to certain frequency hopping pattern.

An alternative solution is to multiplex the DMRS of different UEs in the time domain. For example, the UEs are divided into different groups and the DMRSs for those groups are sent over consecutive time slots (of duration 0.5 msec each). In this case, however, it is necessary to guarantee that the periodicity of the DMRS assignment for different groups is lower than the channel coherence time of the fastest moving UE. In fact, this is necessary condition to guarantee that the channel does not vary for all UEs from the time the CSI is estimated via DMRS to the time system transmits DL data streams to the UEs via DIDO precoding. In one embodiment of the invention, the system divides the active UEs into groups and assigns the same set of DMRS to each group over consecutive time slots. In the same embodiment, the system estimates the shortest channel coherence time for all active UEs and calculates the maximum number of UE groups as well as the periodicity of the DMRS time multiplexing based on that information.

Another solution is to spatially separate different groups of UEs employing the same sets of DMRSs. For example, the same set of orthogonal DMRSs can be used for all the UEs from different antenna-subclusters in FIG. 11 identified by the same cell ID. In one embodiment of the invention, groups of UEs employing the same set of orthogonal DMRSs are spatially separated to avoid interference between the groups. In the same embodiment, the same set of orthogonal DMRSs is employed by different antenna-subclusters identified by the same cell ID. The MU-MAS may assign the UEs to "virtual cells" to maximize the number of DMRS that can be used in the UL. In one exemplary embodiment, the virtual cell is the area of coherence (described in related co-pending U.S. application Ser. No. 13/232,996, entitled "Systems and Methods to Exploit Areas of Coherence in Wireless Systems") around the UE and the DIDO system generates up to 3300 areas of coherence for different UEs. In another embodiment of the invention, each of the 30 base sequences is assigned to a different antenna-cluster (clusters are defined in related U.S. Pat. No. 8,170,081, issued May 1, 2012, entitled "System And Method For Adjusting DIDO Interference Cancellation Based On Signal Strength Measurements") to reduce inter-cluster interference across adjacent antenna-clusters.

3. Uplink MU-MAS Methods in LTE

The present invention employs open-loop MU-MIMO schemes over the UL channel to receive simultaneous UL data streams from all UEs to the BTSs. The UL open-loop MU-MIMO scheme consists of the following steps: i) UEs send signaling information and data payload to all BTSs; ii) the BTSs compute the channel estimations from all UEs using the signaling information; iii) the BTSs send the channel estimates and data payloads to the CP; iv) the CP uses the channel estimates to remove inter-channel interference from all UEs' data payloads via spatial filtering and demodulates the data streams form all UEs. In one embodiment, the open-loop MU-MIMO system employs single-carrier frequency division multiple access (SC-FDMA) to increase the number of UL channels from the UEs to the BTSs and multiplex them in the frequency domain.

In one embodiment, synchronization among UEs is achieved via signaling from the DL and all BTSs are assumed locked to the same time/frequency reference clock, either via direct wiring to the same clock or sharing a common time/frequency reference, in one embodiment through GPSDO. Variations in channel delay spread at different UEs may generate jitter among the time references of different UEs that may affect the performance of MU-MIMO methods over the UL. In one embodiment, only the UEs within the same antenna-cluster (e.g., UEs in close proximity with one another) are processed with MU-MIMO methods to reduce the relative propagation delay spread across different UEs. In another embodiment, the relative propagation delays between UEs are compensated at the UEs or at the BTSs to guarantee simultaneous reception of data payloads from different UEs at the BTSs.

The methods for enabling signaling information for data demodulation over the UL are the same methods used for signaling in the downlink open-loop DIDO scheme described at the previous section. The CP employs different spatial processing techniques to remove inter-channel interference from the UEs data payload. In one embodiment of the invention, the CP employs non-linear spatial processing methods such as maximum likelihood (ML), decision feedback equalization (DFE) or successive interference cancellation (SIC) receivers. In another embodiment the CP employs linear filters such as zeros-forcing (ZF) or minimum mean squared error (MMSE) receivers to cancel co-channel interference and demodulate the uplink data streams individually.

4. Integration with Existing LTE Networks

In the United States and other regions of the world, LTE networks are already in operation or are in the process of being deployed and/or committed to be deployed. It would be of significant benefit to LTE operators if they could gradually deploy DIDO or MU-MAS capability into their existing or already-committed deployments. In this way, they could deploy DIDO or MU-MAS in areas where it would provide the most immediate benefit, and gradually expand the DIDO or MU-MAS capability to cover more their network. In time, once they have sufficient DIDO or MU-MAS coverage in an area, they can choose to cease using cells entirely, and instead switch entirely to DIDO or MU-MAS and achieve much higher spectral density at much lower cost. Throughout this entire transition from cellular to DIDO or MU-MAS, the LTE operator's wireless customers will never see a loss in service. Rather, they'll simply see their data throughput and reliability improve, while the operator will see its costs decline.

There are several embodiments that would enable a gradual integration of DIDO or MU-MAS into existing LTE networks. In all cases, the BTSs for DIDO or MU-MAS will be referred as DIDO-LTE BTSs and will utilize one of the LTE-compatible DIDO or MU-MAS embodiments described above, or other LTE-compatible embodiments as they may be developed in the future. Or, the DIDO-LTE BTSs will utilize a slight variant of the LTE standard, such as those described above and the UEs will either be updated (e.g. if a software update is sufficient to modify the UE to be DIDO or MU-MAS compatible), or a new generation of UEs that are DIDO- or MU-MAS-compatible will be deployed. In either case, the new BTSs that support DIDO or MU-MAS either within the constraints of the LTE standard, or as a variant of the LTE standard will be referred to below as DIDO-LTE BTSs.

The LTE standard supports various channel bandwidths (e.g., 1.4, 3, 5, 10, 15 and 20 MHz). In one embodiment, an operator with an existing LTE network would either allocate new bandwidth for the LTE-DIDO BTSs, or would subdivide the existing LTE spectrum (e.g. 20 MHz could be subdivided into two 10 MHz blocks) to support conventional LTE BTSs in a cellular configuration in one block of spectrum and DIDO LTE BTSs in another block of spectrum. Effectively, this would establish two separate LTE networks, and UE devices would be configured to use one or the other network, or select between the two. In the case of subdivided spectrum, the spectrum could be divided evenly between the conventional LTE network and the DIDO-LTE BTS network, or unevenly, allocated more spectrum to whichever network could best utilize it given the level of cellular LTE BTS and DIDO-LTE BTS deployment and/or UE usage patterns. This subdivision could change as needed over time, and at some point, when there are sufficient DIDO-LTE BTSs deployed to provide the same or better coverage as the cellular BTSs, all of the spectrum can be allocated to DIDO-LTE BTSs, and the cellular BTSs can be decommissioned.

In another embodiment, the conventional cellular LTE BTSs can be configured to be coordinated with the DIDO-LTE BTSs such that they share the same spectrum, but take turns using the spectrum. For example, if they were sharing the spectrum use equally, then each BTS network would utilize one 10 ms frame time in alternation, e.g. one 10 ms frame for the cellular LTE BTS, followed by one 10 ms frame for the DIDO-LTE BTS. The frame times could be subdivided in unequal intervals as well. This interval splitting could change as needed over time, and at some point, when there are sufficient DIDO-LTE BTSs deployed to provide the same or better coverage as the cellular BTSs, all of the time can be allocated to DIDO-LTE BTSs, and the cellular BTSs can be decommissioned.

In another embodiment of the invention, DIDO or MU-MAS is employed as LOS or NLOS wireless backhaul to small cells in LTE and LTE-Advanced networks. As small-cells are deployed in LTE networks, DIDO or MU-MAS provides high-speed wireless backhaul to those small cells. As the demand for higher data rate increases, more small-cells are added to the network until the wireless network reaches a limit where no more small-cells can be added in a given area without causing inter-cell interference. In the same embodiment of the invention, DIDO-LTE BTSs are used to replace gradually small-cells, thereby exploiting inter-cell interference to provide increased network capacity.

5. MU-MAS LTE Scheduler

In MU-MAS, distributed antennas or BTSs transmit simultaneous precoded data streams to multiple UEs. As described in Related Patents and Applications, the number of BTSs must be equal or larger than the number of UEs to enable simultaneous data transmissions. In practical deployments, the number of UEs may exceed the number of BTSs. In this case, the extra UEs can be selected for transmission at different time slots or frequency bands according to certain scheduling policy. The scheduler exploits the channel quality information of the UEs to decide the best set of UEs to be serviced at a give time and frequency. Different scheduling methods are used in the present invention, including proportional fair scheduler, round-robin or greedy algorithms.

As described in the previous sections, the LTE standard defines two parameters to inform the scheduler about the link quality of every UE: CQI and SRS. The CQI measures the quality of the DL channel and is fed back from the UE to the BTS. The SRS is signaling information sent from the UE to the BTS to measure the UL channel quality. Both indicators provide information of the UL/DL channel quality over time and frequency domains. In FDD systems, the DL scheduler must use the CQI as performance measure, since the DL and UL channel quality may vary due to different carrier frequencies. In TDD mode, the DL schedule employs either the CSI or the SRS or combination of both to perform its scheduling decision. The same performance metrics can be used for UL scheduling. In one embodiment of the invention, the MU-MAS scheduler employs the CQI and SRS as performance metrics used by the scheduling algorithm.

The MU-MAS described in the present invention enables one additional channel quality indicator not disclosed in prior art: the spatial selectivity indicator (SSI), described in related U.S. application Ser. No. 13/475,598, entitled "Systems and Methods to enhance spatial diversity in distributed-input distributed-output wireless systems". The SSI can be computed based on the CSI obtained from all UEs via feedback mechanisms or from the UL channel (applying UL/DL channel reciprocity). In one embodiment of the invention, the scheduler employs the SSI as performance metric. The SSI is a measure of the spatial diversity available in the wireless link. The SSI depends on the spatial characteristics of the BTSs as well as the UEs. In one exemplary embodiment of the invention, the scheduler obtains the SSI from all the UEs and schedules the UEs with the "optimal" SSI according to certain scheduling criterion. If more BTSs are available than the active BTSs, the users selection criterion described above is combined with the antenna selection method described in related U.S. application Ser. No. 13/475,598, entitled "Systems and Methods to enhance spatial diversity in distributed-input distributed-output wireless systems". In one embodiment of the invention, the scheduler selects the optimal subset of BTSs and UEs based on certain scheduling criterion.

Figure 10:
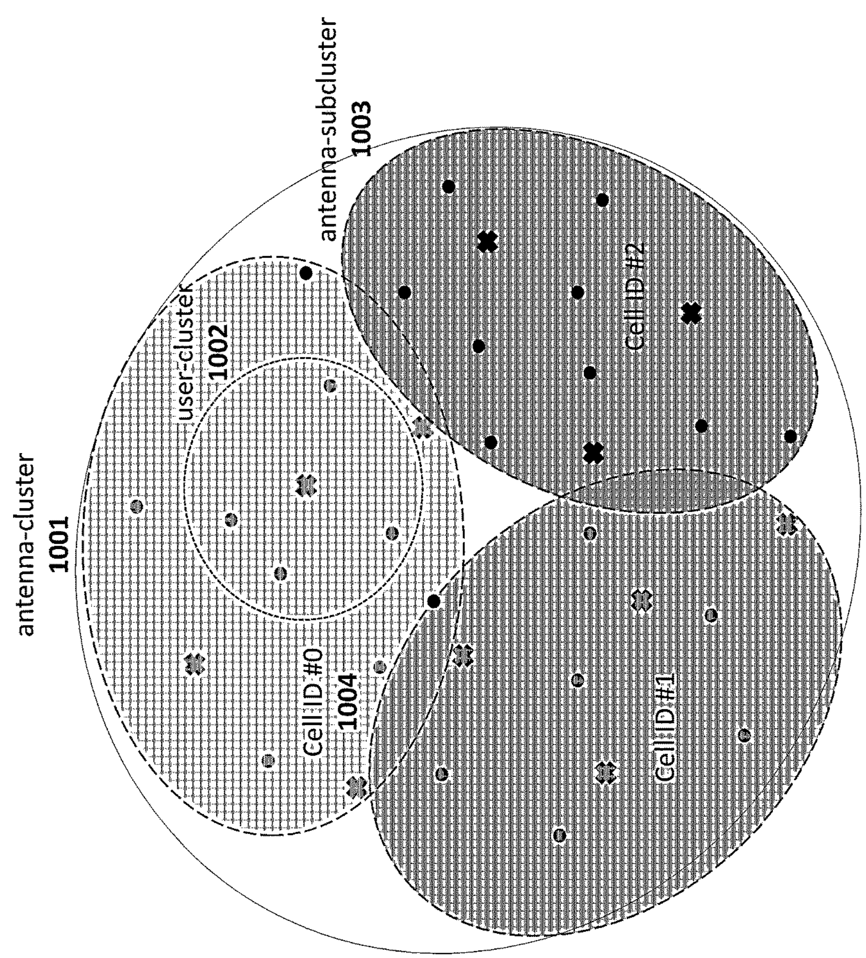
FIG. 10 illustrates one embodiment of a MU-MAS wherein a different cell ID is associated to every antenna-subcluster.

With respect to FIGS. 9, 10 and 11, in certain scenarios there may not be enough orthogonal signaling sequences to enable large number of BTSs within the same antenna-cluster or antenna-subcluster. In this case, some level of interference may occur if additional BTSs are activated to cover regions with larger numbers of active UEs. In one embodiment of the invention, the scheduler measures the level of interference between antenna-clusters or antenna-subclusters and schedules the UEs to minimize the effect of that interference over the wireless link.

The antenna selection algorithm described in related U.S. application Ser. No. 13/475,598, entitled "Systems and Methods to enhance spatial diversity in distributed-input distributed-output wireless systems" is employed in the present invention to select the optimal set of active BTSs based on the SSI. This antenna selection algorithm, however, may require high computational complexity as MU-MAS precoding processing must be applied over all possible permutations of antenna subsets before making a decision on the best subset based on the SSI performance metric. In MU-MAS with large number of cooperative BTSs, this computational burden may become expensive or untenable to achieve in practical deployments. It is thus desirable to develop alternative techniques to reduce the number of antenna subsets while maintaining good performance of the antenna selection method. In one embodiment of the invention, the MU-MAS employs methods based on queuing of the antenna subset ID numbers, hereafter referred to as "antenna shuffling method". In one embodiment of the invention, the antenna shuffling method subdivides the queue containing all possible antenna subset IDs (i.e., all possible permutations of active BTSs for given set of available BTSs) into different groups and assigns different priorities to those groups. These groups are defined to assign fair chances to all subset IDs to be selected, but the SSI metric is computed only for limited number of subsets (e.g., those ones with highest priority) thereby reducing computational complexity. In one exemplary embodiment, the queue of subset ID is divided into three groups where each group is assigned a different rule: i) group #1 contains the IDs with highest priority which are pulled out of the group only in case a new subset with higher priority is identified; ii) group #2 where new antenna subsets (selected from group #3) are included at every iteration of the method; iii) group #3 where the antenna subset IDs are shuffled according to round-robin policy. All subset IDs within group #1 and #2 are sorted at each iteration of the method based on their priority to give opportunity to subsets IDs from group #2 to be upgraded to group #1. The SSI is computed only for the subsets within groups #1 and #2 and the antenna selection algorithm is applied only to those subsets.

6. MU-MAS LTE User Equipment

The present invention comprises of different designs of the LTE UE. In one embodiment, the UE is an LTE UE that is compatible with the MU-MAS employing precoding as described above and depicted in FIG. 13.

Figure 14:
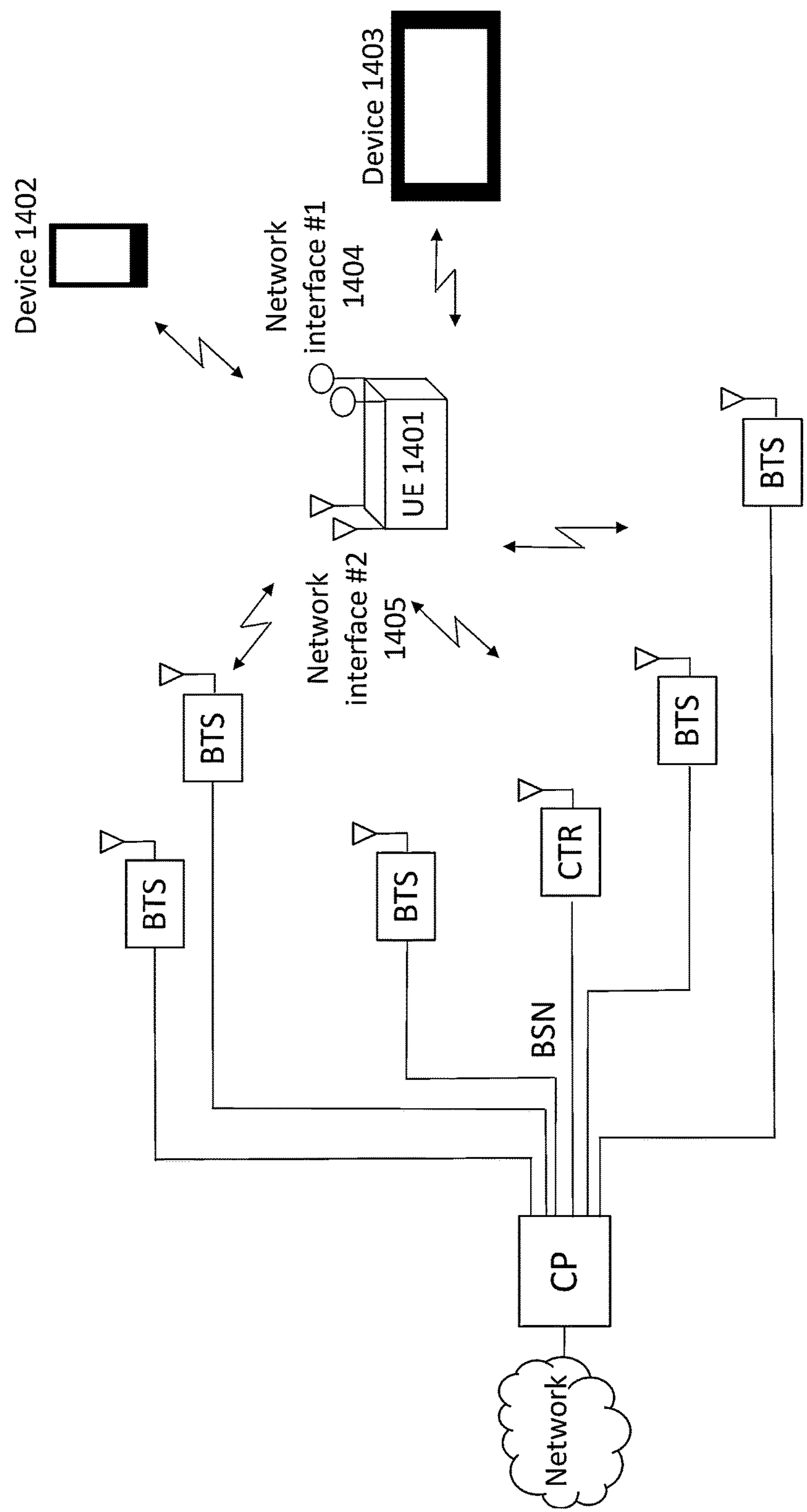
FIG. 14 illustrates one embodiment of a MU-MAS consisting of CP, distributed BTSs, multiple devices and one UE connected to the devices as well as the BTSs via network interfaces.

In a different embodiment, the UE 1401 connects to different devices 1402 and 1403 through a first network interface 1404 (e.g., Wi-Fi, USB, Ethernet, Bluetooth, optical fiber, etc.) and to the MU-MAS through a second network interface 1405 as shown in FIG. 14. The UE in FIG. 14 is equipped with two different network interfaces wherein each network interface comprises of one or multiple antennas (although in alternative embodiments, first network interface 1404 may be a wired interface without antennas). The antennas of the first network interface are denoted with circles, whereas the antennas of the second network interface are denoted with triangles. In the same embodiment, the second network interface supports MU-MAS precoding, MU-MAS implemented with LTE-compliant protocols, or MU-MAS (implemented with or without LTE-compliant protocols) and an alternative network. In the same embodiment, the alternative network is a cellular network, an LTE network or Wi-Fi network. In the same embodiment, the UE works with either and/or both MU-MAS and/or the alternative network and the UE selects either MU-MAS or the alternative network based on some criteria. In the same embodiment, the criteria are: i) whether only one network is available and is chosen; ii) whether one network has better performance; iii) whether one network is more economical; iv) whether one network is less congested; v) whether one network uses less UE resources.

Figure 15:
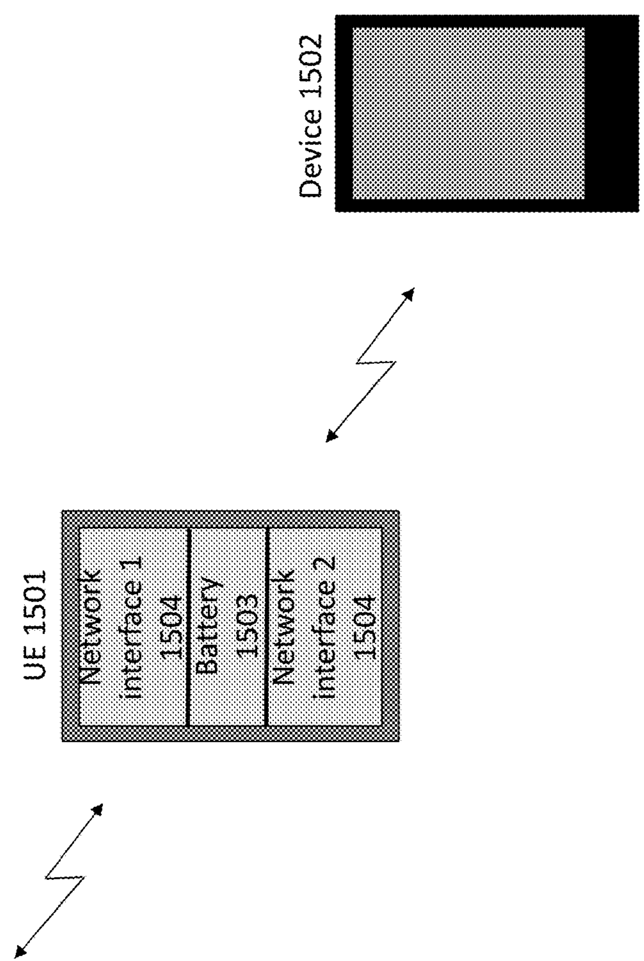
FIG. 15 illustrates one embodiment of a MU-MAS wherein the UE is in a case that physically attaches to the user device.

In one embodiment of the invention, the UE 1501 is in a case that physically attaches to the user device 1502 as depicted in FIG. 15. In the same embodiment, the case serves as a decorative addition to the user device. In another embodiment, the case serves to protect the user device from physical damage. The UE comprises of battery 1503, and one or multiple network interfaces 1504.

In one embodiment, the UE electronics are embedded within a case. In the same embodiment, the UE electronics include a battery 1503. The battery includes a power charger coupling through a physical electrical contact or a wireless contact. Exemplary power couplings are conductive, inductive, RF, light, or thermal, but power couplings are not limited these approaches. In the same embodiment, the UE electronics are coupled to receive power from the user device. This power coupling is through a physical contact or through an inductive or wireless contact. In the same embodiment, the user device is coupled to receive power from the MU-MAS UE. This coupling is through a physical contact or through an inductive or wireless contact. In a different embodiment, the same power charger powers both the user device and the MU_MAS UE.

In one embodiment of the invention, the UE is configured to communicate to the user device. In the same embodiment, the UE can be reset (e.g., via switch, or by removing power) so the user device can initially connect to it, and once the connection is established, the UE can be configured by the user device. Such configuration includes configuring a private password and/or other security protocols. In a different embodiment, the UE includes a means to be configured to communicate with the user device. Such configuration is done via a communications port to another device, wherein the communications port is USB, or via controls and/or buttons on the UE, or via display, wherein buttons or touch input are used.

In another embodiment, the same RF chain is used for MU-MAS communications as well as for the alternative network. In another embodiment, a different RF chain is used for MU-MAS communications and the alternative network.

REFERENCES

[1] A. Paulraj, R. Nabar, and D. Gore, Introduction to Space-Time Wireless Communications, Cambridge University Press, 40 West 20th Street, New York, N.Y., USA, 2003

[2] D. Gesbert, M. Shafi, D. Shiu, P. J. Smith and A. Naguib, "From theory to practice: an overview of MIMO space-time coded wireless systems", *IEEE Journal on Selected Areas on Communications*, vol. 2, n. 3, pp. 281-302, April 2003

[3] L. Zheng and D. N. C. Tse, "Diversity and multiplexing: a fundamental tradeoff in multiple-antenna channels," *IEEE Trans. Info. Th.*, vol. 49, no. 5, pp. 1073-1096, May 2003

[4] D. N. C. Tse, P. Viswanath, and L. Zheng, "Diversity-multiplexing tradeoff in multiple-access channels", *IEEE Trans. Info. Th.*, vol. 50, no. 9, pp. 1859-1874, September 2004

[5] E. Visotsky and U. Madhow, "Space-time transmit precoding with imperfect feedback," IEEE Trans. Info. Th., vol. 47, pp. 2632-2639, September 2001.

[6] S. A. Jafar, S. Vishwanath, and A. Goldsmith, "Channel capacity and beamforming for multiple transmit and receive antennas with covariance feedback," Proc. IEEE Int. Conf. on Comm., vol. 7, pp. 2266-2270, June 2001.

[7] S. A. Jafar and A. Goldsmith, "Transmitter optimization and optimality of beamforming for multiple antenna systems," IEEE Trans. Wireless Comm., vol. 3, pp. 1165-1175, July 2004.

[8] E. A. Jorswieck and H. Boche, "Channel capacity and capacity-range of beamforming in MIMO wireless systems under correlated fading with covariance feedback," IEEE Trans. Wireless Comm., vol. 3, pp. 1543-1553, September 2004.

[9] A. L. Moustakas and S. H. Simon, "Optimizing multiple-input single-output (MISO) communication systems with general Gaussian channels: nontrivial covariance and nonzero mean," IEEE Trans. Info. Th., vol. 49, pp. 2770-2780, October 2003.

[10] M. Kang and M. S. Alouini, "Water-filling capacity and beamforming performance of MIMO systems with covariance feedback," IEEE Work. on Sign. Proc. Adv. in Wire. Comm., pp. 556-560, June 2003.

[11] S. H. Simon and A. L. Moustakas, "Optimizing MIMO antenna systems with channel covariance feedback," IEEE Jour. Select. Areas in Comm., vol. 21, pp. 406-417, April 2003.

[12] S. M. Alamouti, "A simple transmit diversity technique for wireless communications," IEEE Jour. Select. Areas in Comm., vol. 16, no. 8, pp. 1451-1458, October 1998.

[13] V. Tarokh, N. Seshadri, and A. R. Calderbank, "Space-time codes for high data rate wireless communication: Performance criterion and code construction," IEEE Trans. Info. Th., vol. 44, pp. 744-65, March 1998.

[14] V. Tarokh, H. Jafarkhani, and A. R. Calderbank, "Space-time block codes from orthogonal designs," IEEE Trans. Info. Th., vol. 45, pp. 1456-467, July 1999.

[15] E. N. Onggosanusi, A. G. Dabak, and T. A. Schmidl, "High rate space-time block coded scheme: performance and improvement in correlated fading channels," Proc. IEEE Wireless Comm. and Net. Conf., vol. 1, pp. 194-199, March 2002.

[16] G. D. Durgin, Space-Time Wireless Channels, Prentice Hall, Upper Saddle River, N.J., USA, 2003

[17] D.-S. Shiu, G. J. Foschini, M. J. Gans, and J. M. Kahn, "Fading correlation and its effect on the capacity of multielement antenna systems," IEEE Trans. Comm., vol. 48, no. 3, pp. 502-513, March 2000

[18] A. Forenza and R. W. Heath Jr., "Impact of antenna geometry on MIMO communication in indoor clustered channels," Proc. IEEE Antennas and Prop. Symp., vol. 2, pp. 1700-1703, June 2004.

[19] E. A. Jorswieck and H. Boche, "Channel capacity and capacity-range of beamforming in MIMO wireless systems under correlated fading with covariance feedback," IEEE Trans. Wireless Comm., vol. 3, pp. 1543-1553, September 2004

[20] R. W. Heath Jr. and A. Paulraj, "Switching between multiplexing and diversity based on constellation distance," Proc. of Allerton Conf. on □208, Comm. Control and Comp., September 2000.

[21] S. Catreux, V. Erceg, D. Gesbert, and R. W. Heath Jr., "Adaptive modulation and MIMO coding for broadband wireless data networks," IEEE Comm. Mag., vol. 2, pp. 108-115, June 2002.

[22] A. Forenza, A. Pandharipande, H. Kim, and R. W. Heath Jr., "Adaptive MIMO transmission scheme: Exploiting the spatial selectivity of wireless channels," Proc. IEEE Veh. Technol. Conf., vol. 5, pp. 3188-3192, May 2005

[23] C. B. Chae, A. Forenza, R. W. Heath, Jr., M. R. McKay, and I. B. Collings, "Adaptive MIMO Transmission Techniques for Broadband Wireless Communication Systems," *IEEE Communications Magazine*, vol. 48, no. 5, pp. 112-118, May 2010

[24] FCC, "Broadband action agenda", National Broadband Plan, 2010 http://www.broadband.gov/plan/national-broadband-plan-action-agenda.pdf

[25], N. Delfas, F. Meunier, S. Flannery, T. Tsusaka, E. Gelblum and S. Kovler, "Mobile data wave: who dares to invest, wins", Morgan Stanley Research Global, Jun. 13, 2012

[26] D. Goldman, "Sorry, America: your wireless airwaves are full", CNN Money http://money.cnn.com/2012/02/21/technology/spectrum_crunch/index.htm

[27] P. Rysavy, "No silver bullets for FCC, NTIA spectrum challenge", Daily report for executives, Bloomberg BNA, August 2012 http://www.rysavy.com/Articles/2012_09_No_Spectrum_Silver_Bullets.pdf

[28] T. W. Hazlett, "Radio spectrum for a hungry wireless world", Sep. 22, 2011

[29] B. J. Love, D. J. Love and J. V. Krogmeier, "Like deck chairs on the Titanic: why spectrum reallocation won't avert the coming data crunch but technology might keep the wireless industry afloat", February 2012

[30] Qualcomm, "The 1000× data challenge, the latest on wireless, voice, services and chipset evolution", 4G World, Oct. 31, 2012

[31] J. Lee, J.-K. Han, J. Zhang, "MIMO technologies in 3GPP LTE and LTE-advanced", EURASIP Journal on Wireless Comm. and Net., Hindawi, May 2009

[32] 3GPP, TS 36.201, "Evolved Universal Terrestrial Radio Access (E-UTRA); LTE Physical Layer—General Description (Release 8)"

[33] 3GPP, TS 36.211, "Evolved Universal Terrestrial Radio Access (E-UTRA); Physical Channels and Modulation (Release 8)"

[34] 3GPP, TS 36.212, "Evolved Universal Terrestrial Radio Access (E-UTRA); Multiplexing and channel coding (Release 8)"

[35] 3GPP, TS 36.213, "Evolved Universal Terrestrial Radio Access (E-UTRA); Physical layer procedures (Release 8)"

[36] T. Yoo, N. Jindal, and A. Goldsmith, "Multi-antenna broadcast channels with limited feedback and user selection," IEEE Journal on Sel. Areas in Communications, vol. 25, pp. 1478-91, July 2007.

[37] P. Ding, D. J. Love, and M. D. Zoltowski, "On the sum rate of channel subspace feedback for multi-antenna broadcast channels," in Proc., IEEE Globecom, vol. 5, pp. 2699-2703, November 2005.

[38] N. Jindal, "MIMO broadcast channels with finite-rate feedback," IEEE Trans. on Info. Theory, vol. 52, pp. 5045-60, November 2006.

[39] D. J. Love, R. W. Heath, Jr., V. K. N. Lau, D. Gesbert, B. D. Rao, and M. Andrews, "An Overview of Limited Feedback in Wireless Communication Systems," *IEEE Journal on Sel. Areas in Comm.*, Special Issue on Exploiting Limited Feedback in Tomorrow's Wireless Communication Networks, vol. 26, no. 8, pp. 1341-1365, October 2008.

R. W. Heath, Jr., D. J. Love, V. K. N. Lau, D. Gesbert, B. D. Rao, and M. Andrews, "Exploiting Limited Feedback in Tomorrow's Wireless Communication Networks," *IEEE Journal on Sel. Areas in Comm.*, Special Issue on Exploiting Limited Feedback in Tomorrow's Wireless Communication Networks, vol. 26, no. 8, pp. 1337-1340, October 2008.

[41] D. J. Love, R. W. Heath, Jr., and T. Strohmer, "Grassmannian Beamforming for Multiple-Input Multiple-Output Wireless Systems," *IEEE Trans. on Info. Theory* special issue on MIMO Communication, vol. 49, pp. 2735-2747, October 2003

[42] C. B. Chae, D. Mazzarese, N. Jindal and R. W. Heath, Jr., "Coordinated Beamforming with Limited Feedback in the MIMO Broadcast Channel" *IEEE Journal on Sel. Areas in Comm.*, Special Issue on Exploiting Limited Feedback in Tomorrow's Wireless Comm. Networks, vol. 26, no. 8, pp. 1505-1515, October 2008

[43] A. Paulraj, "Is OFDMA, MIMO and OS the right stuff for mobile broadband?" http://www.ieeevtc.org/vtc2005fall/presentations/paulraj.pdf, September 2005

[44] J. Wannstrom, "Carrier aggregation explained", 3GPP http://www.3gpp.org/Carrier-Aggregation-explained

[45] 3GPP, TS 36.808, "Evolved Universal Terrestrial Radio Access (E-UTRA); Carrier Aggregation (Release 10)", v10.0.0, June 2012

[46] Nokia Siemens Networks, "2020: beyond 4G, radio evolution for the gigabit experience", White Paper, 2011, www.nokiasiemensnetworks.com

[47] S. Marek, "AT&T's Rinne talks about carrier aggregation trials, small cells and more", http://www.fiercebroadbandwireless.com/story/atts-rinne-talks-about-carrier-aggregation-trials-small-cells-and-more/2012-11-08

[48] M. Reed, "InterfereX", Tech23, 2011 http://www.youtube.com/watch?v=YPpELm6iip8

[49] NICTA, "InterfereX", http://www.nicta.com.au/research/archive/research_themes/networked_systems/interferex

[50] J. Duplicity, et al., “MU-MIMO in LTE systems”, EURASIP Journal on Wireless Communications and Networking, March 2011

[51] S. Feng and E. Seidel, “Self-organizing networks (SON) in 3GPP LTE”, Nomor research, May 2008

[52] NEC, “Self organizing networks”, White paper, February 2009

[53] U.S. Pat. No. 5,809,422, issued Sep. 15, 1998, entitled “Distributed microcellular communications system”, G. R. Raleigh, M. A. Pollack

[54] G. J. Foschini, H. C. Huang, K. Karakayali, R. A. Valenzuela, and S. Venkatesan. The Value of Coherent Base Station Coordination. In *Conference on In-formation Sciences and Systems* (*CISS* 2005), March 2005

[55] M. K. Karakayali, G. J. Foschini, R. A. Valenzuela, and R. D. Yates, “On the maximum common rate achievable in a coordinated network,” *Proc. of the Int’l Conf. on Communications* (*ICC*’06), vol. 9, pp. 4333-4338, June 2006.

[56] M. K. Karakayali, G. J. Foschini, and R. A. Valenzuela, “Network coordination for spectrally efficient communications in cellular systems,” *IEEE Wireless Communications Magazine*, vol. 13, no. 4, pp. 56-61, August 2006.

[57] G. J. Foschini, M. K. Karakayali, and R. A. Valenzuela, “Coordinating multiple antenna cellular networks to achieve enormous spectral efficiency,” *Proceedings of the IEEE*, vol. 153, no. 4, pp. 548-555, August 2006.

[58] S. Venkatesan, A. Lozano, and R. Valenzuela, “Network MIMO: overcoming inter-cell interference in indoor wireless systems”, Proc. of Asilomar conf., pp. 83-87, November 2007

[59] S. Venkatesan, H. Huang, A. Lozano, and R. Valenzuela, “A WiMAX-based implementation of network MIMO for indoor wireless systems”, EURASIP Journal on Advances in Signal Processing, September 2009

[60] Y. Liang, R. Valenzuela, G. Foschini, D. Chizhik, and A. Goldsmith, “Interference suppression in wireless cellular networks through picocells”, ACSSC, pp. 1041-1045, November 2007

[61] A. Papadogiannis, H. J. Bang, D. Gesbert, and E. Hardouin, “Efficient selective feedback design for multicell cooperative networks”, IEEE Trans. On Vehicular Techn., pp. 196-205, vol. 60, n. 1, January 2011

[62] I. F. Akyildiz, D. M. Guterrez-Estevez, E. C. Reyes, “The evolution to 4G cellular systems: LTE-Advanced”, Physical Comm., Elsevier, pp. 217-244, 2010

[63] A. Barbieri, P. Gaal, S. Geirhofer, T. Ji, D. Malladi, Y. Wei, and F. Xue, “Coordinated downlink multi-point communications in heterogeneous cellular networks”, (Qualcomm), Information Theory and App. Workshop, pp. 7-16, February 2012

[64] S. Parkvall, E. Dahlman, A. Furuskar, Y. Jading, M. Olsson, S. Wanstedt, and K. Zangi, “LTE-Advanced—evolving LTE towards IMT-Advanced”, (Ericsson) IEEE VTC, pp. 1-5, September 2008

[65] R. A. Monziano and T. W. Miller, *Introduction to Adaptive Arrays*, New York: Wiley, 1980.

[66] K. K. Wong, R. D. Murch, and K. B. Letaief, “A joint channel diagonalization for multiuser MIMO antenna systems,” IEEE Trans. Wireless Comm., vol. 2, pp. 773-786, July 2003;

[67] R. Chen, R. W. Heath, Jr., and J. G. Andrews, “Transmit Selection Diversity for Unitary Precoded Multiuser Spatial Multiplexing Systems with Linear Receivers,” *IEEE Trans. on Signal Proc*., vol. 55, no. 3, pp. 1159-1171, March 2007.

[68] M. Costa, “Writing on dirty paper,” *IEEE Transactions on Information Theory*, Vol. 29, No. 3, Page(s): 439-441, May 1983.

[69] G. Caire and S. Shamai, “On the achievable throughput of a multiantenna Gaussian broadcast channel,” IEEE Trans. Info. Th., vol. 49, pp. 1691-1706, July 2003.

[70] N. Jindal & A. Goldsmith, “Dirty Paper Coding vs. TDMA for MIMO Broadcast Channels”, IEEE Trans. on Info. Theory, vol. 51, pp. 1783-1794, May 2005

[71] M. Tomlinson, “New automatic equalizer employing modulo arithmetic,” *Electronics Letters*, Page(s): 138-139, March 1971.

[72] H. Miyakawa and H. Harashima, “A method of code conversion for digital communication channels with intersymbol interference,” *Trans. of the Inst. of Electronic*

[73] U. Erez, S. Shamai (Shitz), and R. Zamir, “Capacity and lattice-strategies for cancelling known interference,” *Proceedings of International Symposium on Information Theory*, Honolulu, Hi., November 2000.

[74] W. Yu and J. M. Cioffi, “Trellis Precoding for the Broadcast Channel”, IEEE Globecom, vol. 2, pp. 1344-1348, 2001

[75] B. M. Hochwald, C. B. Peel, and A. L. Swindlehurst, “A Vector-Perturbation Technique for Near-Capacity Multiantenna Multiuser Communication—Part I: Channel Inversion and Regularization”, IEEE Trans. On Communications, vol. 53, n.1, pp. 195-202, January 2005

[76] B. M. Hochwald, C. B. Peel, and A. L. Swindlehurst, “A Vector-Perturbation Technique for Near-Capacity Multiantenna Multiuser Communication—Part II: Perturbation”, IEEE Trans. On Comm., vol. 53, n. 3, pp. 537-544, March 2005

[77] S. Perlman and A. Forenza, “Distributed-input distributed-output (DIDO) wireless technology: a new approach to multiuser wireless”, Rearden Labs White Paper, July 2011, http://www.reardenwireless.com/110727-DIDO-A%20New%20Approach%20to%20Multiuser%20Wireless.pdf

[78] A. Vance, “Steve Perlman’s wireless fix”, Businessweek, July 2011 http://www.businessweek.com/magazine/the-edison-of-silicon-valley-07272011.html

[79] M. Lindström (Ericsson), “LTE-Advanced Radio Layer 2 and RRC aspects”, 3GPP TSG-RAN WG2

[80] Anritsu, “LTE resource guide”, www.us.anritsu.com

[81] 3GPP, “Spatial Channel Model AHG (Combined adhoc from 3GPP & 3GPP2)”, SCM Text V6.0, Apr. 22, 2003

[82] J. Lee, “Introduction of LTE-Advanced DL/UL MIMO”, Samsung Electronics, September 2009

[83] E. Dahlman, S. Parkvall and J. Skold, “4G: LTE/LTE-Advanced for mobile broadband”, Elsevier, 2011

[84] J. Syren, “Overview on the 3GPP long term evolution physical layer”, Freescale White Paper, July 2007

[85] M. Baker, “LTE-Advanced physical layer”, Alcatel-Lucent, December 2009

[86] J. Xu, “LTE-Advanced signal generation and measurements using SystemVue”, Agilent Technologies

[87] X. Hou and H. Kayama, “Demodulation reference signal design and channel estimation for LTE-Advanced uplink”, DOCOMO, Adv. in Vehic. Netw. Tech., April 2011

[88] D. C. Chu, “Polyphase codes with good periodic correlation properties”, *IEEE Trans. Info. Theory*, vol. 18, n. 4, pp. 531-532, July 1972

[89] A. Lozano, R. W. Heath and J. Andrews, “Fundamental limits of cooperation”, March 2012, http://arxiv.org/pdf/1204.0011.pdf

[90] J. G. Andrews, "Seven ways that HetNet are a cellular paradigm shift" http://users.ece.utexas.edu/~jandrews/pubs/And_HetNet_CommMag2012_v3.pdf

We claim:

1. A multiple antenna system (MAS) with multiuser (MU) transmissions ("MU-MAS") comprising:

a plurality of distributed antennas or wireless transceivers distributed throughout a cell or coverage area and communicatively coupled to one or a plurality of spatial processing units via a wireline or wireless network;

a plurality of user equipment devices (UEs) communicatively coupled to the distributed antennas via a plurality of wireless links;

wherein each of the plurality of UEs receives the same cell ID; and the distributed antennas cooperatively send or receive a plurality of signals that intentionally interfere to create a plurality of non-interfering data links with the UEs at the same time and within the same frequency band.

2. The system as in claim 1 wherein the plurality of distributed antennas are interconnected to a centralized processor (CP) via a base station network (BSN) and employing precoding to communicate with the plurality of UEs.

3. The system as in claim 1 wherein the wireless communications network is compatible with UEs supporting standard protocols, such as Long Term Evolution (LTE), Global System for Mobile (GSM), Universal Mobile Telecommunications System (UMTS), High Speed Packet Access (HSPA) Evolved High Speed Packet Access (HSPA+) and Code Division Multiple Access (CDMA).

4. The system as in claim 3 wherein the distributed antennas transmit the same cell ID via a primary synchronization signal (P-SS) and/or a secondary synchronization signal (S-SS).

5. The system as in claim 3 wherein all or a subset of the downlink resource blocks (RBs) are assigned to every UE and simultaneous non-interfering data streams are sent from the BTSs to the UEs via precoding.

6. The system as in claim 5 wherein precoding is used in combination with carrier aggregation (CA) and applied to different portions of the radio frequency (RF) spectrum (inter-band CA) or different bands within the same portion of the spectrum (intra-band CA) to increase per-user data rate.

7. The system as in claim 1 wherein the MU-MAS coverage area overlaps at least one cellular LTE network coverage area.

8. The system as in claim 1 wherein the MU-MAS is compatible with LTE-compatible UEs.

9. The system as in claim 1 wherein the MU-MAS utilizes a variant of the LTE standard.

10. The system as in claim 1 wherein the MU-MAS is concurrently compatible with LTE-compatible UEs and UEs that are not LTE-compatible.

11. The system as in claim 1 wherein MU-MAS is compatible with UEs that are not LTE-compatible.

12. The system as in claim 7 wherein spectrum is subdivided to support LTE protocol in a cellular configuration in one block of spectrum and LTE protocol in the MU-MAS system in another block of spectrum.

13. The system as in claim 7 wherein the cellular LTE protocol is coordinated with the MU-MAS LTE protocol such that the two LTE protocols share the same spectrum, but avoid interfering with each other by utilizing time division multiple access (TDMA) schemes.

14. The system as in claim 1 wherein the MU-MAS is employed as wireless backhaul to a second wireless network.

15. The system as in claim 1 wherein the MU-MAS concurrently supports mobile UEs and non-mobile UEs.

16. The system as in claim 1 wherein the MU-MAS employs round-robin or proportional fair scheduler or greedy techniques for scheduling the UEs for transmissions over the downlink (DL) or uplink (UL) channels.

17. The system as in claim 16 wherein the scheduler employs channel quality indicator (CQI), the sounding reference signal (SRS), the spatial selectivity indicator (SSI) or combinations of those as performance metrics for the scheduling method.

18. The system as in claim 16 wherein the scheduler selects the optimal subset of distributed antennas and UEs to be scheduled for transmission over the wireless link based on a link performance metric.

19. The system as in claim 16 wherein the scheduler selects the UEs to serve over the wireless link based on a performance metric.

20. The system as in claim 1 wherein transmit antenna selection methods are applied over all distributed antennas to select the optimal distributed antennas for the concurrent transmission over the DL channel.

21. The system as in claim 20 wherein the antenna selection method comprises of a queue of antenna subset IDs with respective priority numbers, such that antenna selection is applied only over a limited number of antenna subsets, thereby reducing computational complexity.

22. The system as in claim 21 wherein the queue is subdivided into two or multiple groups employing round-robin policy and sorting methods to select the limited number of antenna subsets to be employed by the antenna selection algorithm.

23. The system as in claim 6 wherein inter-band CA is enabled by implementing one LTE protocol to operate at lower carrier frequencies and other LTE protocols to operate at higher carrier frequencies, such that the two sets intersect or one set is the subset of the other.

24. The system as in claim 6 wherein the MU-MAS with precoding employs CA methods in conjunction with frequency hopping patterns to improve robustness against frequency-selective fading or interference.

25. The system as in claim 1 wherein the MU-MAS employs linear precoding methods (e.g. zero-forcing, block-diagonalization, matrix inversion, etc.).

26. The system as in claim 1 wherein the MU-MAS employs non-linear precoding methods (e.g., dirty-paper coding or Tomlinson-Harashima precoding, lattice techniques or trellis precoding, vector perturbation techniques).

27. The system as in claim 1 wherein the MU-MAS dynamically switches between linear and non-linear precoding methods based on the number of distributed antennas required to meet the data demands of active UEs to reduce computational complexity in the MU-MAS.

28. The system as in claim 1 wherein the MU-MAS switches between precoding multiplexing methods for UEs experiencing good channel quality and beamforming or diversity methods for UEs with poor link quality.

29. The system as in claim 4 wherein a subset of the distributed antennas transmit LTE broadcast channels (e.g., P-SS and S-SS) to UEs.

30. The system as in claim 29 wherein the subset of distributed antennas that transmits the LTE broadcast channels is selected to maximize the power received at the UEs over the broadcast channels.

31. The system as in claim 29 wherein the subset of distributed antennas that transmits the LTE broadcast channels is selected to avoid destructive interference at the UE.

32. The system as in claim 4 wherein the LTE broadcast channels are transmitted at higher power than the data resource blocks.

33. A method implemented within a multiple antenna system (MAS) with multiuser (MU) transmissions ("MU-MAS") comprising of:

a plurality of distributed antennas or wireless transceivers distributed throughout a cell or coverage area and communicatively coupled to one or a plurality of spatial processing units via a wireline or wireless network;

a plurality of UEs communicatively coupled to the distributed antennas via a plurality of wireless links;

wherein each of the plurality of UEs receives the same cell ID; and the distributed antennas cooperatively send or receive a plurality of signals that intentionally interfere to create a plurality of non-interfering data links with the UEs at the same time and within the same frequency band.

34. The method as in claim 33 wherein the plurality of distributed antennas are interconnected to a CP via a BSN and employing precoding to communicate with the plurality of UEs.

35. The method as in claim 33 wherein the wireless communications network is compatible with UEs supporting standard protocols, such as LTE, GSM, UMTS, HSPA, HSPA+ and CDMA.

36. The method as in claim 35 wherein the distributed antennas transmit the same cell ID via a P-SS and/or a S-SS.

37. The method as in claim 35 wherein all or a subset of the downlink RBs are assigned to every UE and simultaneous non-interfering data streams are sent from the BTSs to the UEs via precoding.

38. The method as in claim 37 wherein precoding is used in combination with CA and applied to different portions of the radio frequency (RF) spectrum (inter-band CA) or different bands within the same portion of the spectrum (intra-band CA) to increase per-user data rate.

39. The method as in claim 33 wherein the MU-MAS coverage area overlaps at least one cellular LTE network coverage area.

40. The method as in claim 33 wherein the MU-MAS is compatible with LTE-compatible UEs.

41. The method as in claim 33 wherein the MU-MAS utilizes a variant of the LTE standard.

42. The method as in claim 33 wherein the MU-MAS is concurrently compatible with LTE-compatible UEs and UEs that are not LTE-compatible.

43. The method as in claim 33 wherein MU-MAS is compatible with UEs that are not LTE-compatible.

44. The method as in claim 39 wherein spectrum is subdivided to support LTE protocol in a cellular configuration in one block of spectrum and LTE protocol in the MU-MAS in another block of spectrum.

45. The method as in claim 39 wherein the cellular LTE protocol is coordinated with the MU-MAS LTE protocol such that the two LTE protocols share the same spectrum, but avoid interfering with each other by utilizing TDMA schemes.

46. The method as in claim 33 wherein the MU-MAS is employed as wireless backhaul to a second wireless network.

47. The method as in claim 33 wherein the MU-MAS concurrently supports mobile UEs and non-mobile UEs.

48. The method as in claim 33 wherein the MU-MAS employs round-robin or proportional fair scheduler or greedy techniques for scheduling the UEs for transmissions over the DL or UL channels.

49. The method as in claim 48 wherein the scheduler employs CQI, the SRS, the SSI or combinations of those as performance metrics for the scheduling method.

50. The method as in claim 48 wherein the scheduler selects the optimal subset of distributed antennas and UEs to be scheduled for transmission over the wireless link based on a link performance metric.

51. The method as in claim 48 wherein the scheduler selects the UEs to serve over the wireless link based on a performance metric.

52. The method as in claim 33 wherein transmit antenna selection methods are applied over all distributed antennas to select the optimal distributed antennas for the concurrent transmission over the DL channel.

53. The method as in claim 52 wherein the antenna selection method comprises of a queue of antenna subset IDs with respective priority numbers, such that antenna selection is applied only over a limited number of antenna subsets, thereby reducing computational complexity.

54. The method as in claim 53 wherein the queue is subdivided into two or multiple groups employing round-robin policy and sorting methods to select the limited number of antenna subsets to be employed by the antenna selection algorithm.

55. The method as in claim 38 wherein inter-band CA is enabled by implementing one LTE protocol to operate at lower carrier frequencies and other LTE protocols to operate at higher carrier frequencies, such that the two sets intersect or one set is the subset of the other.

56. The method as in claim 38 wherein the MU-MAS with precoding employs CA methods in conjunction with frequency hopping patterns to improve robustness against frequency-selective fading or interference.

57. The method as in claim 33 wherein the MU-MAS employs linear precoding methods (e.g. zero-forcing, block-diagonalization, matrix inversion, etc.).

58. The method as in claim 33 wherein the MU-MAS employs non-linear precoding methods (e.g., dirty-paper coding or Tomlinson-Harashima precoding, lattice techniques or trellis precoding, vector perturbation techniques).

59. The method as in claim 33 wherein the MU-MAS dynamically switches between linear and non-linear precoding methods based on the number of distributed antennas required to meet the data demands of active UEs to reduce computational complexity in the MU-MAS.

60. The method as in claim 33 wherein the MU-MAS switches between precoding multiplexing methods for UEs experiencing good channel quality and beamforming or diversity methods for UEs with poor link quality.

61. The method as in claim 36 wherein a subset of the distributed antennas transmit LTE broadcast channels (e.g., P-SS and S-SS) to UEs.

62. The method as in claim 61 wherein the subset of distributed antennas that transmits the LTE broadcast channels is selected to maximize the power received at the UEs over the broadcast channels.

63. The method as in claim 61 wherein the subset of distributed antennas that transmits the LTE broadcast channels is selected to avoid destructive interference at the UE.

64. The method as in claim 36 wherein the LTE broadcast channels are transmitted at higher power than the data resource blocks.

65. A multiple antenna system (MAS) with multiuser (MU) transmissions ("MU-MAS") comprising of:

a plurality of cooperative distributed antennas or wireless transceivers distributed throughout a cell or coverage area and communicatively coupled to one or a plurality of spatial processing units via a wireline or wireless network;

a plurality of user equipment devices (UEs) communicatively coupled to the distributed antennas via a plurality of wireless links;

wherein, for certain time and frequency intervals, different data streams are transmitted over the wireless links between the distributed antennas and each of a plurality of UEs, and for certain other time and frequency intervals, the same data streams are transmitted over the wireless links between the distributed antennas and each of a plurality of UEs.

66. The system as in claim 65 wherein the wireless communications network is compatible with UEs supporting one or more standard protocols, such as LTE, GSM, UMTS, HSPA, HSPA+, CDMA or Wi-Fi.

67. The system as in claim 65 wherein the MU-MAS utilizes precoding to transmit or receive different data at the same time and frequency intervals to or from each of a plurality of UEs.

68. The system as in claim 65 wherein same data includes a cell ID.

69. The system as in claim 68 wherein the same cell ID is received by UEs via a S-SS.

70. The system as in claim 65 wherein the plurality of distributed antennas are interconnected to a CP via a BSN.

71. The system as in claim 65 wherein the same downlink RBs are assigned to a plurality of UEs and simultaneous non-interfering data streams are sent to the plurality of UEs via precoding.

72. The system as in claim 65 wherein the same uplink RBs are assigned to a plurality of UEs and simultaneous interfering data streams are received from the plurality UEs by the plurality of cooperative distributed antennas and decoded into non-interfering data streams.

73. The system as in claim 65 wherein precoding is used in combination with CA and applied to different portions of the radio frequency (RF) spectrum (inter-band CA) or different bands within the same portion of the spectrum (intra-band CA) to increase per-user data rate.

74. The system as in claim 65 wherein the MU-MAS coverage area overlaps at least one cellular LTE network coverage area.

75. The system as in claim 65 wherein the MU-MAS is concurrently compatible with LTE-compatible UEs and UEs that are not LTE-compatible.

76. The system as in claim 74 wherein spectrum is subdivided to support LTE protocol in a cellular configuration in one block of spectrum and LTE protocol in the MU-MAS system in another block of spectrum.

77. The system as in claim 74 wherein the cellular LTE protocol is coordinated with the MU-MAS LTE protocol such that the two LTE protocols share the same spectrum, but avoid interfering with each other by utilizing TDMA schemes.

78. The system as in claim 65 wherein MU-MAS is compatible with UEs that are not LTE-compatible.

79. The system as in claim 65 wherein the MU-MAS concurrently supports mobile UEs and non-mobile UEs.

80. The system as in claim 65 wherein the MU-MAS employs round-robin or proportional fair scheduler or greedy techniques for scheduling the UEs for transmissions over the downlink (DL) or uplink (UL) channels.

81. The system as in claim 80 wherein the scheduler employs CQI, the sounding reference signal (SRS), the spatial selectivity indicator (SSI) or combinations of those as performance metrics for the scheduling method.

82. The system as in claim 80 wherein the scheduler selects the optimal subset of distributed antennas and UEs to be scheduled for transmission over the wireless link based on a link performance metric.

83. The system as in claim 80 wherein the scheduler selects the UEs to serve over the wireless link based on a performance metric.

84. The system as in claim 65 wherein transmit antenna selection methods are applied over all distributed antennas to select the optimal distributed antennas for the concurrent transmission over the DL channel.

85. The system as in claim 84 wherein the antenna selection method comprises of a queue of antenna subset IDs with respective priority numbers, such that antenna selection is applied only over a limited number of antenna subsets, thereby reducing computational complexity.

86. The system as in claim 85 wherein the queue is subdivided into two or multiple groups employing round-robin policy and sorting methods to select the limited number of antenna subsets to be employed by the antenna selection algorithm.

87. The system as in claim 73 wherein inter-band CA is enabled by implementing one LTE protocol to operate at lower carrier frequencies and other LTE protocols to operate at higher carrier frequencies, such that the two sets intersect or one set is the subset of the other.

88. The system as in claim 73 wherein the MU-MAS with precoding employs CA methods in conjunction with frequency hopping patterns to improve robustness against frequency-selective fading or interference.

89. The system as in claim 65 wherein the MU-MAS employs linear precoding methods (e.g. zero-forcing, block-diagonalization, matrix inversion, etc.).

90. The system as in claim 65 wherein the MU-MAS employs non-linear precoding methods (e.g., dirty-paper coding or Tomlinson-Harashima precoding, lattice techniques or trellis precoding, vector perturbation techniques).

91. The system as in claim 65 wherein the MU-MAS dynamically switches between linear and non-linear precoding methods based on the number of distributed antennas required to meet the data demands of active UEs to reduce computational complexity in the MU-MAS.

92. The system as in claim 65 wherein the MU-MAS switches between precoding multiplexing methods for UEs experiencing good channel quality and beamforming or diversity methods for UEs with poor link quality.

93. The system as in claim 69 wherein a subset of the distributed antennas transmit LTE broadcast channels (e.g., P-SS and S-SS) to UEs.

94. The system as in claim 93 wherein the subset of distributed antennas that transmits the LTE broadcast channels is selected to maximize the power received at the UEs over the broadcast channels.

95. The system as in claim 93 wherein the subset of distributed antennas that transmits the LTE broadcast channels is selected to avoid destructive interference at the UE.

96. The system as in claim 67 wherein the LTE broadcast channels are transmitted at higher power than the data resource blocks.

97. The system as in claim 65 wherein the different data streams include at least one Downlink Control Information (DCI) message.

98. The system as in claim 97 wherein the same data streams include at least one Downlink Control Information (DCI) message.

99. The system as in claim 65 wherein the different data streams are precoded.

100. A method implemented within a multiple antenna system (MAS) with multiuser (MU) transmissions ("MU-MAS") comprising of a plurality of cooperative distributed antennas or wireless transceivers distributed throughout a cell or coverage area and communicatively coupled to one or a plurality of spatial processing units via a wireline or wireless network;

a plurality of user equipment devices (UEs) communicatively coupled to the distributed antennas via a plurality of wireless links;

wherein, for certain time and frequency intervals, different data streams are transmitted over the wireless links between the distributed antennas and each of a plurality of UEs, and for certain other time and frequency intervals, the same data streams are transmitted over the wireless links between the distributed antennas and each of a plurality of UEs.

101. The system as in claim 100 wherein the wireless communications network is compatible with UEs supporting one or more standard protocols, such as LTE, GSM, UMTS, HSPA, HSPA+, CDMA or Wi-Fi.

102. The system as in claim 100 wherein the MU-MAS utilizes precoding to transmit or receive different data at the same time and frequency intervals to or from each of a plurality of UEs receiving.

103. The method as in claim 100 wherein same data includes a cell ID.

104. The method as in claim 103 wherein the same cell ID is received by UEs via a secondary synchronization signal (S-SS).

105. The method as in claim 100 wherein the plurality of distributed antennas are interconnected to a centralized processor (CP) via a base station network (BSN).

106. The method as in claim 100 wherein the same downlink resource blocks (RBs) are assigned to a plurality of UEs and simultaneous non-interfering data streams are sent to the plurality of UEs via precoding.

107. The method as in claim 100 wherein the same uplink resource blocks (RBs) are assigned to a plurality of UEs and simultaneous interfering data streams are received from the plurality UEs by the plurality of cooperative distributed antennas and decoded into non-interfering data streams.

108. The method as in claim 100 wherein precoding is used in combination with carrier aggregation (CA) and applied to different portions of the radio frequency (RF) spectrum (inter-band CA) or different bands within the same portion of the spectrum (intra-band CA) to increase per-user data rate.

109. The method as in claim 100 wherein the MU-MAS coverage area overlaps at least one cellular LTE network coverage area.

110. The method as in claim 100 wherein the MU-MAS is concurrently compatible with LTE-compatible UEs and UEs that are not LTE-compatible.

111. The method as in claim 109 wherein spectrum is subdivided to support LTE protocol in a cellular configuration in one block of spectrum and LTE protocol in the MU-MAS system in another block of spectrum.

112. The method as in claim 109 wherein the cellular LTE protocol is coordinated with the MU-MAS LTE protocol such that the two LTE protocols share the same spectrum, but avoid interfering with each other by utilizing TDMA schemes.

113. The method as in claim 100 wherein MU-MAS is compatible with UEs that are not LTE-compatible.

114. The method as in claim 100 wherein the MU-MAS concurrently supports mobile UEs and non-mobile UEs.

115. The method as in claim 100 wherein the MU-MAS employs round-robin or proportional fair scheduler or greedy techniques for scheduling the UEs for transmissions over the downlink (DL) or uplink (UL) channels.

116. The method as in claim 115 wherein the scheduler employs CQI, the SRS, the SSI or combinations of those as performance metrics for the scheduling method.

117. The method as in claim 115 wherein the scheduler selects the optimal subset of distributed antennas and UEs to be scheduled for transmission over the wireless link based on a link performance metric.

118. The method as in claim 115 wherein the scheduler selects the UEs to serve over the wireless link based on a performance metric.

119. The method as in claim 100 wherein transmit antenna selection methods are applied over all distributed antennas to select the optimal distributed antennas for the concurrent transmission over the DL channel.

120. The method as in claim 119 wherein the antenna selection method comprises of a queue of antenna subset IDs with respective priority numbers, such that antenna selection is applied only over a limited number of antenna subsets, thereby reducing computational complexity.

121. The method as in claim 120 wherein the queue is subdivided into two or multiple groups employing round-robin policy and sorting methods to select the limited number of antenna subsets to be employed by the antenna selection algorithm.

122. The method as in claim 108 wherein inter-band CA is enabled by implementing one LTE protocol to operate at lower carrier frequencies and other LTE protocols to operate at higher carrier frequencies, such that the two sets intersect or one set is the subset of the other.

123. The method as in claim 108 wherein the MU-MAS with precoding employs CA methods in conjunction with frequency hopping patterns to improve robustness against frequency-selective fading or interference.

124. The method as in claim 100 wherein the MU-MAS employs linear precoding methods (e.g. zero-forcing, block-diagonalization, matrix inversion, etc.).

125. The method as in claim 100 wherein the MU-MAS employs non-linear precoding methods (e.g., dirty-paper coding or Tomlinson-Harashima precoding, lattice techniques or trellis precoding, vector perturbation techniques).

126. The method as in claim 100 wherein the MU-MAS dynamically switches between linear and non-linear precoding methods based on the number of distributed antennas required to meet the data demands of active UEs to reduce computational complexity in the MU-MAS.

127. The method as in claim 100 wherein the MU-MAS switches between precoding multiplexing methods for UEs experiencing good channel quality and beamforming or diversity methods for UEs with poor link quality.

128. The method as in claim 104 wherein a subset of the distributed antennas transmit LTE broadcast channels (e.g., P-SS and S-SS) to UEs.

129. The method as in claim 128 wherein the subset of distributed antennas that transmits the LTE broadcast channels is selected to maximize the power received at the UEs over the broadcast channels.

130. The method as in claim 128 wherein the subset of distributed antennas that transmits the LTE broadcast channels is selected to avoid destructive interference at the UE.

131. The method as in claim 102 wherein the LTE broadcast channels are transmitted at higher power than the data resource blocks.

132. The method as in claim 100 wherein the different data streams include at least one Downlink Control Information (DCI) message.

133. The method as in claim 132 wherein the same data streams include at least one DCI message.

134. The method as in claim 100 wherein the different data streams are precoded.

* * * * *